(12) United States Patent
Koike et al.

(10) Patent No.: US 8,582,121 B2
(45) Date of Patent: Nov. 12, 2013

(54) ARTICLE RECOGNITION APPARATUS AND ARTICLE PROCESSING APPARATUS USING THE SAME

(75) Inventors: Naoki Koike, Kanagawa (JP); Kimihiro Wakabayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 534 days.

(21) Appl. No.: 12/952,357

(22) Filed: Nov. 23, 2010

(65) Prior Publication Data

US 2011/0235054 A1 Sep. 29, 2011

(30) Foreign Application Priority Data

Mar. 29, 2010 (JP) ................. P2010-076238

(51) Int. Cl.
*G01B 11/14* (2006.01)
(52) U.S. Cl.
USPC .......................................................... 356/620
(58) Field of Classification Search
None
See application file for complete search history.

(56) References Cited

U.S. PATENT DOCUMENTS

| | | | | |
|---|---|---|---|---|
| 5,023,917 A * | 6/1991 | Bose et al. | ..................... | 382/149 |
| 7,995,196 B1 * | 8/2011 | Fraser | ............................ | 356/71 |
| 8,054,473 B2 * | 11/2011 | Marschner | .................... | 356/636 |
| 2003/0078694 A1 * | 4/2003 | Watanabe et al. | ............. | 700/245 |
| 2005/0102060 A1 | 5/2005 | Watanabe et al. | | |
| 2006/0266244 A1 * | 11/2006 | Kruijt-Stegeman et al. | .. | 101/485 |
| 2008/0085033 A1 * | 4/2008 | Haven et al. | .................. | 382/151 |
| 2009/0108483 A1 * | 4/2009 | Suehira et al. | ................ | 356/401 |

FOREIGN PATENT DOCUMENTS

| | | |
|---|---|---|
| JP | 5-301183 | 11/1993 |
| JP | 11-156764 | 6/1999 |
| JP | 2005-55244 | 3/2005 |
| JP | 2005-138223 | 6/2005 |

* cited by examiner

*Primary Examiner* — Gregory J Toatley
*Assistant Examiner* — Juan D Valentin, II
(74) *Attorney, Agent, or Firm* — Sughrue Mion, PLLC

(57) ABSTRACT

An article recognition apparatus includes a marker having four or more unit pattern marks which are provided at a predetermined positional relationship on an article to be recognized and which are formed in such a way that a density pattern sequentially changes from a center position to a periphery of the pattern marker. The article recognition apparatus also includes an imaging tool that is disposed opposite the article to be recognized and that captures an image of the marker; a supporting mechanism that supports the imaging tool so as to enable setting of the imaging tool at least at a non-face-up measurement position; and a layout information recognition block that recognizes layout information about a position and an attitude of the article to be recognized.

9 Claims, 50 Drawing Sheets

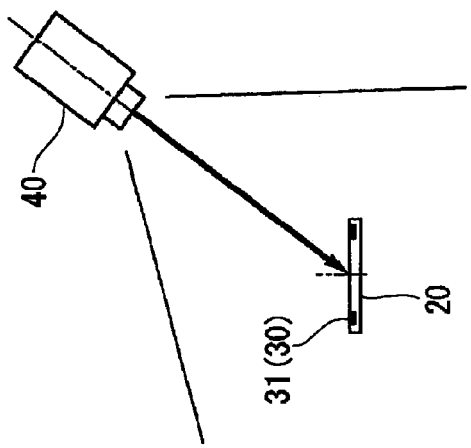
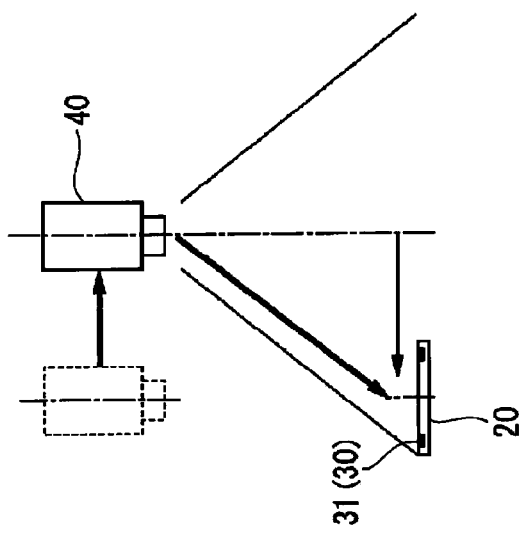
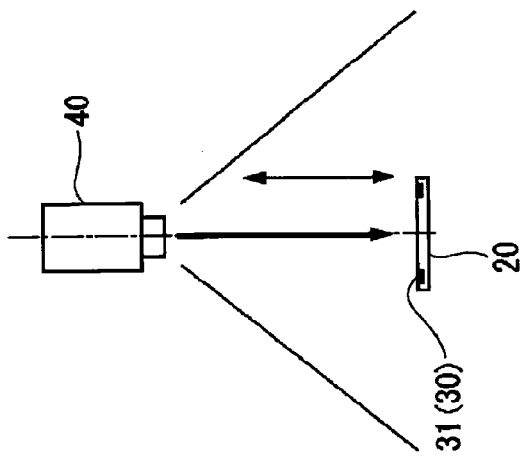

MEASURE POSITION AND ATTITUDE OF FIRST-STAGE SORTING TRAY

MOVE CAMERA TO POSITION WHERE HIGHLY ACCURATE MEASUREMENT IS POSSIBLE

MEASURE POSITION AND ATTITUDE OF SECOND-STAGE SORTING TRAY

GRIP COMPONENT

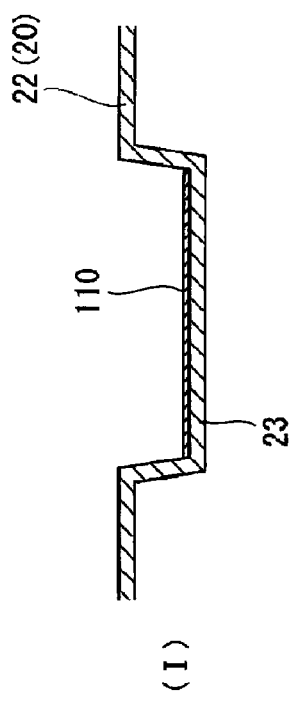
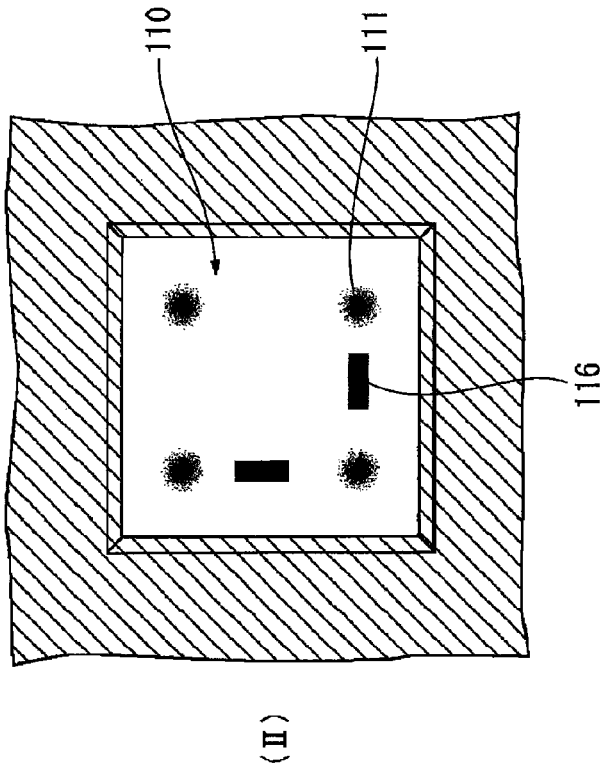
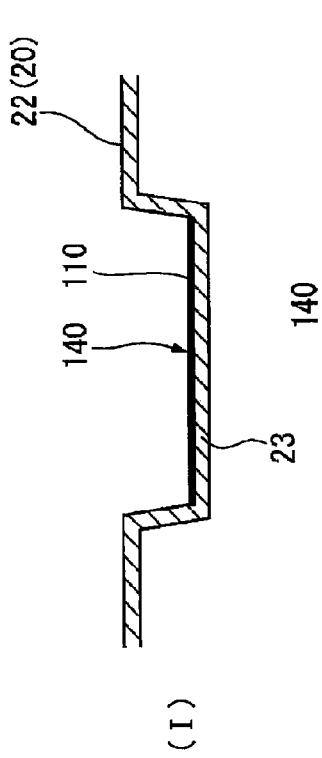
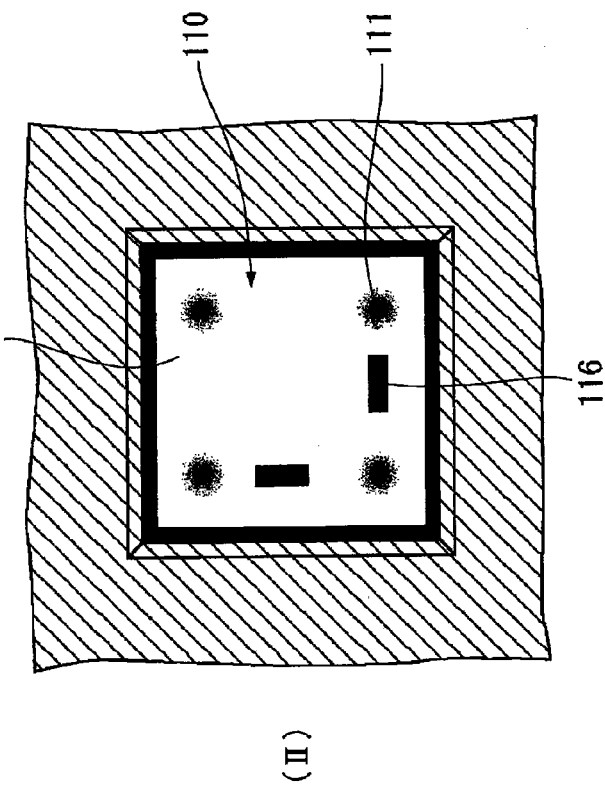

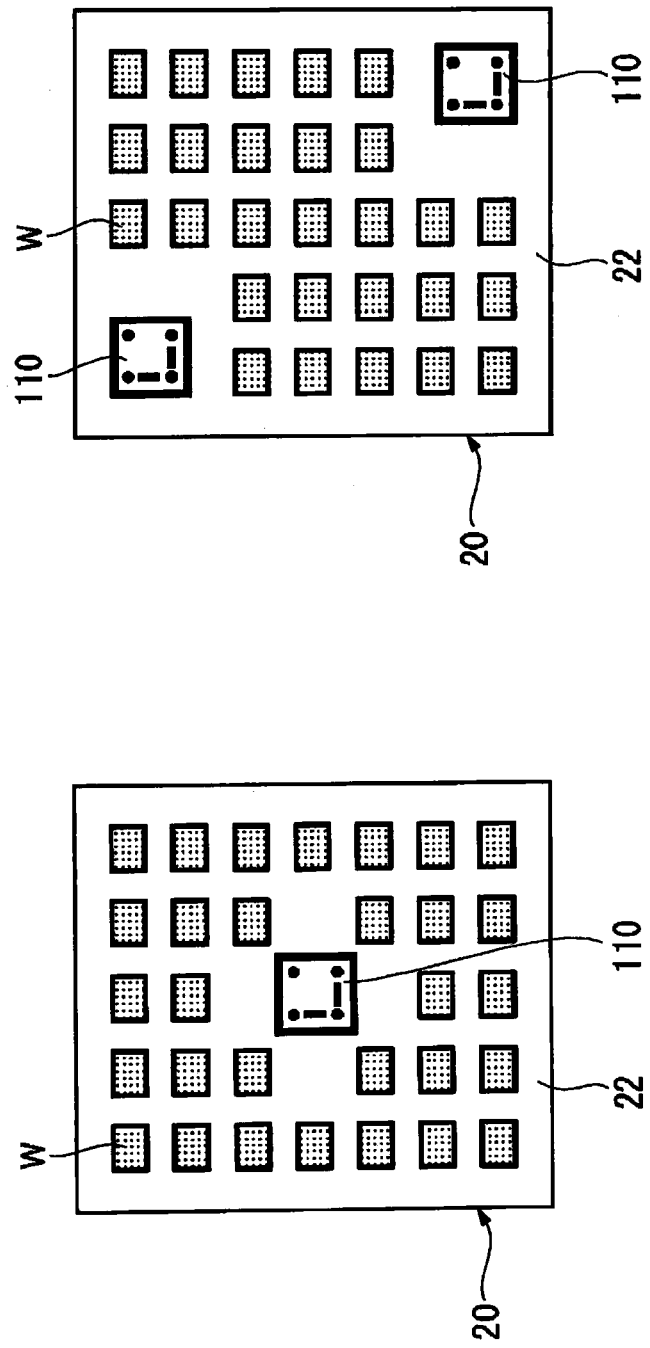

COMPLETION OF TAKE-OUT OF WORKPIECE
(OCCURRENCE OF EMPTY TRAY)

MEASURE LAYOUT OF EMPTY TRAY

GRIP EMPTY TRAY 151
(FILLED TRAY STORAGE SPACE)

152
(EMPTY TRAY STORAGE SPACE)

MOVE EMPTY TRAY TO EMPTY TRAY STORAGE SPACE 151
(FILLED TRAY STORAGE SPACE)

152
(EMPTY TRAY STORAGE SPACE)

MEASURE LAYOUT OF EMPTY TRAY STORAGE SPACE 151
(FILLED TRAY STORAGE SPACE)

152
(EMPTY TRAY STORAGE SPACE)

PILE UP EMPTY TRAY 151
(FILLED TRAY STORAGE SPACE)

152
(EMPTY TRAY STORAGE SPACE)

MEASURE POSITION AND ATTITUDE OF FIRST-STAGE PATTERN MARKERS

MOVE CAMERA TO POSITION WHERE HIGHLY ACCURATE MEASUREMENT IS POSSIBLE

MEASURE POSITION AND ATTITUDE OF SECOND-STAGE PATTERN MARKERS

GRIP COMPONENT

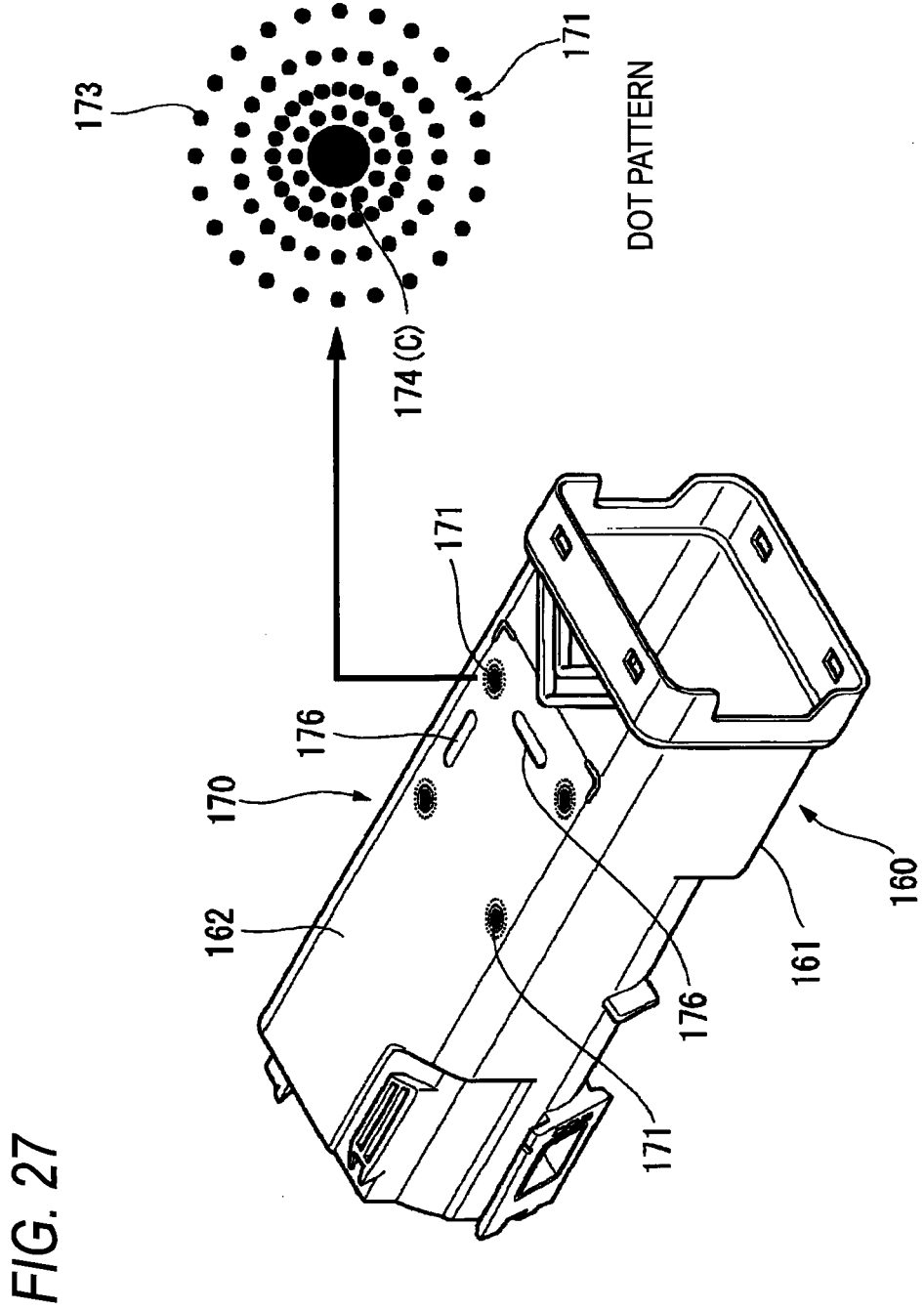

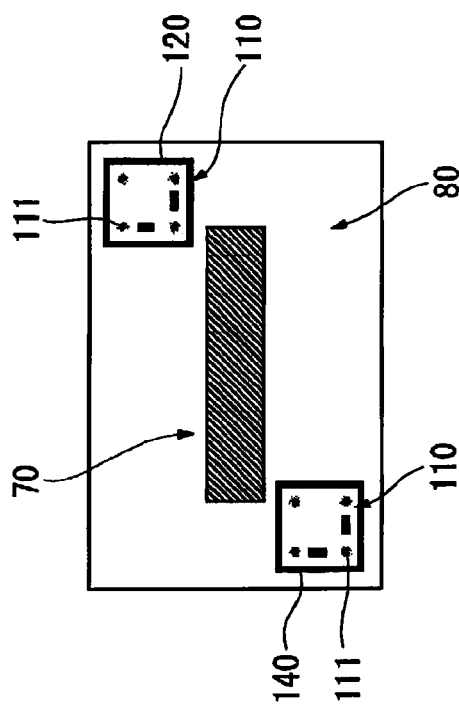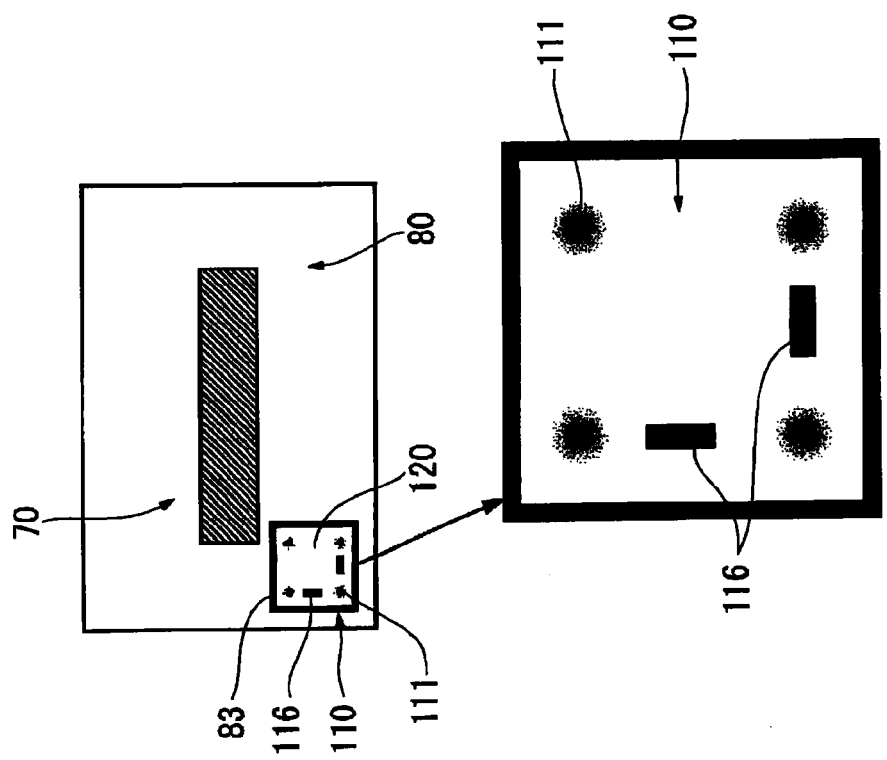

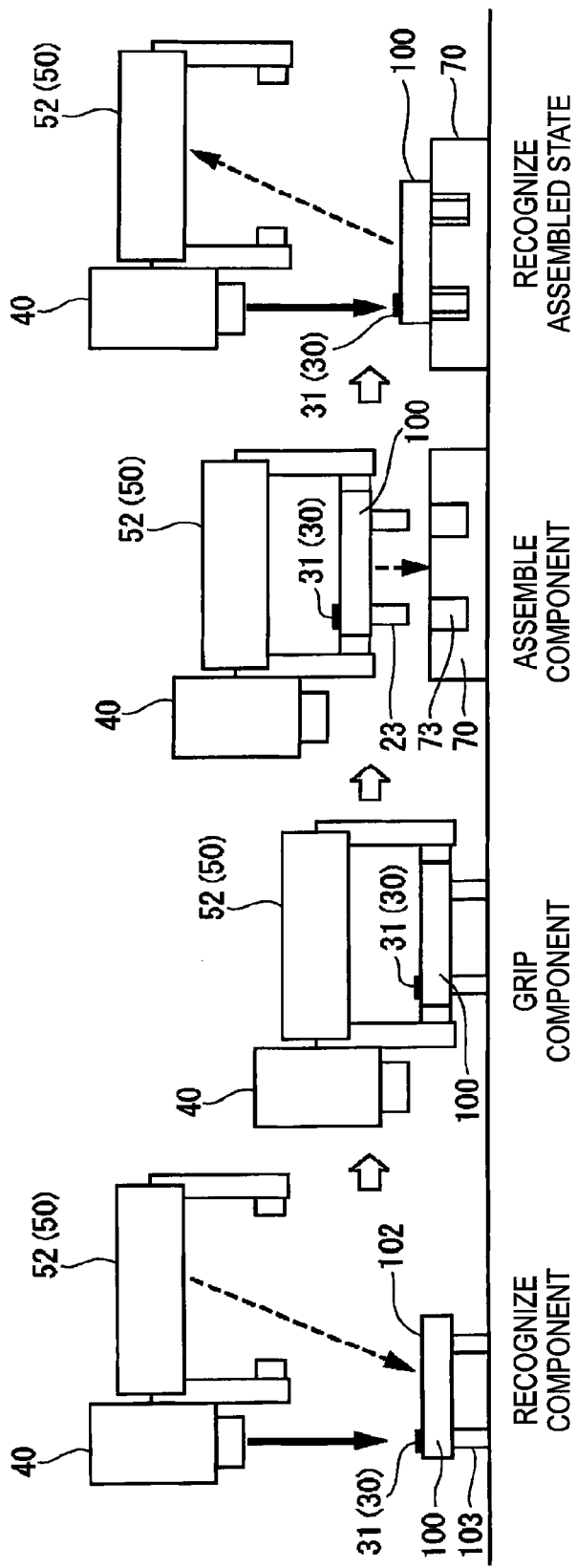

INCLINATION OCCURRED WITH REFERENCE TO Y AXIS

ROTATIONAL DISPLACEMENT OCCURRED WITH REFERENCE TO Z AXIS

LIFT OCCURRED IN Z-AXIS DIRECTION

POSITIONAL DISPLACEMENTS OCCURRED IN X-AXIS DIRECTION AND Y-AXIS DIRECTION

NORMALLY ASSEMBLED STATE

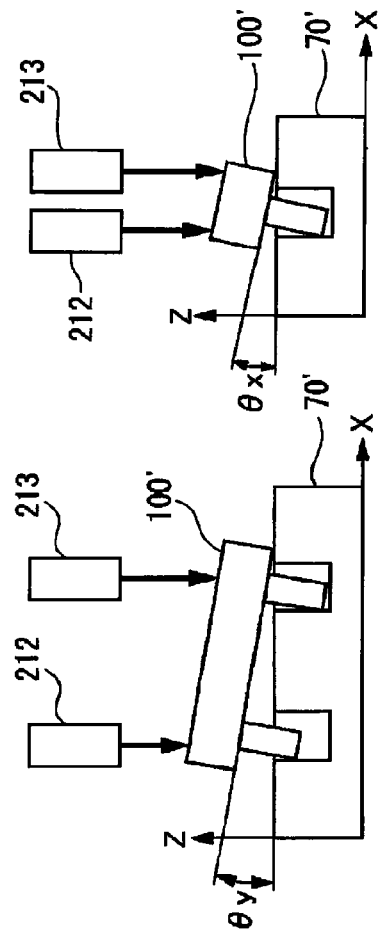
FIG. 44A LIFT OCCURRED IN Z-AXIS DIRECTION
FIG. 44B INCLINATIONS OCCURRED WITH REFERENCE TO X AND Y AXES
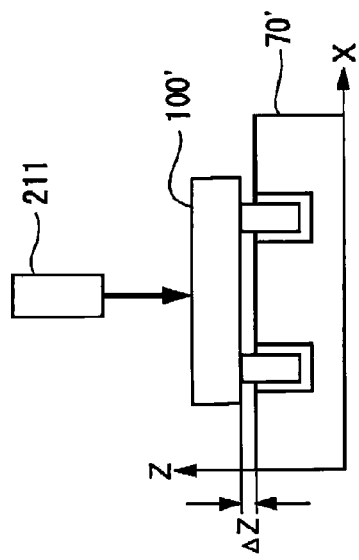
FIG. 44C POSITIONAL DISPLACEMENTS OCCURRED IN X-AXIS AND Y-AXIS DIRECTIONS
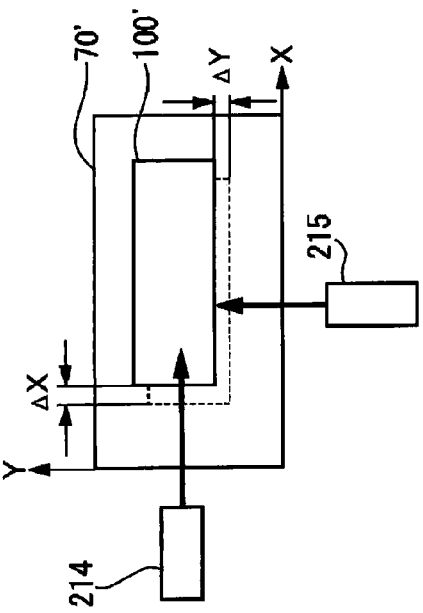
FIG. 44D ROTATIONAL DISPLACEMENT OCCURRED WITH REFERENCE TO Z AXIS

ARTICLE RECOGNITION APPARATUS AND ARTICLE PROCESSING APPARATUS USING THE SAME

CROSS-REFERENCE TO RELATED APPLICATION

This application is based on and claims priority under 35 USC 119 from Japanese Patent Application No. 2010-076238 filed on Mar. 29, 2010.

BACKGROUND

Technical Field

The present invention relates to an article recognition apparatus and an article processing apparatus using the same.

SUMMARY

According to an aspect of the invention, an article recognition apparatus includes:

a marker having four or more unit pattern marks which are provided at a predetermined positional relationship on an article to be recognized and which are formed in such a way that a density pattern sequentially changes from a center position to a periphery of the pattern marker;

an imaging tool that is disposed opposite the article to be recognized and that captures an image of the marker;

a supporting mechanism that supports the imaging tool so as to enable setting of the imaging tool at least at a non-face-up measurement position where an imaging plane of the imaging tool does not directly face up a surface of the marker provided on the article to be recognized and in a view field range of the imaging tool; and a layout information recognition block that recognizes layout information about a position and an attitude of the article to be recognized by use of at least imaging information about the marker whose image has been captured by the imaging tool placed at the non-face-up measurement position.

BRIEF DESCRIPTION OF THE DRAWINGS

Exemplary embodiments of the invention will be described in detail based on the following figures, wherein:

FIG. 8A is a descriptive view showing a configuration in which an imaging plane of a camera serving as an imaging tool is set at a face-up measurement position with respect to a point of center origin of the pattern marker, FIG. 8B is a descriptive view showing a configuration in which the imaging plane of the camera serving as the imaging tool is moved in parallel to the face-up measurement position shown in FIG. 8A, and FIG. 8C is a descriptive view showing a configuration in which the imaging plane of the camera serving as the imaging tool is placed at a non-face-up measurement position that is not parallel to an indication plane of the pattern marker;

FIG. 11 shows a processing process of the collection processing apparatus of the first exemplary embodiment, wherein

FIGS. 18A and 18B are descriptive views showing another example fixing of the pattern marker of a third exemplary embodiment, wherein (I) they are cross sectional descriptive views of the pattern marker, and (II) they are planar descriptive views of the pattern marker;

FIGS. 19A and 19B are descriptive views showing example layouts of the pattern marker used in the third exemplary embodiment;

FIG. 26 shows a collection processing apparatus serving as the article processing apparatus of a fourth exemplary embodiment, wherein

FIG. 27 is a descriptive view showing a structure for recognizing a toner cartridge as an example article to be collected used in a collection processing apparatus serving as an article processing apparatus of a fifth exemplary embodiment;

FIGS. 35A and 35B are descriptive views respectively showing modifications of the pattern marker on the assembly pallet provided in the assembly processing apparatus of the sixth exemplary embodiment;

FIG. 41 is a descriptive view schematically showing the assembly processing process shown in FIG. 40;

FIGS. 42A to 42D show layout information pertaining to positions and attitudes that may be inspected in the assembly inspection process, wherein FIG. 42A shows a lift occurred in a Z-axis direction, FIG. 42B shows an inclination occurred with reference to a Y axis, FIG. 42C shows positional displacements occurred in both X-axis and Y-axis directions, and FIG. 42D shows a rotational displacement occurred with reference to a Z axis;

FIGS. 44A to 44D show an example assembly inspection apparatus of a comparative mode, wherein FIG. 44A shows a lift occurred in the Z-axis direction, FIG. 44B shows inclinations occurred with reference to the X axis and the Y axis, FIG. 44C shows positional displacements occurred in both the X-axis direction and the Y-axis direction, FIG. 44D shows a mode for inspecting a rotational displacement occurred with reference to the Z axis;

FIG. 49 shows principal blocks of the assembly processing apparatus (a connector device) serving as the article processing apparatus of the ninth exemplary embodiment, wherein

DETAILED DESCRIPTION

Summary of Exemplary Embodiments

Figure 1A:
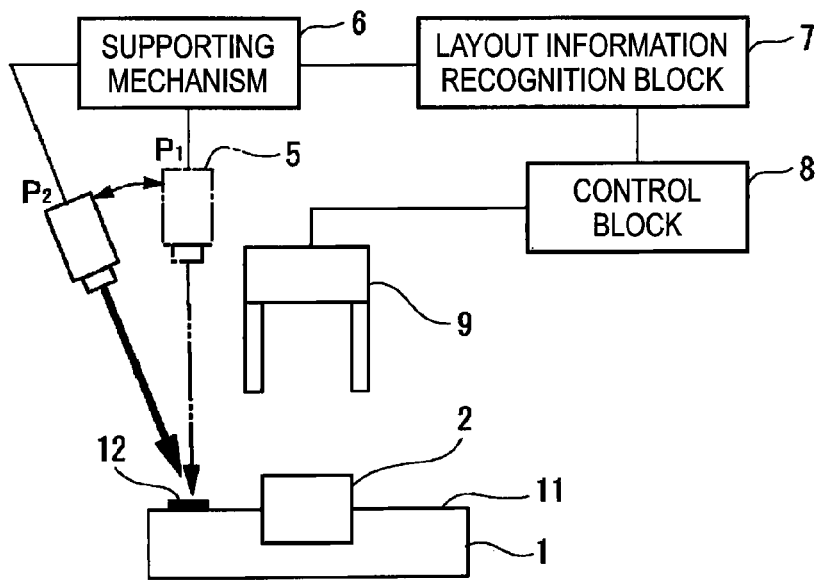
FIG. 1A is a descriptive view showing an overview of an exemplary embodiment of an article recognition apparatus to which the present invention applies and an article processing apparatus using the same.
Figure 1B:
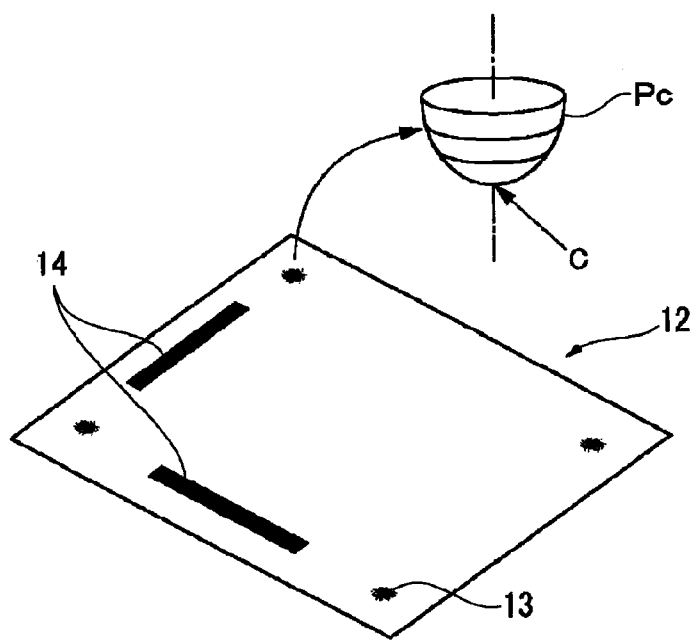
FIG. 1B is a descriptive view showing an example marker used in the exemplary embodiment.

In relation to modes of implementation, as shown in FIGS. 1A and 1B, an article processing apparatus includes a marker 12 having four or more unit pattern marks that are provided at a predetermined positional relationship on an article to be recognized (a recognition target article) 1 and that are formed in such a way that a density pattern Pc sequentially changes from a center position C to a periphery of the pattern marker; an imaging tool 5 that is disposed opposite the recognition target article 1 and that captures an image of the marker 12; a supporting mechanism 6 that supports the imaging tool 5 so as to enable setting of the imaging tool 5 at least at a non-face-up measurement position $P_2$ where an imaging plane of the imaging tool 5 does not directly face up a surface (a recognition reference plane 11) of the marker 12 provided on the recognition target article 1 that is in a view field range of the imaging tool 5; and a layout information recognition block 7 that recognizes layout information about a position and an attitude of the recognition target article 1 by use of at least imaging information about the marker 12 whose image has been captured by the imaging tool 5 placed at the non-face-up measurement position $P_2$.

In connection with such technical means, the marker 12 requires at least four unit pattern marks 13. In the case of three unit pattern marks 13, plural of three-dimensional positions may exist in relation to an attitude, which arouses a concern that the three-dimensional positions may not be specified.

Any mark is used as the unit pattern mark 13 of the marker 12, so long as the density pattern Pc sequentially changes. The unit pattern mark is not limited to a configuration in which the center position C exhibits a higher density than that achieved at a periphery of the pattern mark. The unit pattern mark also includes a configuration in which the center position C exhibits a lower density than does the periphery of the pattern mark. A technique for displaying a change in the density pattern of the unit pattern mark 13 with a gradation is also mentioned. However, displaying the change in density pattern is not limited to the gradation. It is also possible to display the change in the form of dot images (dots). Although the unit pattern marks 13 may directly be drawn by use of a printing technique, the marks may also be provided by means of imprinting utilizing retroreflection.

Further, although the imaging tool 5 may be used in numbers, one imaging tool is preferable in view of simplification of an apparatus configuration.

Furthermore, the supporting mechanism 6 may employ a configuration in which the imaging tool 5 is stationarily provided at the non-face-up measurement position $P_2$. There may also be adopted another configuration for movably supporting the imaging tool 5 so as to be able to effect measurement at the face-up measurement position $P_1$ at which the imaging plane of the imaging tool 5 directly faces up the surface of the marker 12 provided on the recognition target article 1 and the non-face-up measurement position $P_2$. Alternatively, there may also be adopted a configuration in which the imaging tool 5 is movably supported so as to be able to effect measurement at the non-face-up measurement position $P_2$ in plural of steps.

In a cases where the imaging tool 5 is set at the "face-up measurement position $P_1$," even when a minute change has arisen in an angle of the marker 12, a resultant change in an image is small; therefore, measurement accuracy is low. In this regard, in a case where the imaging tool 5 is set at the "non-face-up measurement position $P_2$," when a minute change has arisen in the angle of the marker 12, a resultant change in an image is larger when compared with that occurred when the imaging tool is set at the "face-up measurement position $P_1$," and hence measurement accuracy is accordingly high.

Furthermore, the layout information recognition block 7 may also adopt any recognition technique, so long as the technique is an algorithm that recognizes the layout information about the position and the attitude of the recognition target article 1.

A preferred configuration of the marker 12 is now described.

First, a configuration for displaying a change in the density pattern Pc of the unit pattern mark 13 in the form of a dot image. In the present configuration, a dot image indication is employed. Hence, an inkjet image forming apparatus or an electrophotographic imaging apparatus may form the unit pattern mark 13 of the marker 12.

Another configuration of the marker 12 includes four unit pattern marks 13 provided on a same plane of the recognition target article 1. For instance, a position and an attitude of the recognition target article 1 may be determined without making one of the four unit pattern marks 13 on a plane differing from a plane on which the three unit pattern marks are provided.

Moreover, from the viewpoint of easy changing of the marker 12, it is better to form the marker displayed on a card that is removably attached to the recognition target article 1.

Further, when the recognition target article 1 includes different types of articles, it is better to provide the marker 12 with four unit pattern marks 13 or more and type indication marks 14 used for recognizing type information other than layout information about a position and an attitude of the article to be recognized, as shown in FIG. 1B.

A preferred configuration of the supporting mechanism 6 also includes moving the imaging tool 5 to both a first measurement position at which the marker 12 provided on the recognition target article 1 enters a view field range of the imaging tool 5 and at which measurement is performed such that an overhead view of the marker may be captured and a second measurement position made up of the non-face-up measurement position $P_2$ at which the marker 12 enters the view field range of the imaging tool 5 and at which measurement is performed at a higher degree of accuracy than at the first measurement position; and measuring the marker 12 at each of the measurement positions.

In this configuration, rough measurement may be performed at the first measurement position, and highly accurate measurement may be performed at the second measurement position. In this regard, the present configuration is preferable.

The essential requirement is that the second measurement position be the non-face-up measurement position $P_2$ at which measurement is performed with a much higher degree of accuracy than the degree of accuracy of measurement performed at the first measurement position. The first measurement point may be either the face-up measurement position $P_1$ or the non-face-up measurement position $P_2$. For instance, when the first measurement position is the non-face-up measurement position $P_2$, the only requirement for the first measurement position and the second measurement position is that there may be captured a change in at least an angle of the imaging plane of the imaging tool 5 with respect to the surface of the marker 12 on the recognition target article 1 or a change in a distance between the imaging plane of the imaging tool 5 and the surface of the marker 12.

Moreover, the second measurement position made up of the non-face-up measurement position $P_2$ is usually set at one location. However, on occasion of ultra-accurate measurement or measurement of a micro-component, the second measurement position may be set at plural of locations, as required, and measurement may also be performed at the second measurement position in plural of stages.

In relation to a configuration adopting plural of measurement method, a preferred configuration for the layout information recognition block is a configuration including: calculating layout information about a position and an attitude of the marker on the recognition target article from imaging information acquired at the first measurement position by means of the imaging tool; determining from a calculation result the second measurement position to which the supporting mechanism moves the imaging tool; and recognizing layout information about the position and the attitude of the marker on the basis of imaging information acquired by the imaging tool at the second measurement position.

In the present configuration, even when a change has occurred in the position and the attitude of the marker 12 on the recognition target article 1, the second measurement position assuming a predetermined relative positional relationship with the recognition target article 1 may be determined by calculating the layout information about the recognition target article 1 according to the imaging information acquired by the imaging tool 5 at the first measurement position. The present configuration is preferable in this respect.

Moreover, an article processing apparatus is built, so long as the article recognition apparatus is utilized.

The article processing apparatus includes the above-mentioned article recognition apparatus; a control block 8 that generates a control signal from the layout information about the position and the attitude of the recognition target article 1 recognized by the article recognition apparatus and that controls processing operation for an article to be processed (a processing target article) 2 identical with the recognition target article 1 or a processing target article 2 located at a predetermined positional relationship with respect to the recognition target article 1; and a processing mechanism 9 that subjects the processing target article 2 to processing operation according to the control signal generated by the control block 8.

In such a technical means, the "processing target article 2" is not limited to a configuration in which the processing target article is identical with the "recognition target article 1" and also includes another article assuming a predetermined positional relationship with respect to the recognition target article 1.

The processing mechanism 9 designates; for instance, a manipulator, such as a robot hand.

Furthermore, the expression "processing operation for the processing target article 2" broadly implies various processing operations, such as gripping the processing target article 2, assembling the processing target article 2, and inspecting an assembled state of the processing target article 2.

Moreover, a supporting mechanism 6 for the imaging tool 5 may include a configuration in which the processing mechanism 9 doubles also as a supporting mechanism for the imaging tool 5.

The present invention is hereunder described in more detail by reference to exemplary embodiments shown in the accompanying drawings.

First Exemplary Embodiment

Figure 2:
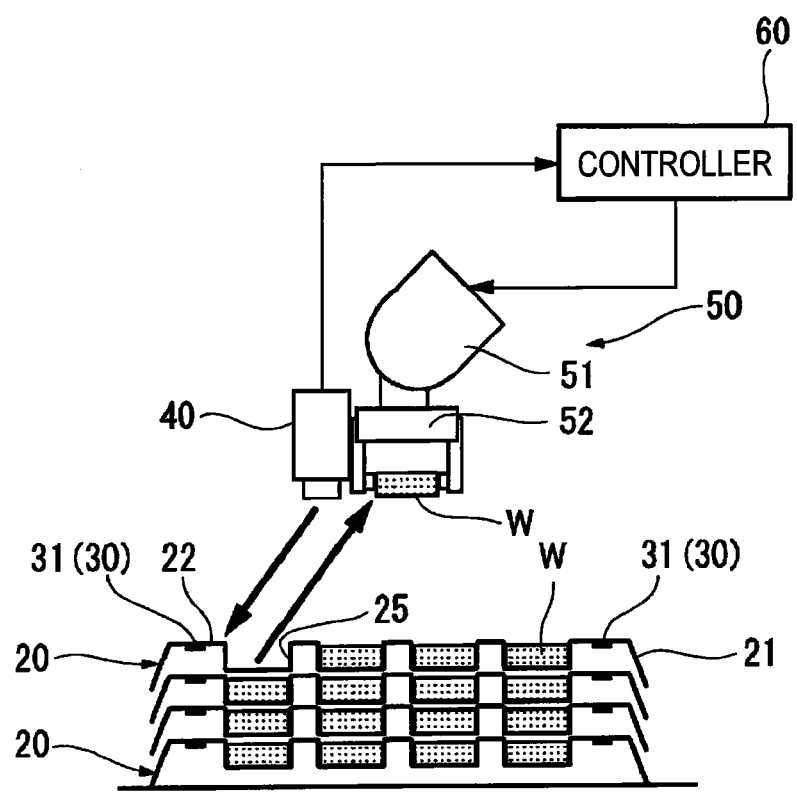
FIG. 2 is a descriptive view showing an overall structure of a collection processing apparatus serving as the article processing apparatus of the first exemplary embodiment.

FIG. 2 is a descriptive view showing an overall structure of a collection processing apparatus of a first exemplary embodiment.

<Overall Structure of a Collection Processing Apparatus>

In the drawing, the collection processing apparatus is for sequentially collecting workpieces W that are articles to be collected (collection target articles) aligned on a sorting tray 20 and moving the workpieces to a predetermined area.

Figure 10:
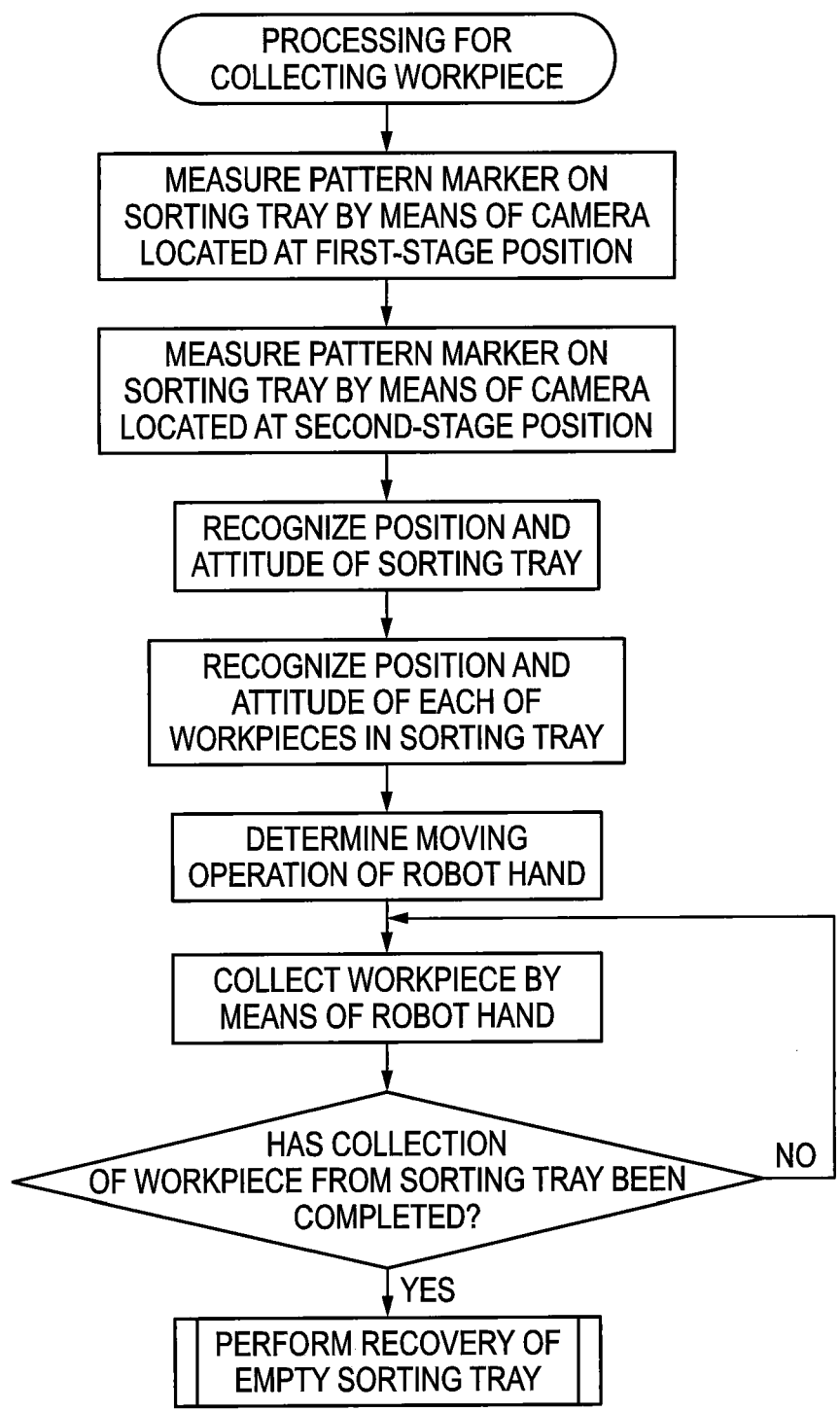
FIG. 10 is a flowchart showing an assembly processing process of the assembly processing apparatus of the first exemplary embodiment.

In the present exemplary embodiment, the collection processing apparatus includes: a pattern marker 30 serving as a marker provided for recognizing layout information about a position and an attitude of a sorting tray 20; a camera 40 that captures an image of the pattern marker on the sorting tray 20; a robot 50 that collects the workpiece W on the sorting tray 20 and moves the workpiece to a predetermined area; and a controller 60 that controls imaging timing of the camera 40, that receives an input of imaging information from the camera 40, thereby recognizing layout information about the position and the attitude of the sorting tray 20, and that controls motion of the robot 50 on the basis of the recognized layout information and along a flowchart shown in FIG. 10 which will be described later.

Figure 3A:
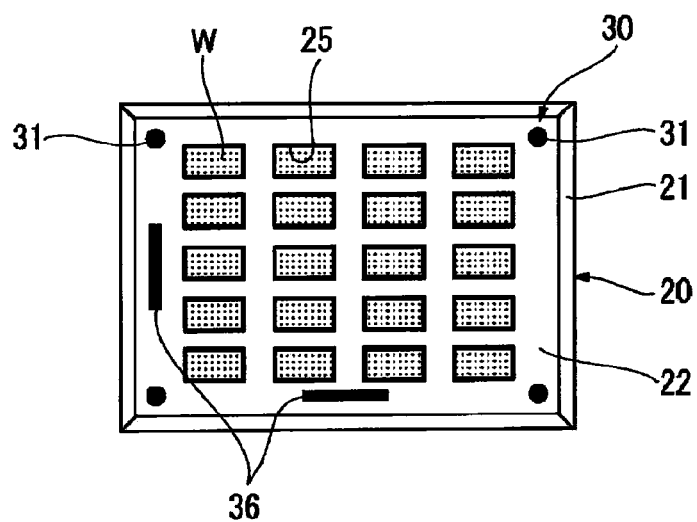
FIG. 3A is a descriptive view showing an example assembly pallet provided with a pattern marker used in the first exemplary embodiment.

In the present exemplary embodiment, as shown in FIGS. 2 and 3A, the sorting tray 20 has a dish-shaped tray main body 21 that may be piled up. Workpiece storage indentations 25 aligned in vertical and horizontal directions are formed in the tray main body 21. The workpiece W is stored, in a collectable manner, in each of the workpiece storage indentations 25.

The robot 50 is equipped with a robot hand 52 that may perform gripping action and that is provided at an extremity of a robot arm 51 which may be actuated by means of multiaxial joints. Processing operation to be performed by the robot hand 52 is instructed in accordance with input locus information, such as a motion capture. A correction is made to the processing operation performed by the robot hand 52 according to the imaging information received from the camera 40.

In the exemplary embodiment, the camera 40 is fixed to a portion of the robot hand 52 and is placed at a predetermined measurement position by the robot hand 52.

<Pattern Marker>

In the exemplary embodiment, as shown in FIG. 3A, the pattern marker 30 takes a top surface 22 of the tray main body 21 of the sorting tray 20 as a recognition reference plane. The pattern marker 30 has unit pattern marks 31 placed respectively at four corners of the top surface 22 and type indication marks 36 provided along two adjacent sides of the top surface 22 of the tray main body 21.

Figure 3B:
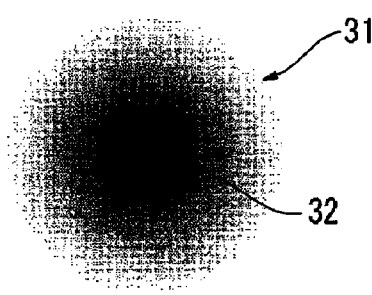
FIGS. 3B and 3C are descriptive views showing an example structure of a unit pattern mark that is one element of the pattern marker.
Figure 4A:
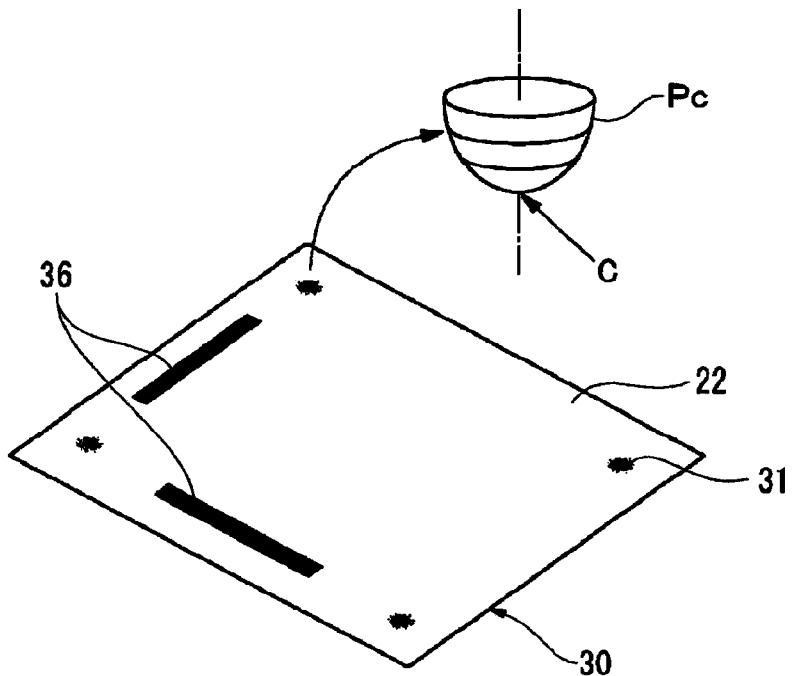
FIG. 4A is a descriptive view schematically showing a characteristic of the unit pattern mark of the pattern marker used in the first exemplary embodiment.

As shown in FIGS. 3B and 4A, one typical configuration of each of the unit pattern marks 31 is illustrated as a gradation 32 having a density pattern Pc that exhibits the highest density at a center position C and that sequentially changes so as to become less dense with an increasing distance toward a periphery of the mark.

Figure 3C:
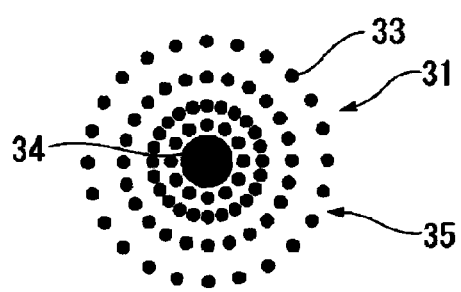

As shown in FIGS. 3C and 4A, another typical configuration of the unit pattern mark 31 is illustrated as a dot pattern that exhibits the most dense distribution of dots 33 at the center position C, thereby forming a high density region 34, and a distribution of the dots 33 which becomes gradually coarser toward a periphery of the dot pattern, thereby forming a low density region 35. In this case, the density distribution may be given to the unit pattern mark by means of changing a diameter size of the dot 33, spacing between the dots, and a layout position.

In particular, the dot pattern configuration is preferable, because the dot pattern is easily made by means of printing operation utilizing an inkjet imaging forming apparatus or an electrophotographic image forming apparatus.

Meanwhile, for instance, when workpieces W to be housed include plural of types (in terms of; for instance, color types, sizes, and the like), type indication marks 36 act as ID (identification) indications used for finding matching with workpieces W of a corresponding type. In the present exemplary embodiment, the type indication marks 36 are provided at two locations but may also be provided at one location. Alternatively, there arises no problem even when the type indication marks are placed at three locations or more in a split manner.

—Comparison with an LED Indication Plate—

Figure 4B:
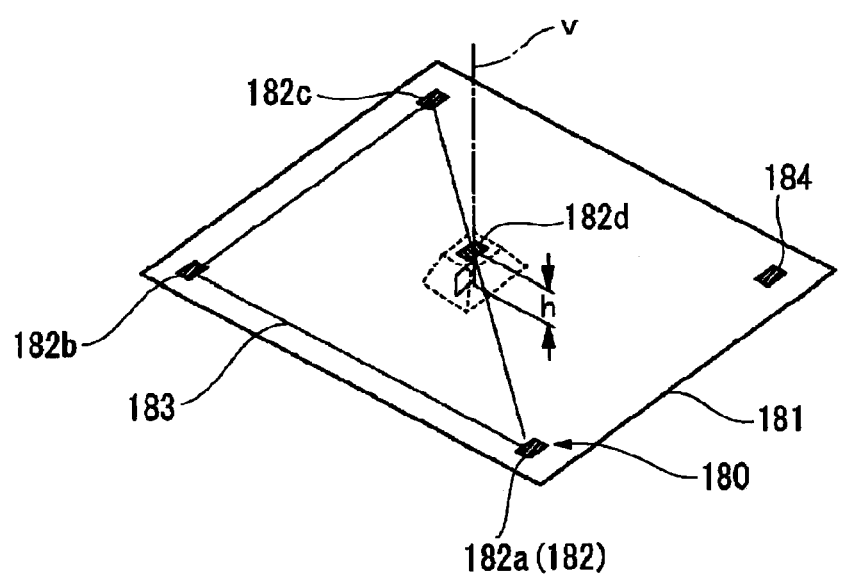
FIG. 4B is a descriptive view showing an example structure of a marker used in a comparative mode.

Unlike the pattern marker 30, an LED indication plate 180 shown in FIG. 4B has four LEDs 182 (182a to 182d) provided on a substrate 181. The three LEDs 182 (182a to 182c) of the four LEDs 182 are placed on a same plane of the substrate 181. The remaining one LED 182 (182d) is set on a vertical line "v" that is spaced "h" apart from a triangular reference plane 183 including the three LEDs 182 as apexes. A position and an attitude of the triangular reference plane 183 are determined from a positional relationship between the triangular reference plane 183 and the LED 182 (182d) on the vertical line "v." Reference numeral 184 designates an LED for identification.

The position and the attitude of the sorting tray 20 are surely recognized even by means of the LED indication plate 180; however, an electric power source for enabling use of the LED 182 is required. Therefore, the pattern marker 30 of the present exemplary embodiment is preferable in terms of such a power source being unnecessary.

Figure 5:
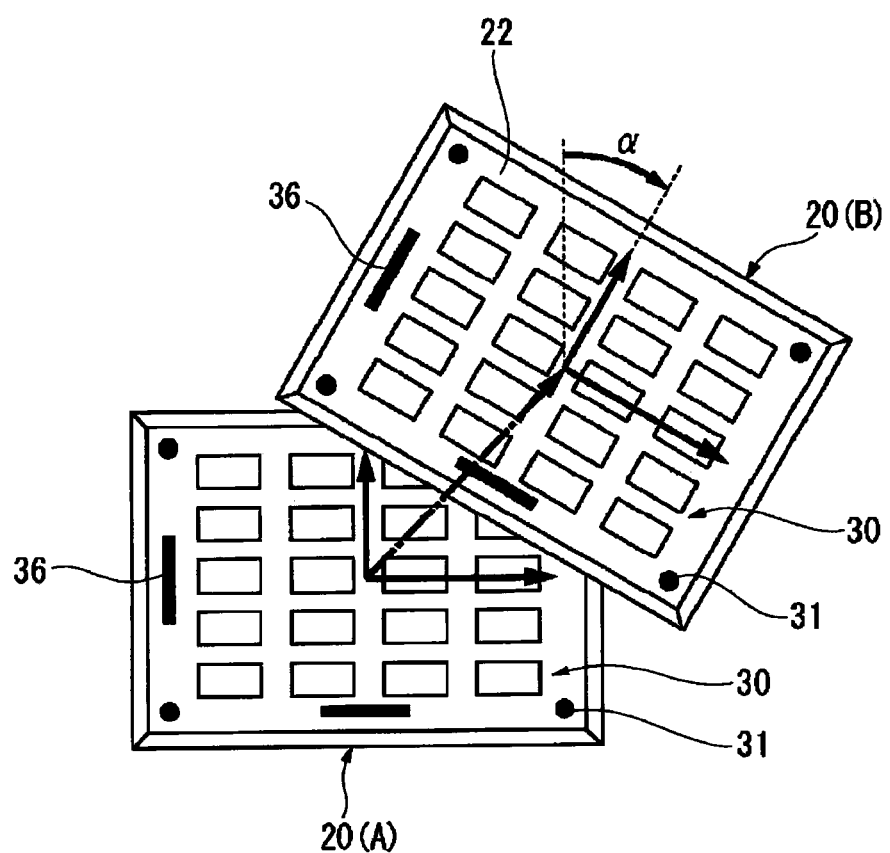
FIG. 5 is a descriptive view showing a principle on the basis of which a position and an attitude of an assembly component are determined by means of the pattern marker used in the first exemplary embodiment.

The LED indication plate 180 adopts a technique for enhancing accuracy of recognition of the position and the attitude by placing the four LEDs 182 in a three-dimensional manner. However, in the pattern marker 30, each of the unit pattern marks 31 has a density distribution whose density sequentially changes toward its periphery from its center position C. Therefore, the center position C of the density distribution (i.e., a point where the highest density is exhibited) may be calculated with high accuracy by means of a density distribution approximation expression. Therefore, even when four unit pattern marks 31 are placed on a same plane along with high accuracy of recognition of the unit pattern marks 31, the position of an apex corresponding to the center position C of the four unit pattern marks 31 is recognized. As a result, even if the sorting tray 20 has changed from a position A to a position B in conjunction with occurrence of a rotation through a rotation angle α as shown in FIG. 5, the position and the attitude of the top plane 22 that is a recognition reference plane of the sorting tray 20 will accurately be recognized.

In the present exemplary embodiment, the unit pattern marks 31 are provided in number of four on the same plane. However, the number of unit pattern marks is not limited to four. The unit pattern marks 31 may also be provided at; for instance, arbitrary six points. Specifically, the unit pattern marks may be selected as required, so long as the marks enable recognition of a three-dimensional position and a three-dimensional attitude of the sorting tray. The essential requirement is to provide the unit pattern marks 31 in number of four or more, and locations where the unit pattern marks 31 are to be placed are not limited to a same plane but may also be set over different planes.

—Example Generation of the Pattern Marker—

Figure 6:
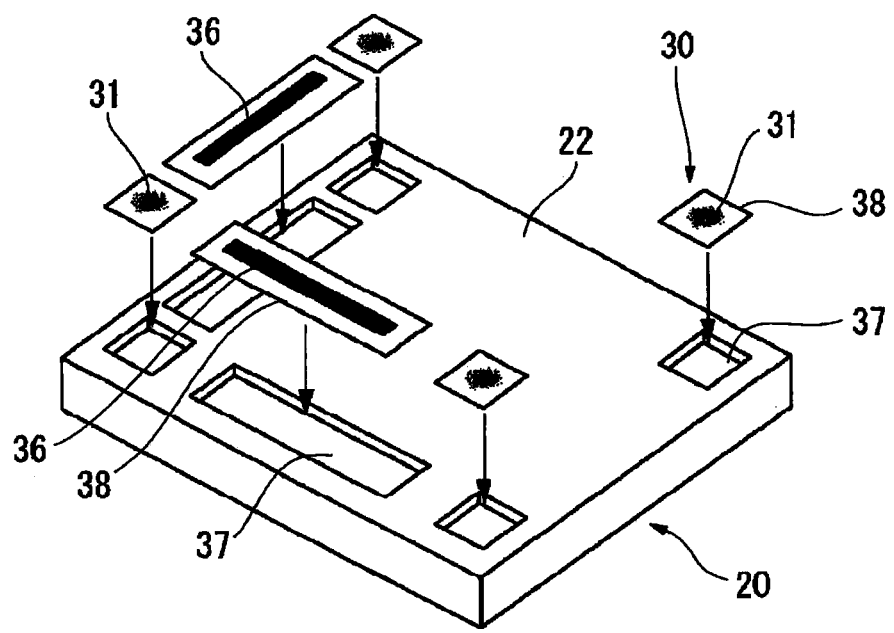
FIG. 6 is a descriptive view showing an example manufacture of the pattern marker used in the first exemplary embodiment.

In the present exemplary embodiment, as shown in; for instance, FIG. 6, the pattern marker 30 includes attachment indentations 37 respectively to be provided at four corners and along two sides of the top surface 22 of the sorting tray 20; and labels 38, each of which is printed with the unit pattern mark 31 and the type indication mark 36, are affixed to the respective attachment indentations 37. At this time, for instance, the depth of each of the attachment indentations 37 is selected so as to become equal to the thickness of each of the labels 38. The unit pattern marks 31 and the type indication marks 36 are set so as to become flush with the top surface 22 that serves as the recognition reference plane. Although the pattern marker 30 is set so as to become flush with the top surface 22 that is to serve as the recognition reference plane, the pattern marker 30 does not always need to become flush with the top surface 22. Further, in the present exemplary embodiment, the labels 38 are affixed to the respective attachment indentations by way of the attachment indentations 37. However, the labels may also be affixed directly to the top surface 22 that is to serve as a recognition reference plane, without involvement of the attachment indentations 37.

Moreover, in the present exemplary embodiment, it is desirable to place the unit pattern marks 31 of the pattern marker 30 while spaced apart from respective edges of the top surface 22 of the sorting tray 20 by a certain extent.

Figure 7:
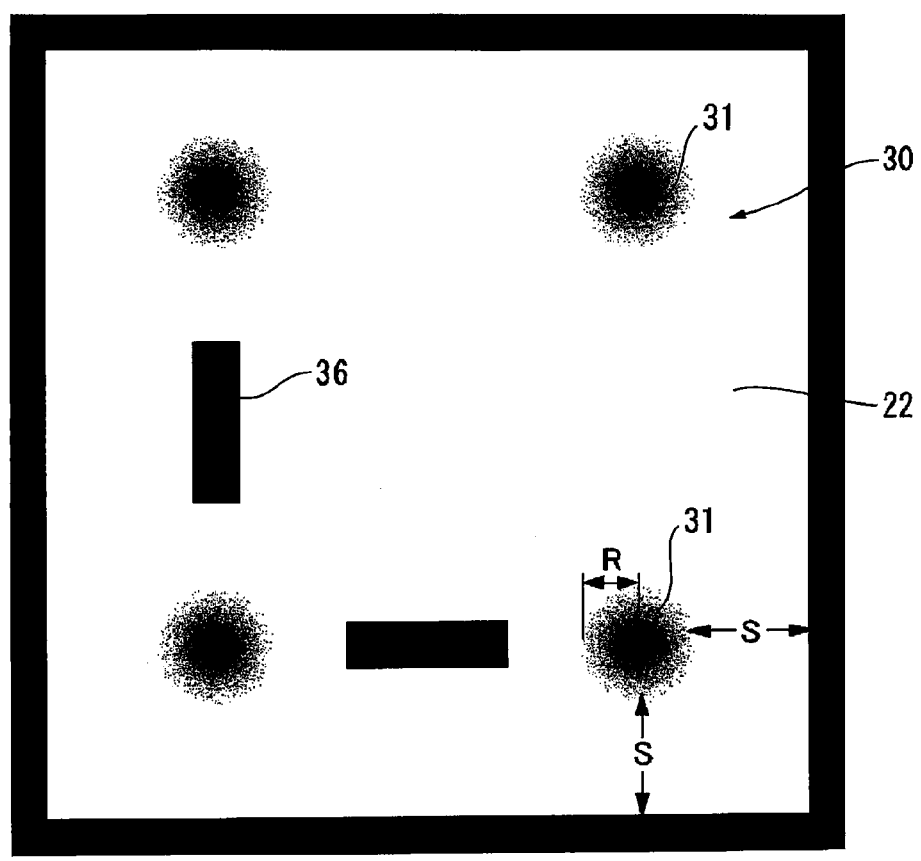
FIG. 7 is a descriptive view showing an example structure and dimensions of the pattern marker used in the first exemplary embodiment.

For instance, provided that the radius of the unit pattern mark 31 is taken as R and that an interval between the outermost contour of the unit pattern mark 31 and the edge of the top plane 22 is taken as S, fulfillment of S>2R is desirable as shown in FIG. 7. The relationship is based on an algorithm for detecting the center position C of the unit pattern mark 31 with high accuracy. A relationship of S>2R is fulfilled in such a way that a rectangular detection window to be superposed on a circular pattern of the unit pattern mark 31 does not overlap an edge (indicated by a black edge) of the top surface 22 of the sorting tray 20. As a matter of course, a layout of the unit pattern mark 31 may arbitrarily be set, so long as a different detection algorithm is used for the pattern marker 30.

<Measurement Position of the Camera>

In the present exemplary embodiment, the camera 40 is disposed opposite the pattern marker 30 in order to make it possible to capture an image of the pattern marker 30 on the sorting tray 20.

When study of a measurement position of the camera 40 achieved is performed at this time, configurations shown in FIGS. 8A to 8C are mentioned.

First, the configuration shown in FIG. 8A is for a case where a center position of an imaging plane (i.e., a center position of a view field range) of the camera 40 includes the center position of the four unit pattern marks 31 of the pattern marker 30 on the sorting tray 20 and where the center position is a face-up measurement position where the center position directly faces up to the top surface 22 that is the recognition reference plane.

The configuration induces a concern about deterioration of accuracy of measurement of a distance between the camera 40 and the pattern marker 30.

Figure 9A:
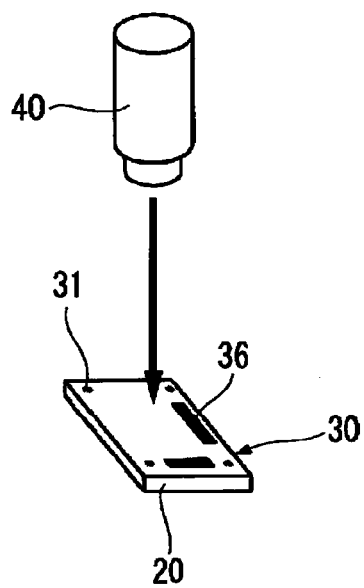
FIG. 9A is a descriptive view schematically showing a configuration in which the imaging plane of the camera serving as the imaging tool is placed at the face-up measurement position with respect to the point of center origin of the pattern marker.
Figure 9B:
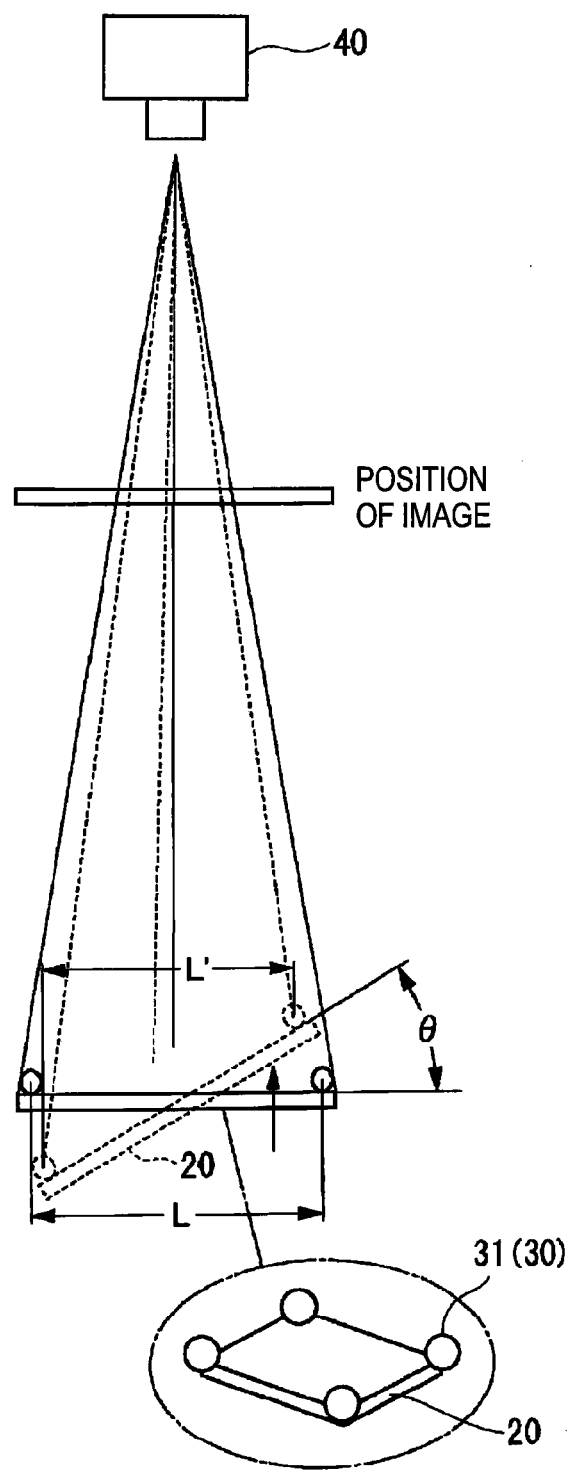
FIG. 9B is a descriptive view showing measurement accuracy achieved in the case shown in FIG. 9A.

As shown in FIGS. 9A and 9B, when the camera 40 faces up to the pattern marker 30, a widthwise dimension between the unit pattern marks 31 of the pattern marker 30 is taken as an image size L to be captured by the camera 40. Further, if a change in image size occurred when the pattern marker 30 on the top surface 22 that is a recognition reference plane of the sorting tray 20 is minutely changed by an amount of θ is taken as L', a relationship of L'=L×cos Φ is Fulfilled.

It is understood from the above that the change L' in image size becomes smaller than the original image size L, so that measurement accuracy will be deteriorated.

Next, the configuration shown in FIG. 8B relates to a case where the camera 40 is shifted from the position shown in FIG. 8(A) in parallel with the surface of the pattern marker 30 in such a way that the center position of the view field range of the camera 40 becomes offset from the center position C of the four unit pattern marks 31 of the pattern marker 30, to thus become offset from the face up measurement position shown in FIG. 8A.

In this case, when compared with the accuracy of measurement achieved in the case shown in FIG. 8A, the accuracy of measurement of the camera 40 is enhanced. However, the pattern marker 30 comes to a position that is offset from the center position C of the view field range of the camera 40, thereby inducing a concern that measurement accuracy might be deteriorated under influence of lens distortion of the camera 40. At this time, even when a correction is made to lens distortion, measurement accuracy tends to fall at this time. Therefore, it is preferable to take an additional remedial measure.

On the contrary, a configuration shown in FIG. 8C relates to a case where the imaging plane of the camera 40 and the surface of the pattern marker 30 (equivalent to the top surface 22 of the assembly component 20 that is the recognition reference plane) do not face up to each other and where the center of the view field range of the camera 40 is placed in alignment with the center position of the four unit pattern marks 31 of the pattern marker 30. Namely, the configuration corresponds to a case where the imaging plane of the camera 40 is previously inclined at a predetermined angle with respect to the recognition reference plane of the pattern marker 30 as shown in FIG. 8C, so that measurement accuracy of the camera 40 is enhanced. Namely, on the assumption of cases shown in FIGS. 9A and 9B, the configuration shown in FIG. 8C may be considered to be a case where the imaging plane is tilted by an image size L'. A change in image size is considered to come to L as a result of the imaging plane having turned through θ. In this case, the change in image size is L=L'/cos θ. Accordingly, as the change in θ becomes larger, a change in the value of cos θ also becomes larger. A change in image size is accordingly given as a larger change.

Therefore, in the configuration shown in FIG. 8C, the measurement accuracy of the camera 40 is understood to be enhanced.

In the present exemplary embodiment, two-stage measurement involving the face-up measurement position shown in FIG. 8A and the non-face-up measurement position shown in FIG. 8C is adopted in connection with the measurement position of the camera 40 (see FIG. 11).

<Workpiece Collection Processing>

Workpiece collection processing performed by the collection processing apparatus of the present exemplary embodiment is now described.

First, the controller 60 performs processing pertaining to a flowchart shown in FIG. 10 and transmits a control signal to the camera 40 and the robot 50.

In the drawing, the controller 60 first measures the pattern marker 30 on the sorting tray 20 by means of the camera 40; subsequently recognizes layout information about a position and an attitude of the sorting tray 20; and indirectly recognizes the layout information about positions and attitudes of respective workpieces W housed in the sorting tray 20.

Figure 11A:
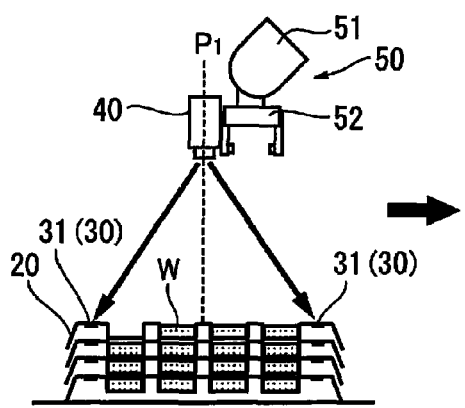
FIG. 11A is a descriptive view showing a process of measuring a position and an attitude of a first-stage sorting tray.
Figure 11B:
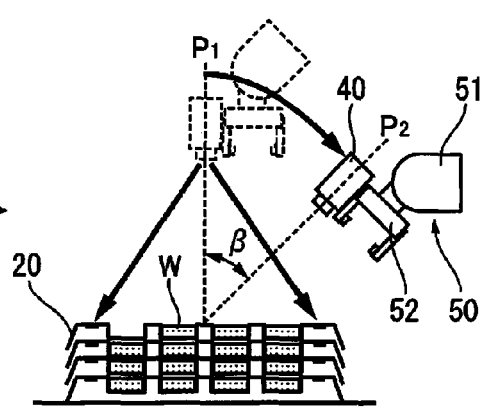
FIG. 11B is a descriptive view showing a process of a shift to a position where high accuracy measurement is possible.
Figure 11C:
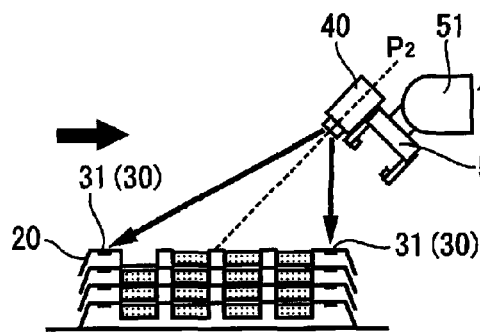
FIG. 11C is a descriptive view showing a process of measuring a position and an attitude of a second-stage sorting tray.

In particular, in the present exemplary embodiment, the measurement method of the camera 40 involves the following operations. Namely, as shown in FIG. 11A, the camera 40 situated at a first-stage position (i.e., the face-up measurement position $P_1$ that is a home position in the exemplary embodiment) measures the pattern marker 30 on the sorting tray 20. Subsequently, as shown in FIG. 11B, the robot hand 52 moves the camera 40 to a second-stage position (the non-face-up measurement position $P_2$) that is a previously determined position where highly accurate measurement is possible. As shown in FIG. 11C, the camera 40 situated at the second-stage position measures the pattern marker 30 on the sorting tray 20 with high accuracy.

The non-face-up position $P_2$ is set in such a way that the imaging plane of the camera 40 and the recognition reference plane of the pattern marker 30 are inclined at a predetermined angle β with respect to the face-up measurement position $P_1$. There arises no problem even when the tilt angle β is selected as required. However, the tilt angle may range from 15° to 75°. From the viewpoint of enhancement of measurement accuracy, particularly the tilt angle so as to come to around 45° may be selected.

As shown in; for instance, FIG. 11, in a configuration where the camera 40 is attached to the robot hand 52, a distance over which the robot hand 52 is moved to the position of the workpiece W on the sorting tray 20 after measurement becomes larger as the tilt angle β becomes greater, which affects a production tact. Therefore, when consideration is given to the production tact, the minimum tilt angle β achieved in a range where measurement accuracy may be assured is desirable.

Therefore, in the present exemplary embodiment, on occasion of recognition of the layout information about the position and the attitude of the sorting tray 20, an additional correction is made to the measurement information obtained through measurement operation performed by the non-face-up measurement position $P_2$ in consideration of the measurement information acquired by the camera 40 at the face-up measurement position $P_1$, thereby making it possible to acquire highly accurate measurement information.

Figure 11D:
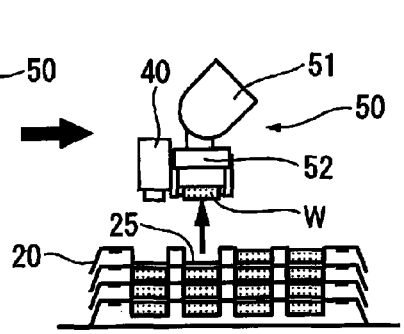
FIG. 11D is a descriptive view showing a process of gripping a workpiece in the sorting tray.

Subsequently, the controller 60 determines moving action of the robot hand 52 and collects (grips) the workpiece W by means of the robot hand 52 in order to move the workpiece to a predetermined area, as shown in FIG. 11D.

The controller 60 further checks whether or not processing for collecting the workpiece W of the sorting tray 20 by means of the robot hand 52 is completed. Processing for recovering an empty sorting tray 20 is performed at a point in time when processing for collecting all of the workpieces W in the sorting tray 20 is completed.

Detailed example processing for recovering the empty sorting tray 20 will be described in connection with a third exemplary embodiment to be described later.

Figure 12A:
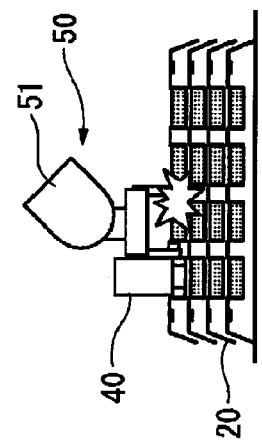
FIG. 12A is a descriptive view showing a process of measuring a position and an attitude of a sorting tray of a comparative mode.
Figure 12B:
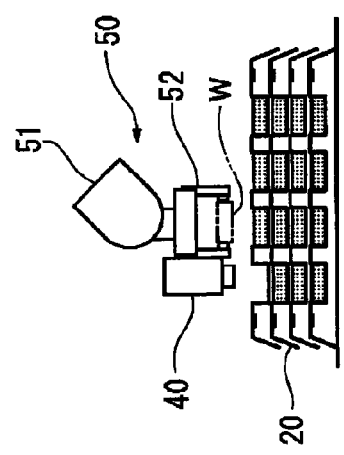
FIGS. 12B and 12C are descriptive views showing example faults which will arise when a degree of accuracy of measurement of the sorting tray is low.
Figure 12C:
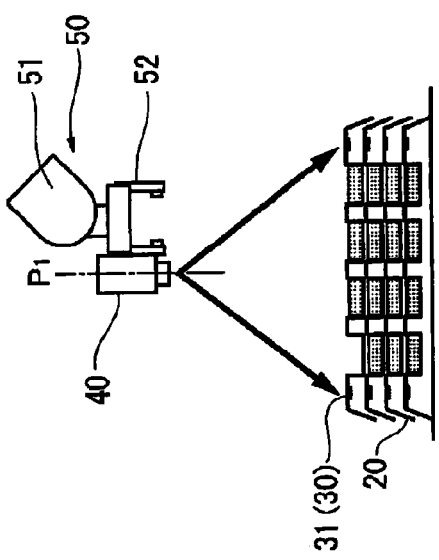

In this regard, as shown FIG. 12A, in an assumed comparative mode in which the measurement position of the camera 40 is fixedly set with respect to the face-up measurement position $P_1$, the measurement information acquired by the camera 40 at the face-up measurement position $P_1$ will be lower than the measurement information achieved at the non-face-up measurement position $P_2$ in terms of a degree of accuracy. When the measurement accuracy of the measurement information acquired at the non-face-up measurement position P2 is insufficient, an error will arise in a position to be gripped by the robot hand 52 as shown in; for instance, FIG. 12B, whereby the robot hand will fail to grip the workpiece W on the sorting tray 20. Conversely, as shown in FIG. 12C, the robot hand 52 will excessively approach the workpiece W, which in turn generates a concern that the robot hand might collide with the sorting tray 20.

Modification 1

Figure 13A:
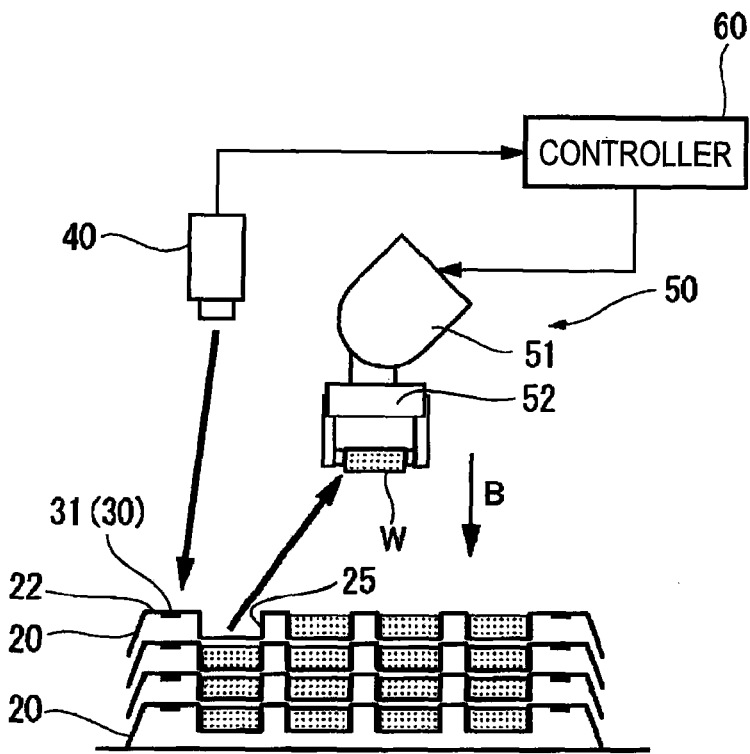
FIG. 13A is a descriptive view showing a first modification of the collection processing of the first exemplary embodiment.
Figure 13B:
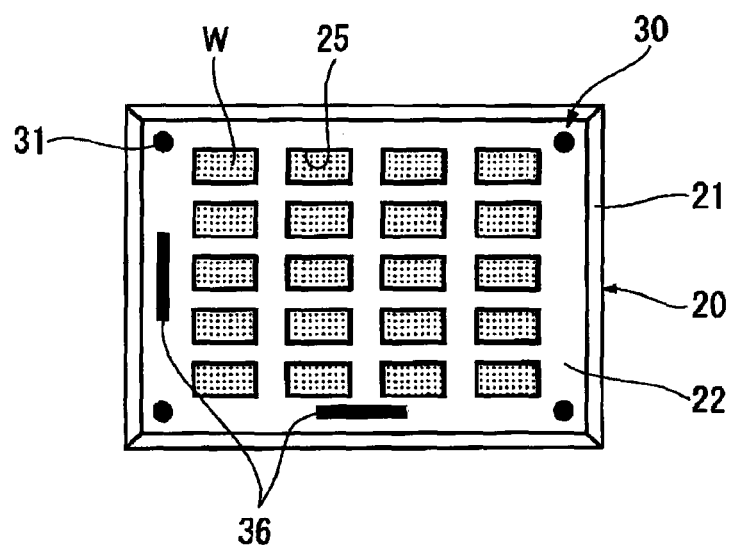
FIG. 13B is a view acquired when the apparatus is viewed in an arrowy direction B shown in FIG. 13A.

FIG. 13 is a descriptive view showing an overall structure of Modification 1 of the collection processing apparatus of the first exemplary embodiment.

In the drawing, the collection processing apparatus is substantially identical with its counterpart described in connection with the first exemplary embodiment in terms of a basic structure. However, unlike the first exemplary embodiment, the camera 40 is fixedly set while separated from the robot hand 52 in the modification. Elements similar to those described in connection with the first exemplary embodiment are assigned similar reference numerals, and their detailed descriptions are omitted.

In the exemplary embodiment, the essential requirement is to previously set the camera 40 at the non-face-up measurement position $P_2$ where the camera may capture an image of the pattern marker 30 on the sorting tray 20. Layout information about the position and the attitude of the sorting tray 20 is recognized by means of capturing an image of the pattern marker 30 with the camera 40. It is thereby possible to indirectly recognize the layout information about the position and the attitude of each of the workpieces W on the sorting tray 20.

Therefore, processing for collecting the workpiece on the sorting tray 20 is performed in substantially the same manner as in the first exemplary embodiment.

Even in Modification 1, another movable supporting mechanism may be provided separately from the robot 50, and measurement may be performed in two stages; namely, at the face-up measurement position $P_1$ and the non-face-up measurement position $P_2$, by means of the movable supporting mechanism.

Second Exemplary Embodiment

Figure 14:
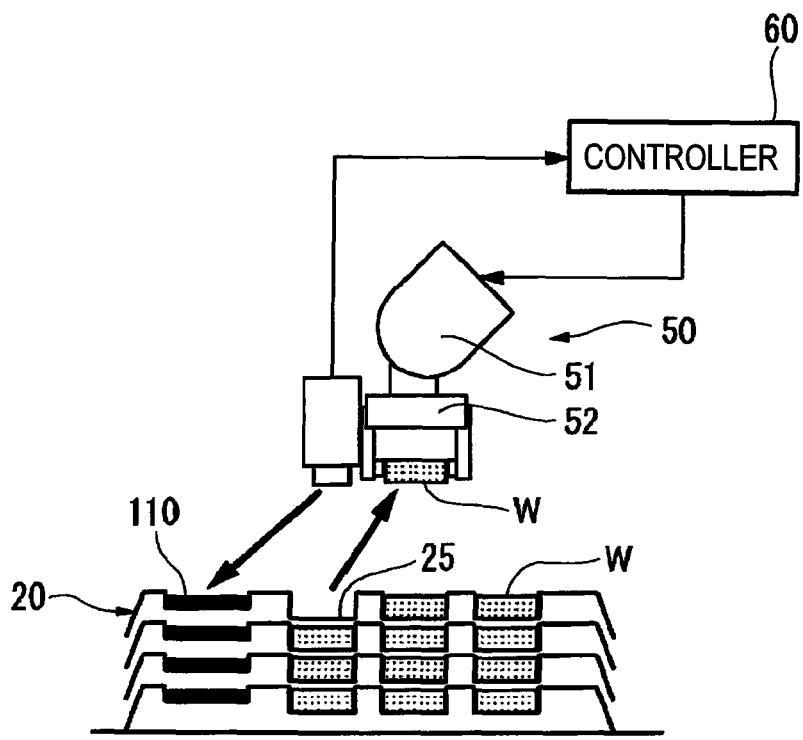
FIG. 14 is a descriptive view showing an overall structure of a collection processing apparatus serving as the article processing apparatus of the first exemplary embodiment.

FIG. 14 shows an overall structure of a collection processing apparatus of a second exemplary embodiment.

In the drawing, the collection processing apparatus is substantially analogous to its counterpart described in connection with the first exemplary embodiment in terms of a basic structure. A pattern marker 110 added to the sorting tray 20 structurally differs from the pattern marker 30 described in connection with the first exemplary embodiment. Elements analogous to those described in connection with the first exemplary embodiment are assigned reference numerals analogous to those employed in the first exemplary embodiment, and their detailed explanations are omitted here.

Figure 15A:
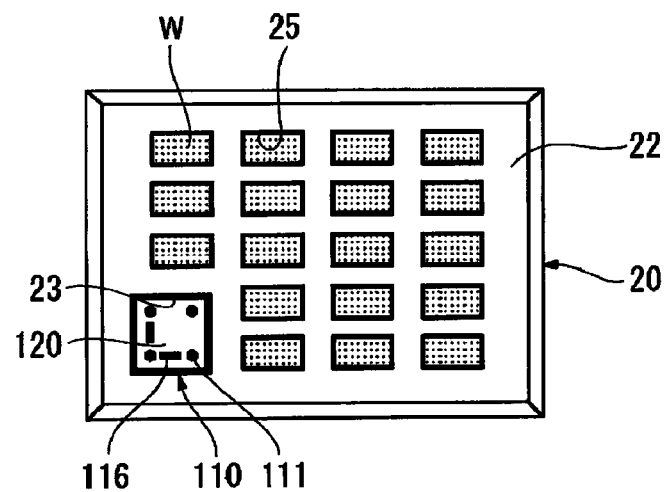
FIG. 15A is a planar view of the sorting tray.
Figure 15B:
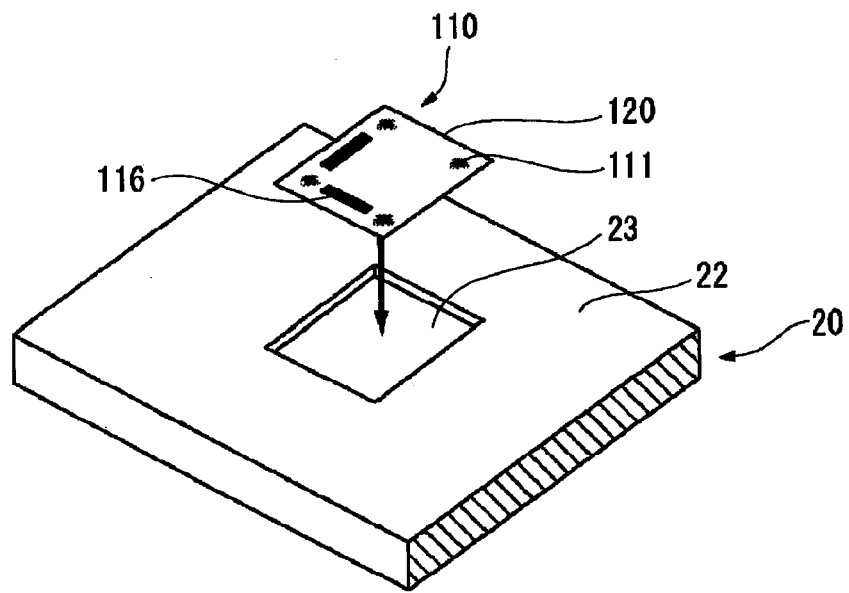
FIG. 15B is a descriptive view showing an overview of a pattern marker added to the sorting tray.

In the present exemplary embodiment, the pattern marker 110 is printed on a front surface of a card 120 as shown in FIG. 14 and FIGS. 15A and 15B. The card 120 is fixed to an attachment indentation 23 formed in a portion (e.g., a corner) of the top surface 22 of the sorting tray 20.

Figure 16A:
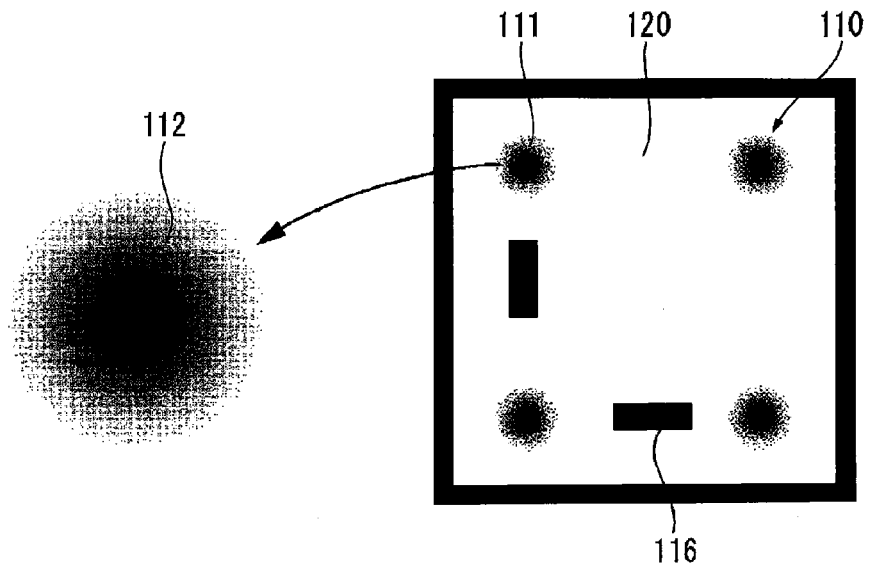
FIGS. 16A and 16B are descriptive views showing an example structure of the pattern marker used in the second exemplary embodiment.
Figure 16B:
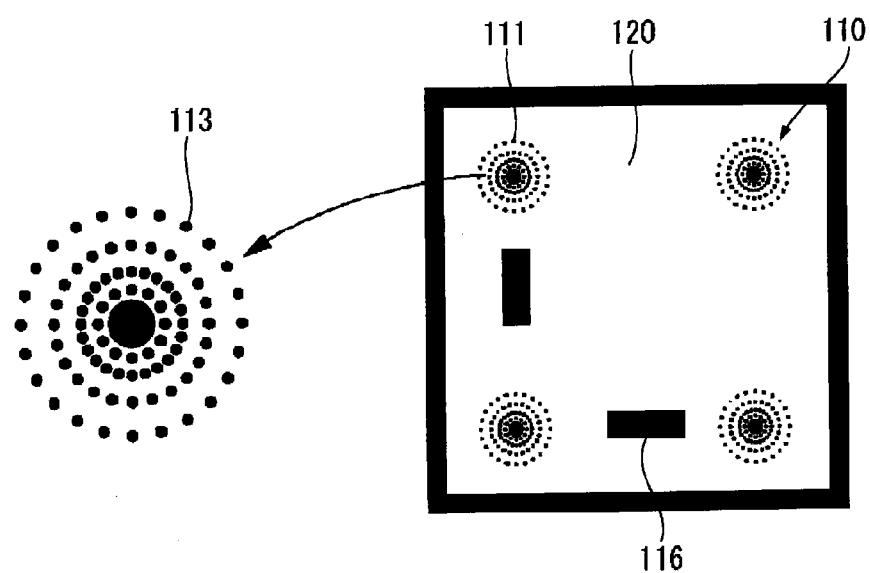

The pattern marker 110 includes several configuration; for instance, a configuration including unit pattern marks 111 that are made up of gradations 112 to be provided at respective four corners of the front surface of the card 120 and type indication marks 116 to be provided along two sides of the front surface of the card 120, as shown in FIG. 16A; and a configuration including the unit pattern marks 111 that are made up of for instance, dot patterns 113 to be provided at the respective four corners of the front surface of the card 120, and the type indication marks 116 to be provided along the two sides of the front surface of the card 120 as shown in FIG. 16B.

<Method for Fixing the Pattern Marker>

The following is provided as a method for fixing the pattern marker 110.

Figure 17A:
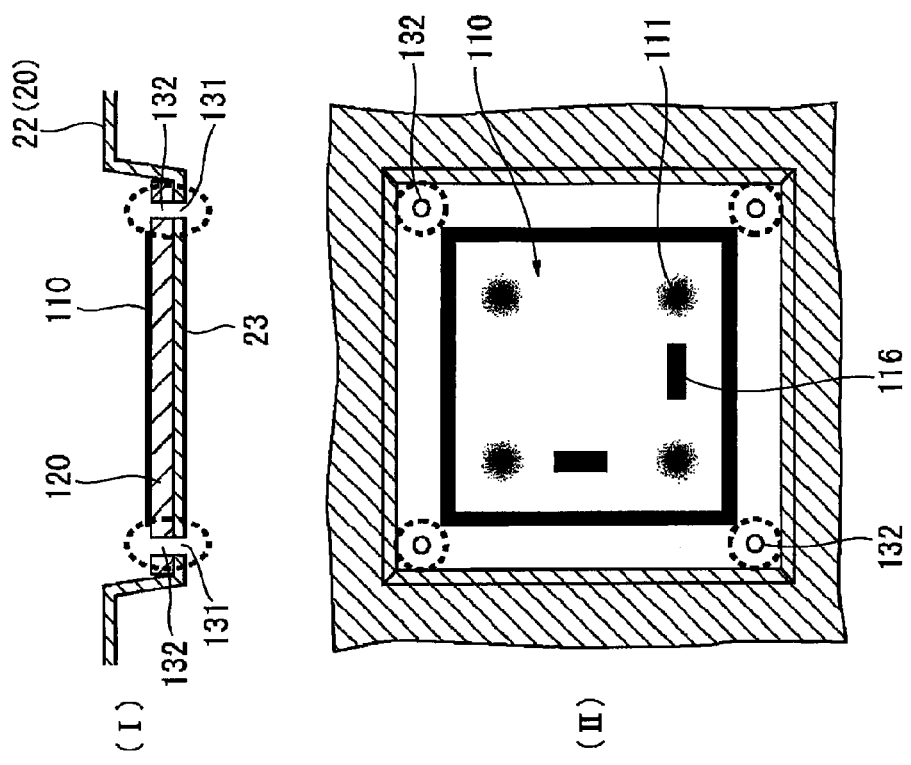
FIGS. 17A and 17B are descriptive views showing example fixing of a pattern marker of the second exemplary embodiment, wherein (I) they are cross sectional descriptive views of the pattern marker, and (II) they are planar descriptive views of the pattern marker.

A configuration shown in FIG. 17A includes providing elastically deformable press protrusions 130 on a peripheral wall of the attachment indentation 23 formed in the top surface 22 of the sorting tray 20; placing the card 120 printed with the pattern marker 110 in the attachment indentation 23 while the press protrusions 130 are being elastically deformed; and holding down a periphery of the card 120 placed in the attachment indentation 23 by means of the press protrusions 130. In the exemplary embodiment, the card 120 may be removed while the press protrusions 130 are being elastically deformed.

Figure 17B:
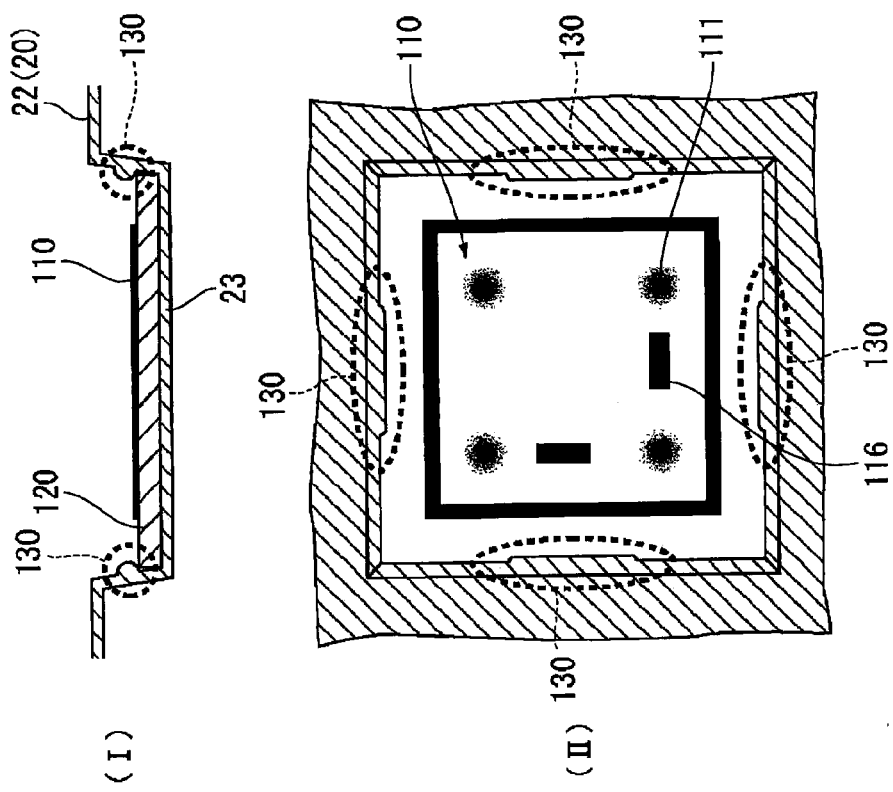

The configuration shown in FIG. 17B includes opening mount holes 131 and 132 both in the bottom of the attachment indentation 23 formed in the top surface 22 of the sorting tray 20 and at four corners of the card 120 printed with the pattern marker 110. The card 120 is fixed to the interior of the attachment indentation 23 by means of unillustrated fastening tools.

Further, in a configuration shown in FIG. 18A, the pattern marker 110 is printed on a label 140 made of paper or a resin, and the label 140 is affixed to the bottom of the attachment indentation 23 of the sorting tray 20.

Moreover, in a configuration shown in FIG. 18B, the pattern marker 110 is printed directly on the bottom of the attachment indentation 23 of the top surface 22 of the sorting tray 20.

As mentioned above, in the present exemplary embodiment, a portion of the sorting tray 20 is provided with the pattern marker 110. The camera 40 measures the pattern marker 110 on the portion of the sorting tray 20, thereby recognizing layout information about the position and the attitude of the sorting tray 20. The layout information about the position and the attitude of the workpiece W may be recognized on the basis of the layout information about the sorting tray. Processing for collecting the workpiece W is performed in the same manner as in the first exemplary embodiment.

In the present exemplary embodiment, the pattern marker 110 is placed at one corner of the top surface 22 of the sorting tray 20. However, a modification may be made to the location where the pattern marker 110 is to be set, as required. For instance, as shown in FIG. 19A, in the case of the sorting tray 20 housing a large number of workpieces W, the pattern marker 110 may also be set in the vicinity of a center area of the top surface 22 of the sorting tray 20. Alternatively, as shown in FIG. 19B, the pattern marker 110 may also be set in numbers, like setting a pair of pattern markers 110 at respective diagonal corners on the top surface 22 of the sorting tray 20.

In particular, when the plurality of pattern markers 110 are set, layout information about the position and the attitude of an area corresponding to each of the pattern markers 110 may be recognized. Therefore, the layout information about the sorting tray 20 may be recognized more accurately.

Third Exemplary Embodiment

Figure 20A:
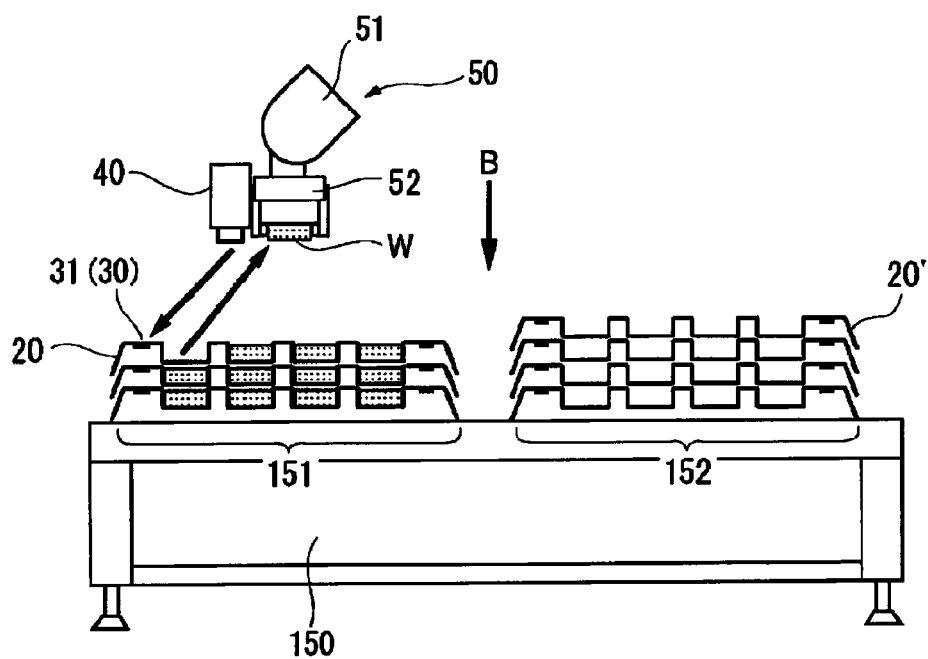
FIG. 20A is a descriptive view showing an overall structure of a collection processing apparatus serving as the article processing apparatus of the third exemplary embodiment.
Figure 20B:
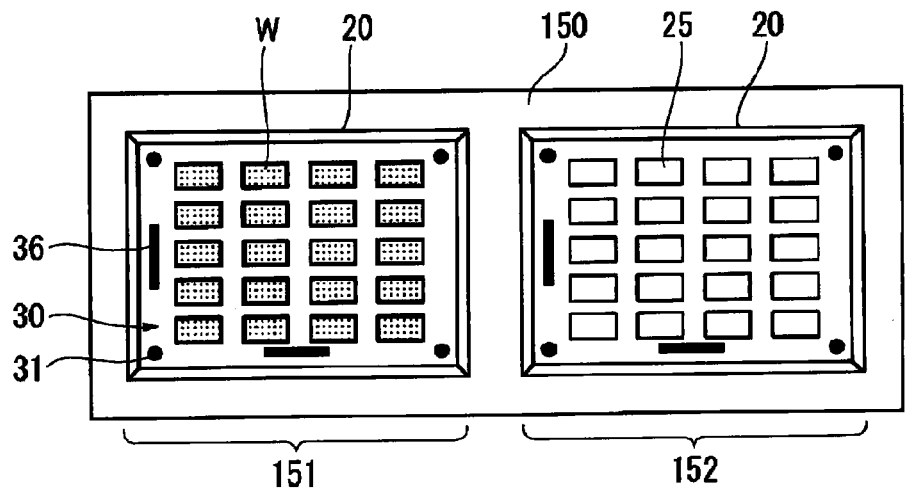
FIG. 20B is a planar descriptive view of a processing stage of the collection processing apparatus of the third exemplary embodiment.

FIGS. 20A and 20B show an overall structure of a collection processing apparatus of a third exemplary embodiment.

In the drawings, the collection processing apparatus subjects the workpieces W held in the sorting tray 20 to collection processing and performs for recovering an empty sorting tray 20' that has become empty as a result of completion of processing for collecting the workpieces W (one configuration for collection processing), in substantially the same manner as in the first exemplary embodiment.

In the drawings, reference numeral 150 designates a tray rest on which there are placed the sorting tray 20 housing workpieces W (the tray is referred to as a "filled tray," as required, in the exemplary embodiment) and the empty sorting tray 20' having become empty as a result of completion of processing for collecting the workpieces W (the tray is referred to as an "empty tray," as required, in the exemplary embodiment). A filled tray storage space 151 and an empty tray storage space 152 are adjacently assured on the tray placement table 150.

In the exemplary embodiment, a controller not included in the drawings controls imaging timing of the camera 40; controls the robot 50; performs processing for collecting the workpiece W that is substantially analogous to that described in connection with the first exemplary embodiment; and further performs empty tray recovery processing along a flowchart shown in FIG. 21.

Empty tray recovery processing performed by the collection processing apparatus of the present exemplary embodiment is now schematically illustrated.

First, the controller sequentially iterates processing for collecting each of the workpieces W in the sorting tray 20.

Figure 21:
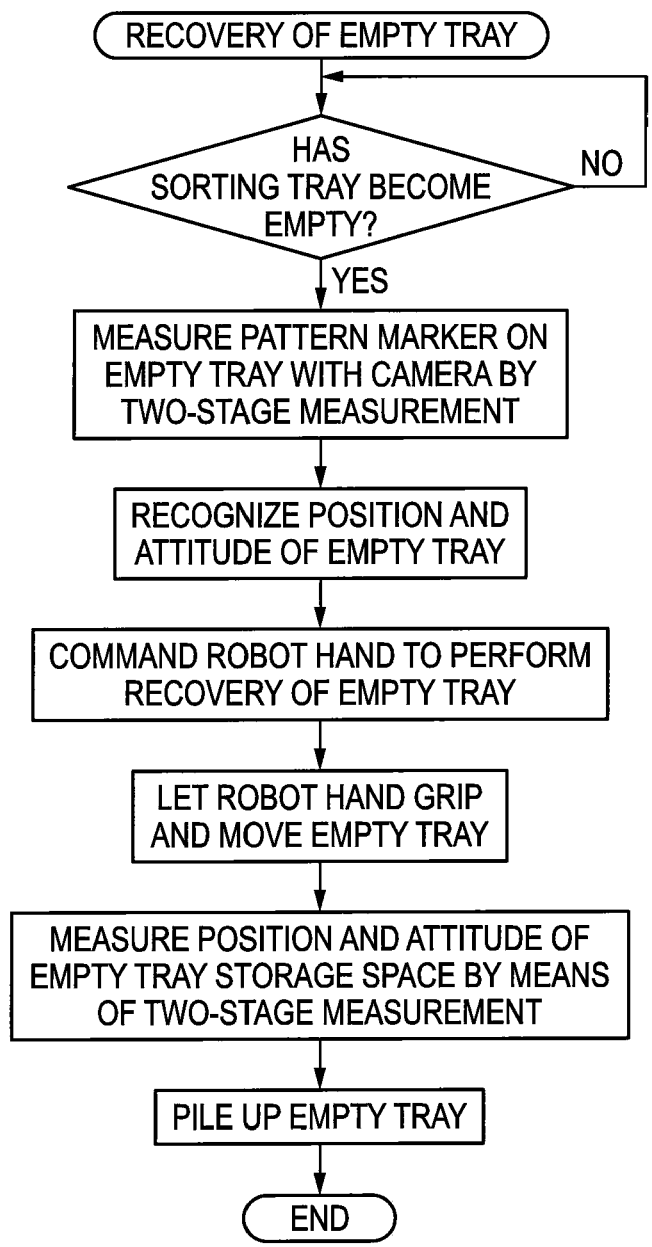
FIG. 21 is a flowchart showing an empty tray recovery processing of the collection processing apparatus of the third exemplary embodiment.
Figure 22A:
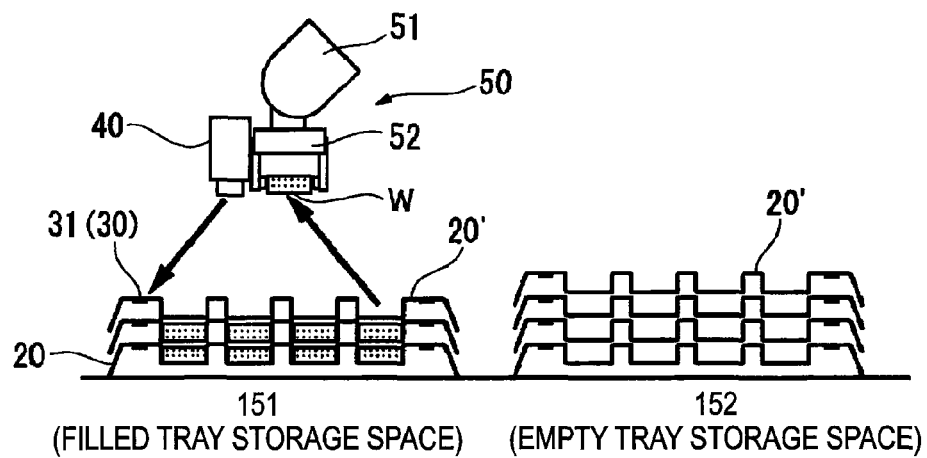
FIG. 22A is a descriptive view showing a state of the sorting tray when taking out of a workpiece is completed.
Figure 22B:
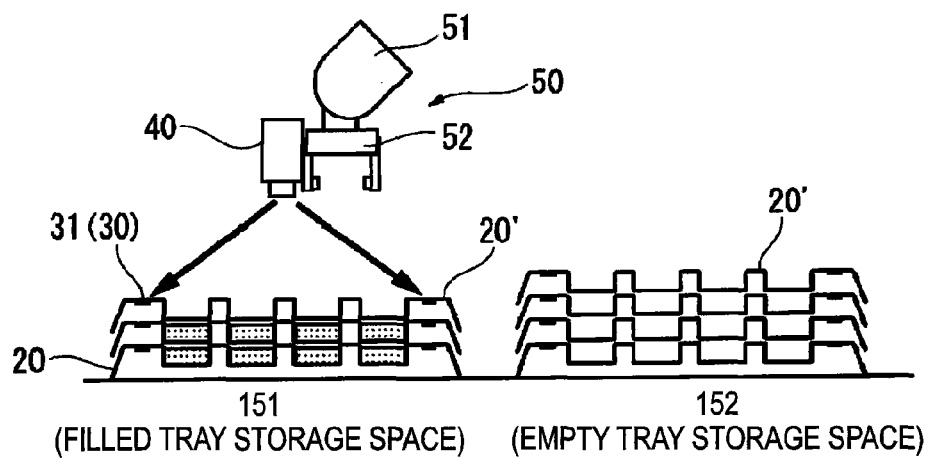
FIG. 22B is a descriptive view showing a process of measuring layout of an empty tray.

As shown in FIG. 21, the controller monitors the entirety of the sorting trays 20 by means of for instance, the camera 40 and checks whether or not entire processing for taking the workpieces W out of the predetermined sorting tray 20 (workpiece pickup processing) is completed. As shown in FIG. 22A, provided that the sorting tray 20 has become the empty tray 20', the pattern marker 30 of the empty tray 20' of the filled tray storage space 151 is measured by means of the camera 40 (see FIG. 22B).

Figure 23A:
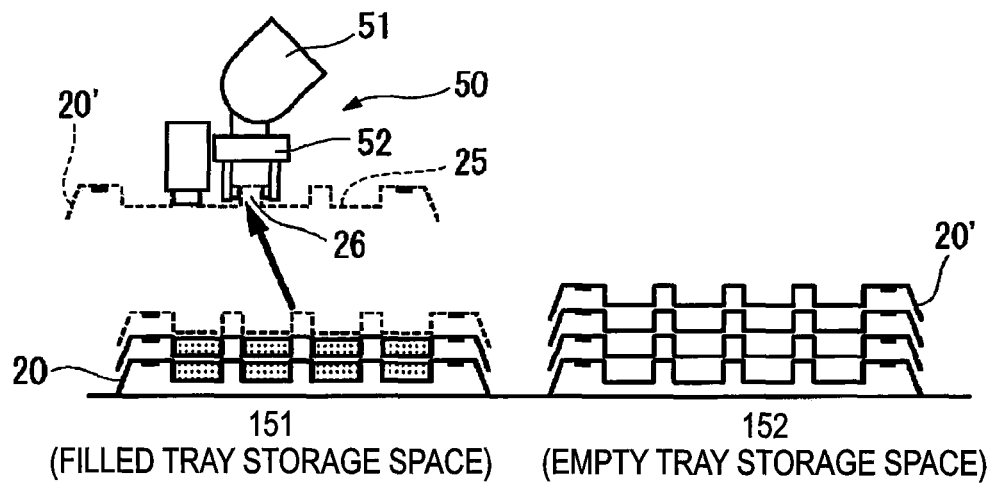
FIG. 23A is a descriptive view showing a process of gripping the empty tray.
Figure 23B:
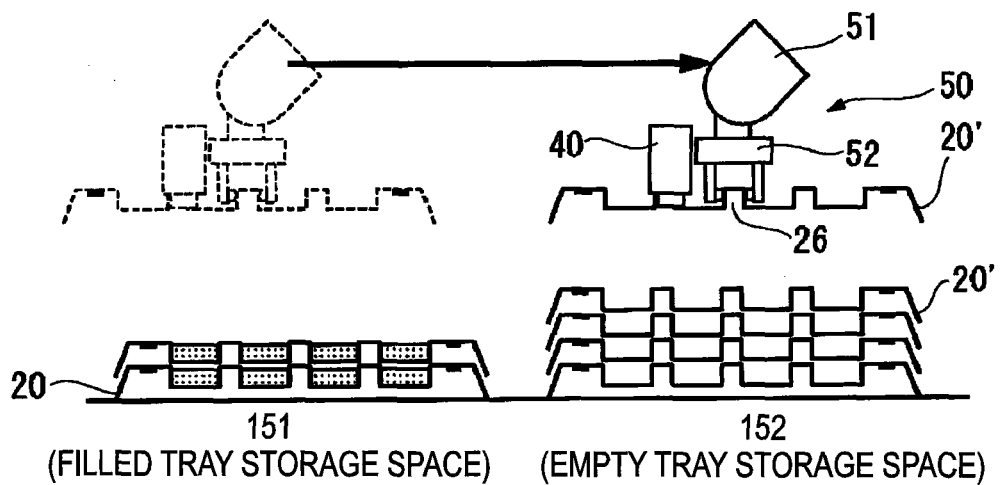
FIG. 23B is a descriptive view showing a process of shifting the empty tray to an empty tray storage space.

Consequently, the controller recognizes the layout information about the position and the attitude of the empty tray and commands the robot hand 52 to perform empty tray recovery operation. A grip portion 26 located between the workpiece housing indentations 25 of the empty tray 20' is gripped by means of the robot hand 52 (see FIG. 23A), and the thus-gripped empty tray 20' is moved to the empty tray storage space 152 (see FIGS. 23B).

Figure 24A:
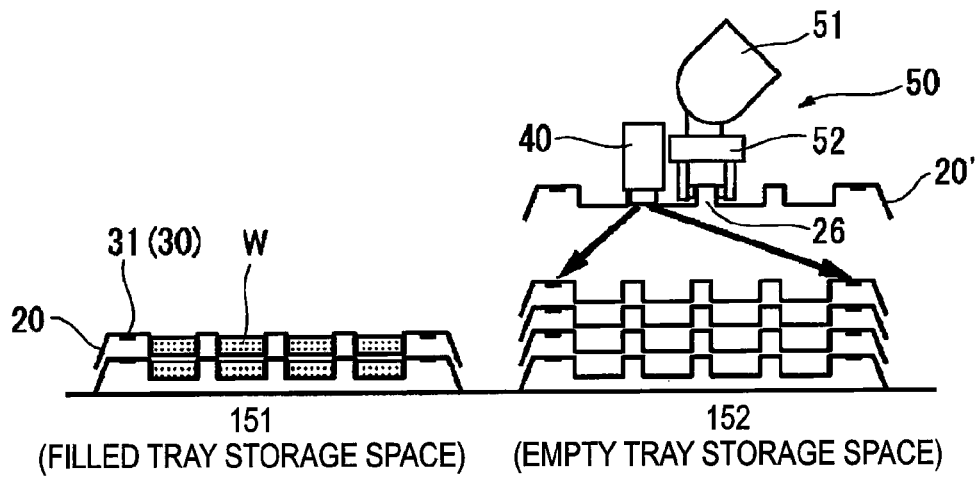
FIG. 24A is a descriptive view showing a process of arranging and measuring the empty tray storage space.

Next, the controller subjects the pattern marker 30 on the topmost empty tray 20' that has already been recovered and piled in the empty tray storage space 152 (see FIG. 22A), to two-stage measurement (i.e., measurement to be performed at the face-up measurement position and measurement to be performed at none-face-up measurement position; see FIG. 11) (see FIG. 24A), thereby recognizing layout information about the position and the attitude of the empty tray 20'.

Figure 24B:
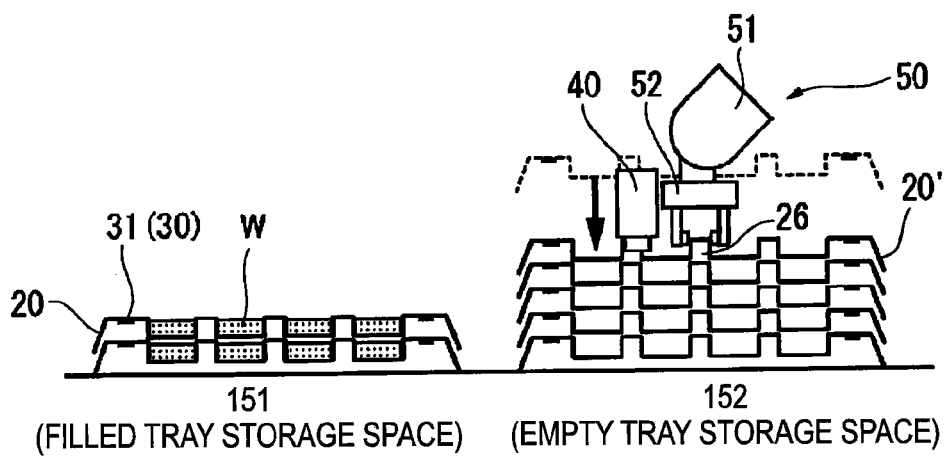
FIG. 24B is a descriptive view showing a process of piling up empty trays.

In this state, the controller controls motion of the robot hand 52 according to the layout information about the empty tray storage space 152, thereby accurately piling the empty tray 20' moved to the empty tray storage space 152 on the already-existing empty trays 20' (see FIGS. 24B).

As mentioned above, in the present exemplary embodiment, since layout information about the position and the attitude of the sorting tray 20 is recognized, there is no necessity for the positioning mechanism, the mechanism for recovering an empty tray, and the like. Processing for recovering the empty tray 20' may be implemented by means of mere preparation of the tray placement table 150.

In the present exemplary embodiment, in addition to performance of processing for collecting the workpiece W, the pattern marker 30 on the sorting tray 20 and the pattern marker 30 on the empty tray 20' are subjected to two-stage measurement performed by means of the camera 40. However, according to; for instance, a degree of accuracy of processing performed by the robot hand 52, measurement may be performed. For instance, in relation to processing for collecting a workpiece W that requires a higher degree of accuracy, the pattern marker 30 on the sorting tray 20 may be subjected to two-stage measurement by means of the camera 40. On the contrary, in relation to processing for recovering the empty tray 20' that requires a less high degree of accuracy, the pattern marker 30 on the empty tray 20' may also be subjected to one-stage measurement (measurement to be performed at the face-up measurement position or the non-face-up measurement position).

—Apparatus for Taking a Workpiece Out of the Sorting Tray in a Comparative Mode—

Figure 25A:
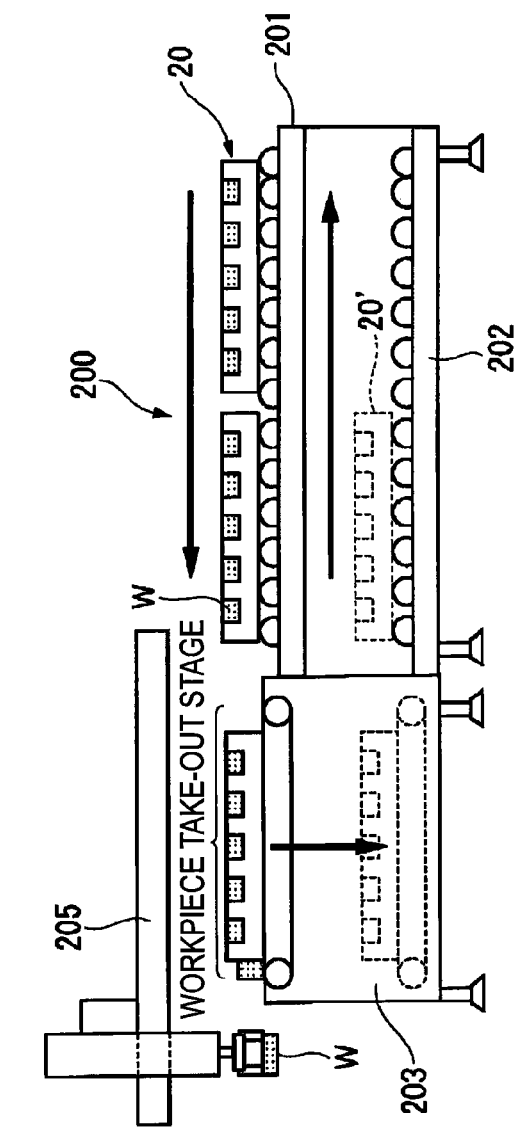
FIG. 25A is a descriptive view showing an apparatus for taking a workpiece out of the sorting tray of a comparative form.
Figure 25B:
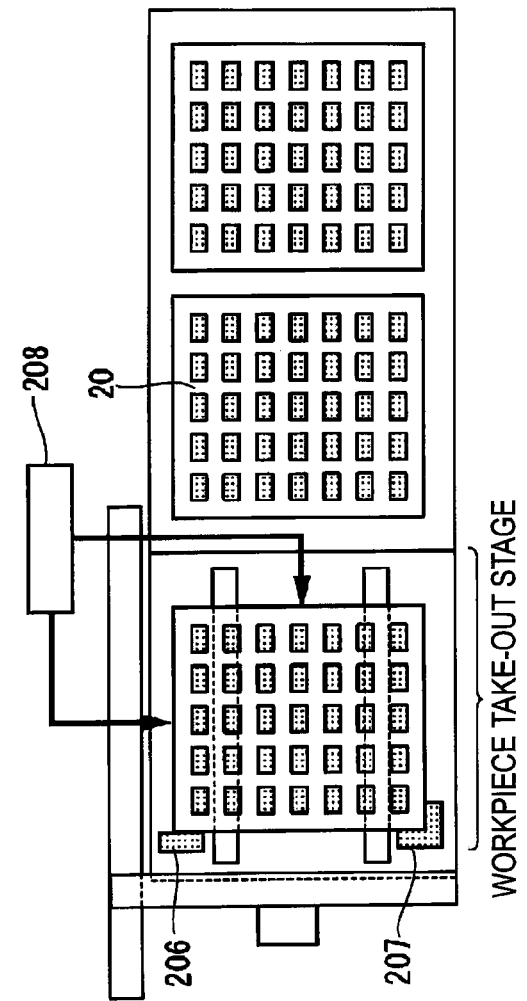
FIG. 25B is a planar descriptive view showing a processing stage.

On the contrary, a workpiece take-out apparatus 200 for use with a sorting tray of a comparative configuration shown in FIG. 25 includes the followings: namely, a filled tray conveyance conveyor 201 that conveys a filled tray 20; an empty tray conveyance conveyor 202 that conveys the empty tray 20'; an elevation table 203 that feeds the filled tray 20 conveyed by the filled tray conveyance conveyor 201 by means of a workpiece take-out stage and that goes up and down so as to recover the empty tray 20' into the empty tray conveyance conveyor 202; and a take-out robot 205 that takes a workpiece out of the filled tray 20 on the workpiece take-out stage.

In the exemplary embodiment, in order to perform positioning of the filled tray 20 on the workpiece take-out stage with high accuracy, it becomes necessary to place a positioning mechanism 208 that presses, from two directions, the filled tray 20 against positioning reference members 206 and 207 that perform positioning in two directions. In addition, the elevation table 205 for recovering the empty tray 20' and the empty tray conveyance conveyor 202 also become indispensable. Hence, concern arises about corresponding complication of facilities.

Moreover, provided that the filled tray 20 is roughly positioned, concern will arise about complication of a facility structure, like providing the take-out robot 205 with a high accuracy positioning mechanism and again gripping the workpiece W after the filled tray 20 has temporarily been set on a positioning jig.

Fourth Exemplary Embodiment

FIGS. 26A to 26D are descriptive views schematically showing collection processing processes of a collection processing apparatus that serves as an article processing apparatus of a fourth exemplary embodiment.

In the exemplary embodiment, the collection processing apparatus is substantially analogous to the first exemplary embodiment in terms of a basic structure. However, unlike the first exemplary embodiment, the workpiece W serving as a collection target article is additionally provided with a pattern marker 170.

The pattern marker 170 may be additionally provided with the pattern marker in various forms described in connection with the first through third exemplary embodiments (e.g., the label, the card, and the like). However, the way to add the pattern marker is not limited to these forms. For instance, the pattern marker 170 may be made on the surface of the workpiece W in the form of an inscribed surface patterns during die molding, like a form which will be described in connection with the present exemplary embodiment.

In this case, the essential requirement for the pattern marker 170 is to make up respective functional blocks (a unit pattern mark, a type indication mark), like; for instance, a corner cube (a tool that reflects light, or the like, to its original direction by utilization of a property of a corner of a cubical inner surface), by utilization of retroreflection, and to enable the camera 40 to capture an image of the pattern marker.

Workpiece collection processing to be performed by the collection processing apparatus of the present exemplary embodiment is now described.

Figure 26A:
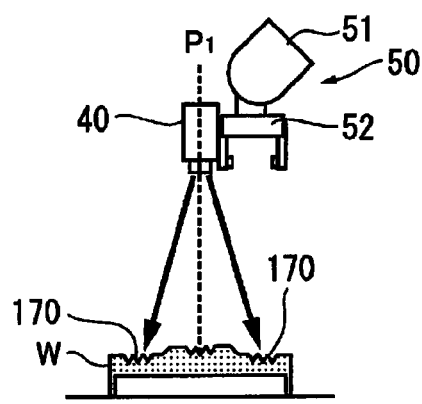
FIG. 26A is a descriptive view showing a process of measuring a position and an attitude of a first-stage collection target article.
Figure 26B:
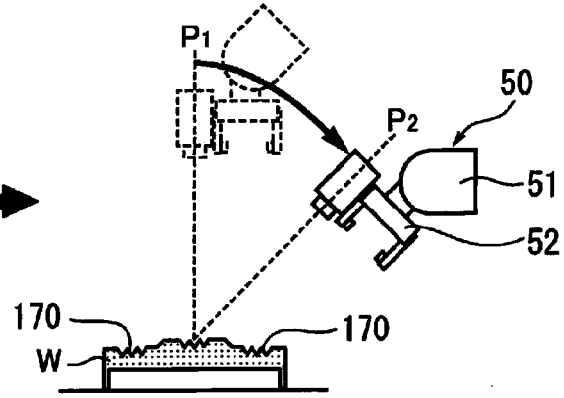
FIG. 26B is a descriptive view showing a process of shift to a position where high accuracy measurement is possible.
Figure 26C:
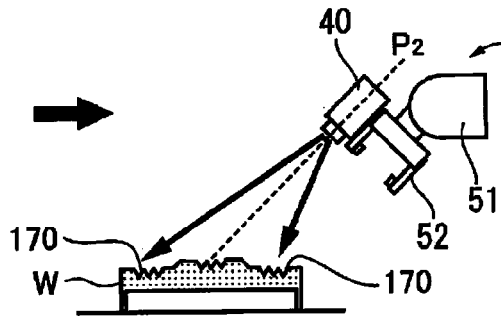
FIG. 26C is a descriptive view showing a process of measuring a position and an attitude of a second-stage sorting tray.

In the exemplary embodiment, as shown in FIGS. 26A to 26C, an unillustrated controller first subjects the pattern marker 170 made on the workpiece W to two-stage measurement by means of the camera 40 (measurement to be performed at the face-up measurement position $P_1$ and measurement to be performed t the non-face-up measurement position $P_2$), and subsequently, layout information about the position and the attitude of the workpiece W is directly recognized.

In the present exemplary embodiment, on occasion of recognition of the layout information about the position and the attitude of the workpiece W, an additional correction is made to the measurement information acquired through measurement performed at the non-face-up measurement position $P_2$ in consideration of the measurement information acquired by the camera 40 at the face-up measurement position $P_1$, thereby making it possible to acquire highly accurate measurement information.

Figure 26D:
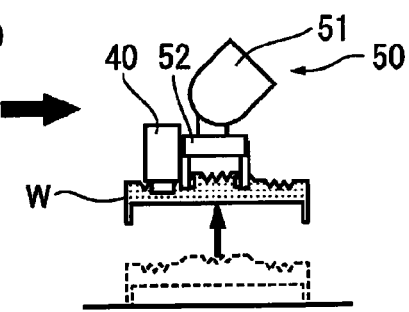
FIG. 26D is a descriptive view showing a process of gripping the collection target article.
Figure 28:
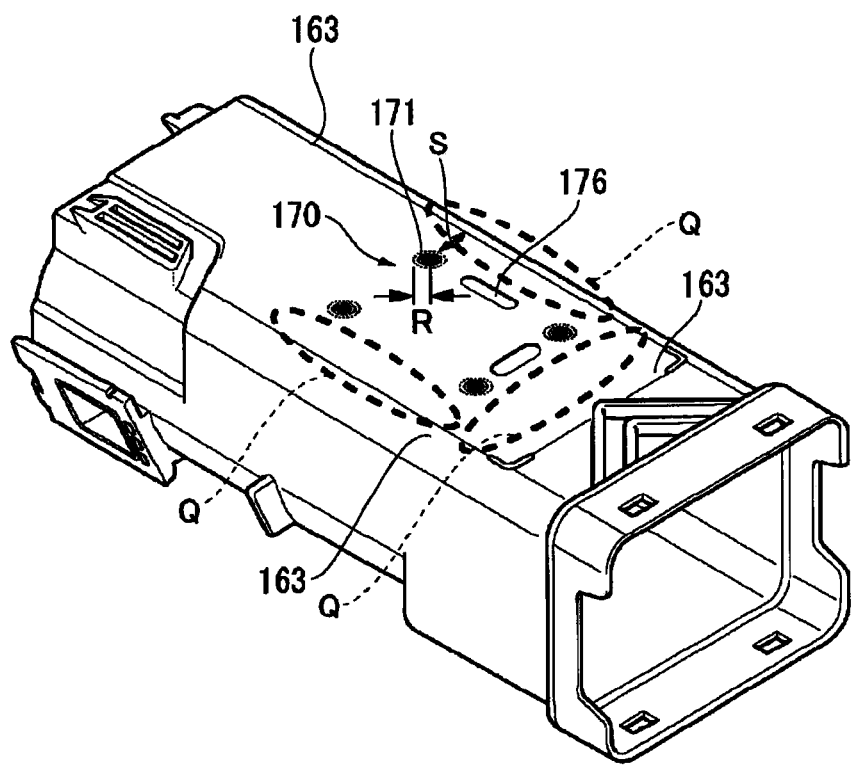
FIG. 28 is a descriptive view showing a preferred structure for recognizing the toner cartridge shown in FIG. 27.

Subsequently, the unillustrated controller determines moving action of the robot hand 52, and the robot hand 52 collects (grips) the workpiece W in order to move the workpiece W to a predetermined area, as shown in FIG. 26D.

Fifth Exemplary Embodiment

FIG. 27 shows a structure for recognizing a collection target article used in a collection processing apparatus serving as an article processing apparatus of a fifth exemplary embodiment.

In the drawing, for instance, a toner cartridge 160 for feeding toner used in an electrophotographic imaging apparatus is mentioned as a collection target article.

The toner cartridge 160 has a toner container 160 housing toner, and the pattern marker 170 is added to one side surface 162 of the toner container 161.

In the exemplary embodiment, the pattern marker 170 has unit pattern marks 171 that are provided at four locations corresponding to apexes of a square area U in a portion of the one side surface 162 of the toner container 161. Further, type indication marks 176 are provided along two sides of the square area U.

Although the unit pattern marks 171 and the type indication marks 176 may also be attached additionally to a label or a card, the marks are formed as inscribed surface patterns during die molding in the present exemplary embodiment. For instance, like a corner cube (a tool that reflects light, or the like, to its original direction by utilization of a property of a corner of a cubical inner surface), required functional blocks are directly inscribed on the toner container 161 by utilization of retroreflection. In particular, each of the unit pattern marks 171 is formed from a dot pattern which changes a size and a layout relationship of dots 173, so as to have a density distribution that exhibits a high density area 174 at the center position C and that gradually decreases with an increasing distance toward a periphery of the pattern. Further, the type indication mark 176 is provided for classifying a color and a type of toner and formed from; for instance, a barcode or a code.

So long as such a pattern marker 170 is added to the toner cartridge 160, layout information about the position and the attitude of the toner cartridge 160 may be recognized. Therefore, for instance, a system that automatically attaches the toner cartridge 160 by means of a robot may readily be constructed.

In the configuration in which the pattern marker 170 is provided on the one side surface 162 of the toner container 161, it is desirable for the unit pattern marks 171 to assure a spatial area Q of certain size so as to exit between the unit pattern marks 171 and a periphery of the side surface 162 of the toner container 161 or a step 163 like a tapered portion. This is based on an algorithm for detecting the center position C of the unit pattern mark 171 with high accuracy and is intended for fulfilling a relationship of S>2R such that a rectangular detection window to be superposed on a circular pattern of the unit pattern mark 171 does not overlap the step 163. As a matter of course, a layout of the unit pattern mark 171 may arbitrarily be set, so long as a different detection algorithm is used for the pattern marker 170.

Figure 29B:
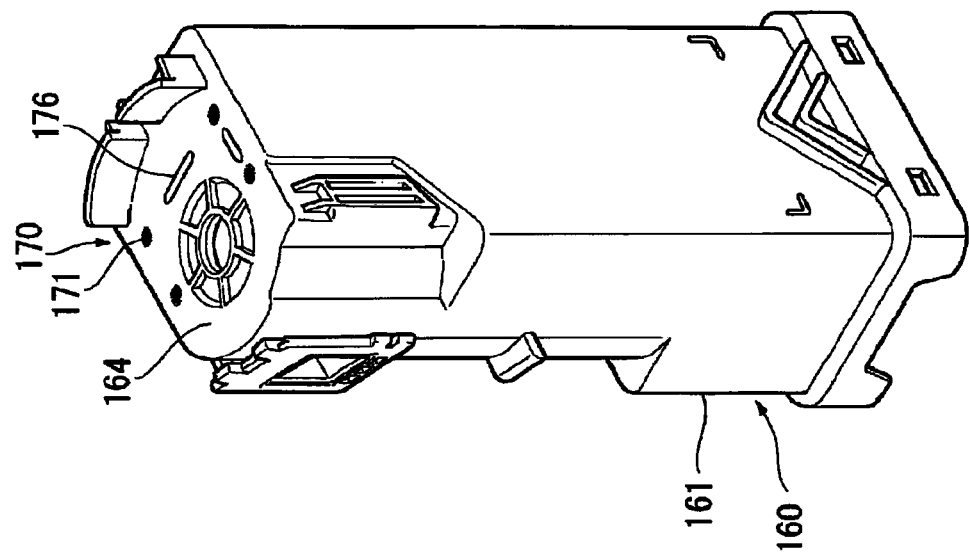
FIG. 29B is a descriptive view showing an example structure for recognizing the toner cartridges housed in the housing container.
Figure 29A:
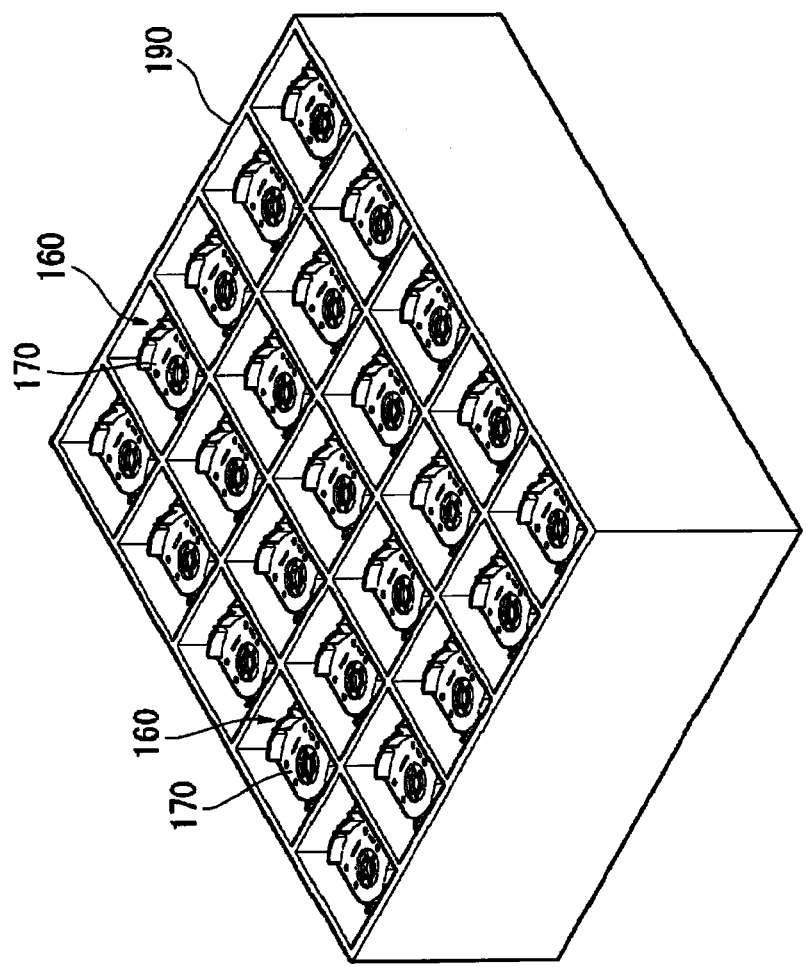
FIG. 29A is a descriptive view showing a housing container that houses a plurality of toner cartridges.

Further, the location on the toner cartridge 160 where the pattern marker 170 is to be formed does not always need to be one side surface 162 of the toner container 161. For instance, the pattern marker 170 may also be provided on one end 164 of the toner container 161 as shown in FIG. 29B. In this case, even when the plurality of toner cartridges 160 are sorted and housed into a sorted container box 190 in a production line, or the like, as shown in FIG. 29A, layout information about the position and attitude of each of the toner cartridges 160 housed in the sorted container box 190 may accurately be recognized.

Sixth Exemplary Embodiment

Figure 30:
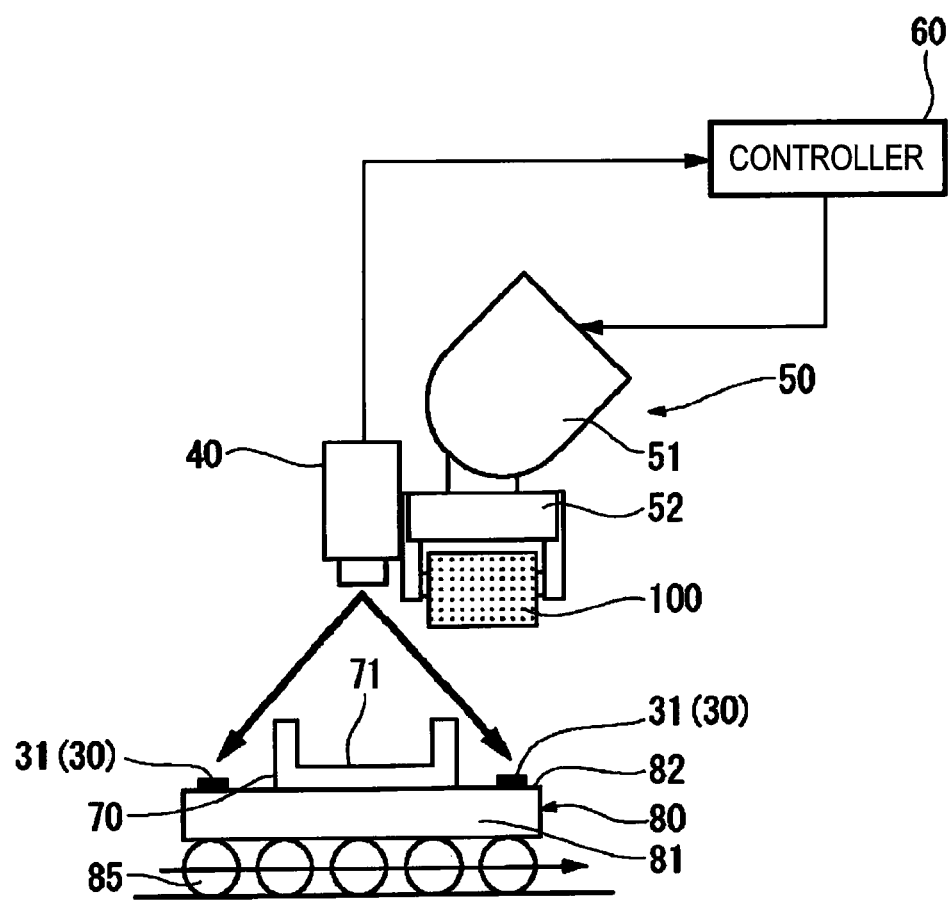
FIG. 30 is a descriptive view showing an overall structure of an assembly processing apparatus serving as an article processing apparatus of a sixth exemplary embodiment.

FIG. 30 is a descriptive view showing an overall structure of a collection processing apparatus of a sixth exemplary embodiment.

<Overall Structure of the Collection Processing Apparatus>

In the drawing, the collection processing apparatus is configured in such a way that the receiving assembly component 70 is placed at a predetermined area on the assembly pallet (equivalent to the assembly base) 80 and that an assembly component 100 is put into the receiving assembly component 70.

In the present exemplary embodiment, the collection processing apparatus includes: the pattern marker 30 serving as a marker provided on the assembly pallet 80 for recognizing layout information about a position and an attitude of the assembly pallet; the camera 40 that captures an image of the pattern marker 30 on the assembly pallet 80; the robot 50 that moves the assembly component 100 to a predetermined area with respect to the receiving assembly component 70 on the assembly pallet 80; and the controller 60 that controls imaging timing of the camera 40, that receives an input of imaging information from the camera 40, thereby recognizing the layout information about the position and the attitude of the assembly pallet 80, and that controls motion of the robot 50 on the basis of the recognized layout information and along a flowchart shown in FIG. 10 which will be described later.

Figure 31A:
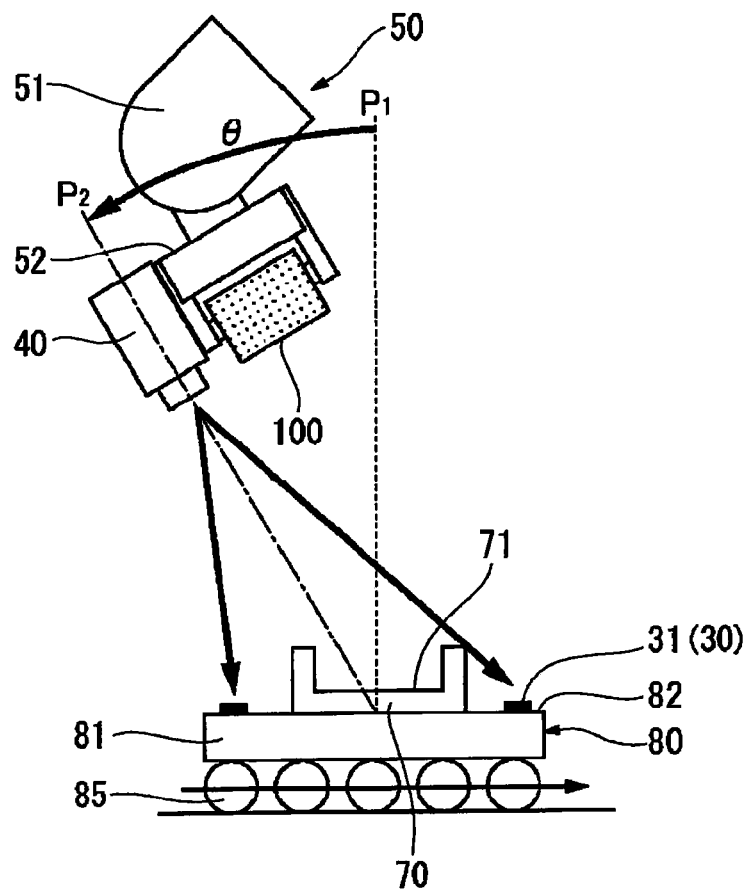
FIG. 31A is a descriptive view showing measurement operation performed by a camera in the assembly processing apparatus of the sixth exemplary embodiment.

In the present exemplary embodiment, as shown in FIGS. 30 and 31A, the assembly pallet 80 has a plate-like pallet main body 81 that moves along a conveyance conveyor 85. The receiving assembly component 70 is positioned and fixed to predetermined area on the pallet main body 81.

The robot 50 is equipped with the robot hand 52 that may perform gripping action and that is provided at an extremity of the robot arm 51 which may be actuated by means of multiaxial joints. Processing operation to be performed by the robot hand 52 is instructed in accordance with input locus information, such as a motion capture. A correction is made to the processing operation performed by the robot hand 52 according to the imaging information received from the camera 40.

In the present exemplary embodiment, the robot hand 52 grips the assembly component 100, and the assembly component 100 is put into the receiving assembly component 70 on the assembly pallet 80. The receiving assembly component 70 of the present exemplary embodiment has an assembly indentation 71, and the assembly component 100 is fitted into the assembly indentation 71.

In the exemplary embodiment, the camera 40 is fixed to a portion of the robot hand 52 and is placed at a predetermined measurement position by the robot hand 52.

<Pattern Marker>

In the exemplary embodiment, as shown in FIG. 31A, the pattern marker 30 takes a top surface 82 of the pallet main body 81 of the assembly pallet 80 as a recognition reference plane. The pattern marker 30 has unit pattern marks 31 placed respectively at four corners of the top surface 82 and type indication marks 36 provided along two adjacent sides of the top surface 82 of the pallet main body 81.

Figure 31B:
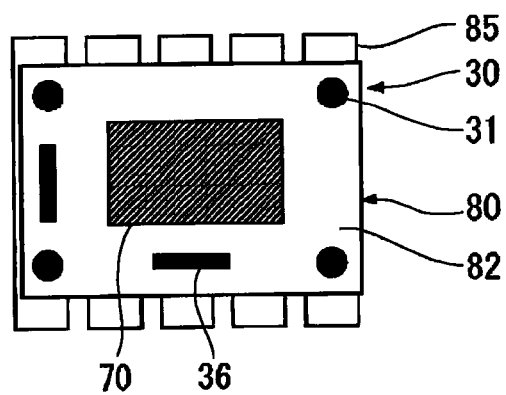
FIG. 31B is a planar descriptive view of an assembly pallet.

As shown in; for example, FIGS. 31B, one typical configuration of the unit pattern mark 31 is illustrated as the gradation 32 having the density pattern Pc that exhibits the highest density at the center position C and that sequentially changes so as to become less dense with an increasing distance toward a periphery of the mark (see FIG. 3B).

Another typical configuration of the unit pattern mark 31 is illustrated as a dot pattern that exhibits the most dense distribution of dots 33 at the center position C, thereby forming a high density region 34, and a distribution of the dots 33 which becomes gradually coarser toward a periphery of the dot pattern, thereby forming a low density region 35 (see FIG. 3B). In this case, the density distribution may be given to the unit pattern marker by means of changing a diameter size of the dot 33, spacing between the dots, and a layout position.

In particular, the dot pattern configuration is preferable, because the dot pattern is easily made by means of printing operation utilizing an inkjet imaging forming apparatus or an electrophotographic image forming apparatus.

Meanwhile, for instance, when the receiving assembly components 70 to be placed on the assembly pallet 80 include a plurality of types (in terms of for instance, color types, sizes, and the like), the type indication marks act ID (identification) indications used for finding matching with receiving assembly components of a corresponding type. In the present exemplary embodiment, the type indication marks 36 are provided at two locations but may also be provided at one location. Alternatively, there arises no problem even when the type indication marks are placed at three locations or more in a split manner.

Example manufacture of the pattern marker 30 and the measurement method for the camera 40 are substantially the same as those described in connection with the first exemplary embodiment.

<Assembly Processing>

Assembly processing (processing for putting an assembly component into a receiving assembly component) performed by the assembly processing apparatus of the exemplary embodiment.

Figure 32:
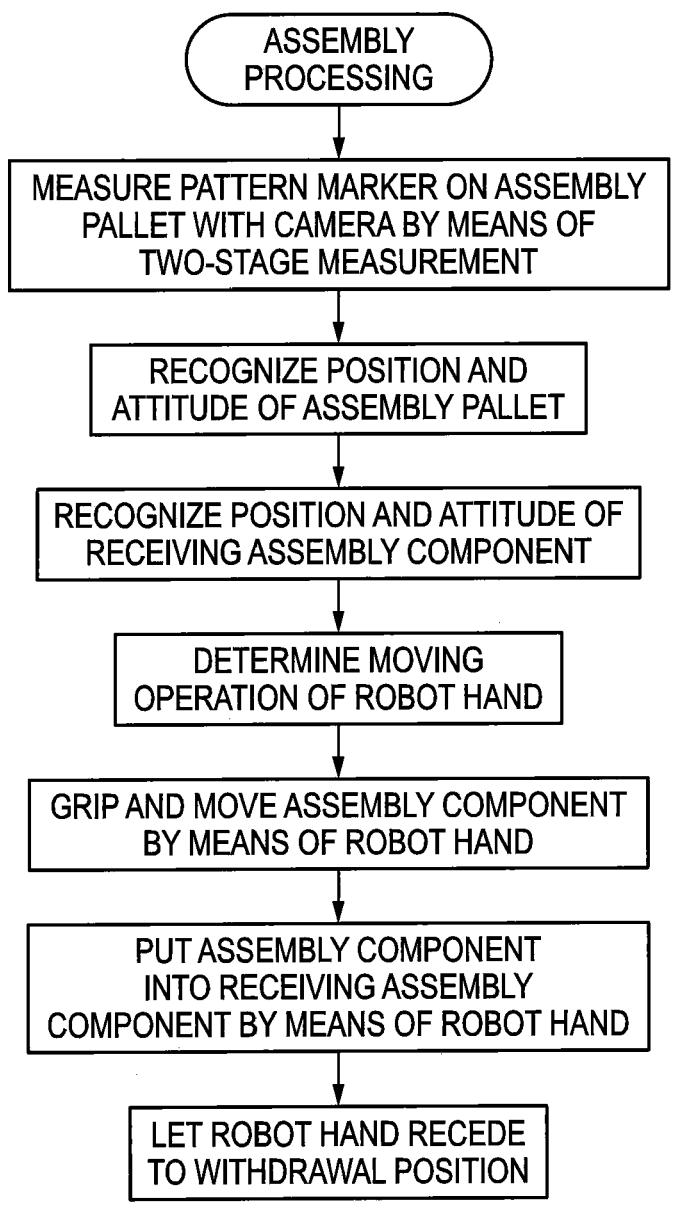
FIG. 32 is a flowchart showing an assembly processing process employed by the assembly processing apparatus of the sixth exemplary embodiment.

First, the controller 60 performs processing pertaining to a flowchart shown in FIG. 32 and transmits a control signal to the camera 40 and the robot 50.

In the drawings, the controller 60 first subjects the pattern marker 30 on the assembly pallet 80 to two-stage measurement (measurement to be performed at the face-up measurement position and measurement to be performed at the non-face-up measurement position) by means of the camera 40. Subsequently, the controller recognizes layout information about a position and an attitude of the assembly pallet 80, as well as indirectly recognizing layout information about a position and an attitude of the receiving assembly component 70 positioned on the assembly pallet 80.

The controller 60 then determines moving action of the robot hand 52 and lets the robot hand 52 grip the assembly component 100 in order to move the assembly component to a predetermined area.

The controller 60 subsequently puts the assembly component 100 into the receiving assembly component 70 on the assembly pallet 80 by means of the robot hand 52 and lets the robot hand 52 recede to predetermined withdrawal position (e.g., a home position) at a point in time when the assembly operation is completed.

—Positional Accuracy of an Assembly Pallet—

Figure 33A:
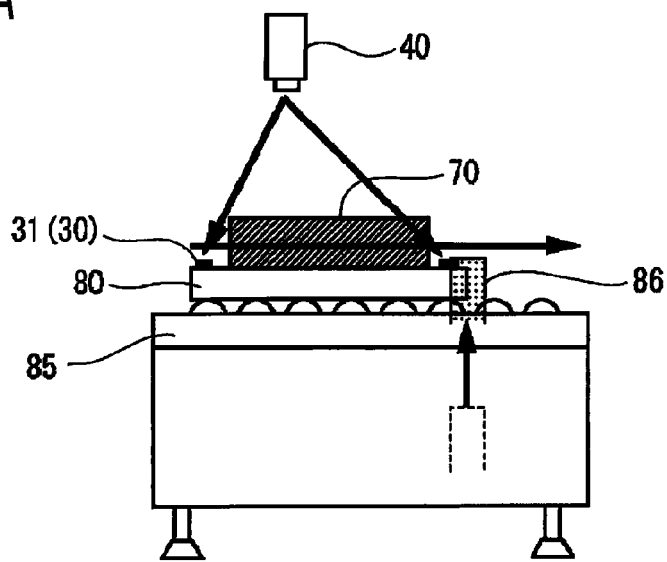
FIG. 33A is a descriptive view showing a process for positioning an assembly pallet.

During such assembly processing, the assembly pallet 80 needs to be stopped when having arrived at an assembly processing stage. As shown in; for instance, FIGS. 33A and 33B, a stoppage structure of this type is provided with a stopper 86 that freely protrudes and recedes at a predetermined area of a conveyance conveyor 85; a V-shaped stopper notch 87 is made in an edge of the assembly pallet 80 opposing the stopper 86. All you need to do is to bring the stopper 86 into contact with the stopper notch 27.

Figure 33B:
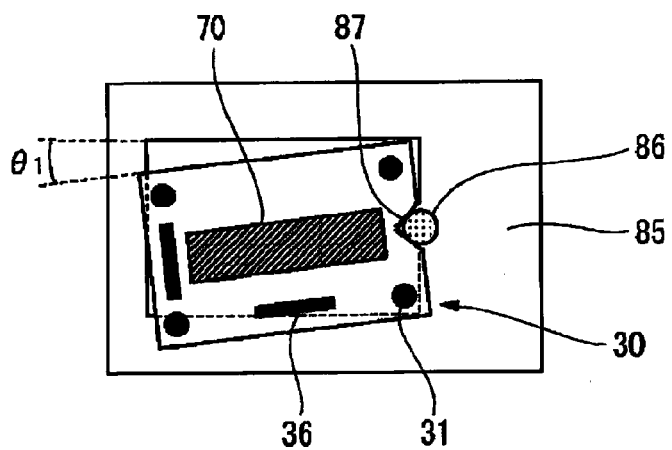
FIG. 33B is a planar descriptive view of the assembly pallet.
Figure 33C:
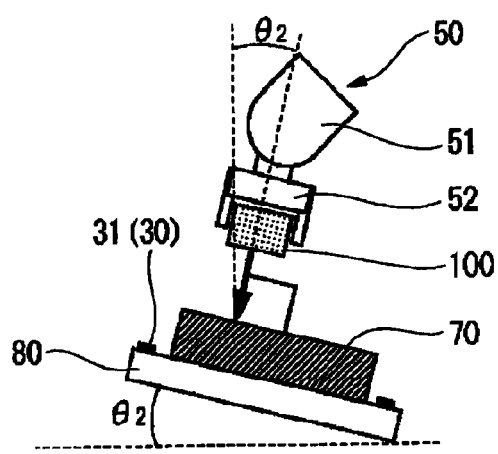
FIG. 33C is a descriptive view schematically showing assembly processing performed when an attitude of the assembly pallet is inclined.

Concern arises, at this time, that the assembly pallet 80 may cause a rotational displacement by a rotational angle θ1 while taking the stopper 86 as a fulcrum as shown in FIG. 33B or another concern that the attitude of the assembly pallet 80 will be inclined to a certain extent from a horizontal position according to positional accuracy of the conveyance conveyor 85 as shown in FIG. 33C. Positional accuracy of the assembly pallet 80 achieved at the time of halt of the assembly pallet 80 will eventually become lower to a certain extent.

However, even when the assembly pallet 80 has caused a rotational displacement by the rotational angle θ1 or is placed at an inclination angle θ2 on the conveyance conveyor 85, the camera 40 captures an image of the pattern marker 30 on the assembly pallet 80, whereby layout information about the position and the attitude of the assembly pallet 80 is recognized Therefore, an amount of rotational displacement or inclination of the assembly pallet 80 is fed back to the robot 50, whereby the assembly component 100 is accurately put into the receiving assembly component 70 on the assembly pallet 80.

—Mechanism for Positioning and Stopping an Assembly Pallet of a Comparative Mode—

Figure 34A:
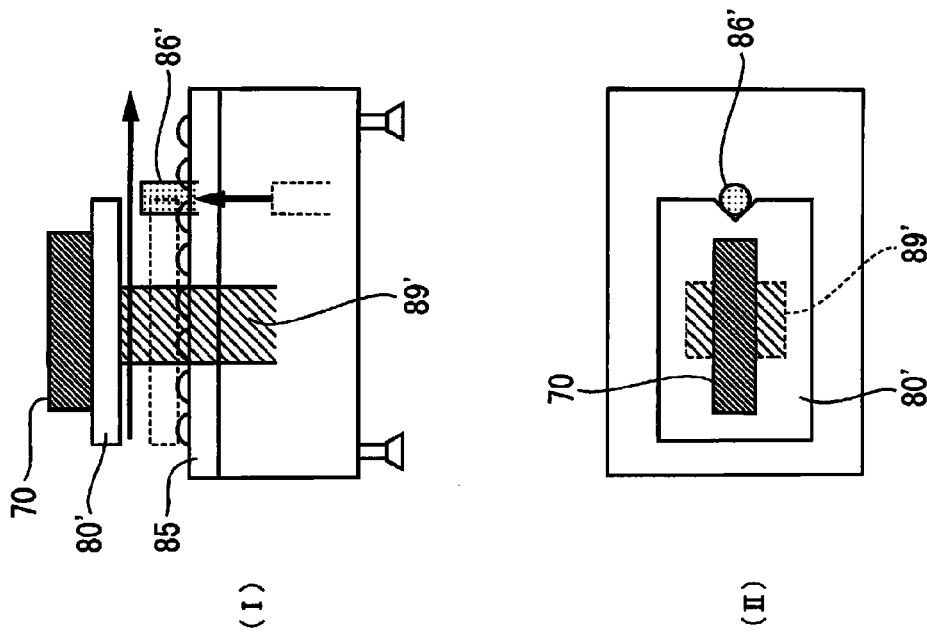
FIG. 34A is a descriptive view showing an example positioning structure of an assembly processing apparatus of a comparative mode.
Figure 34B:
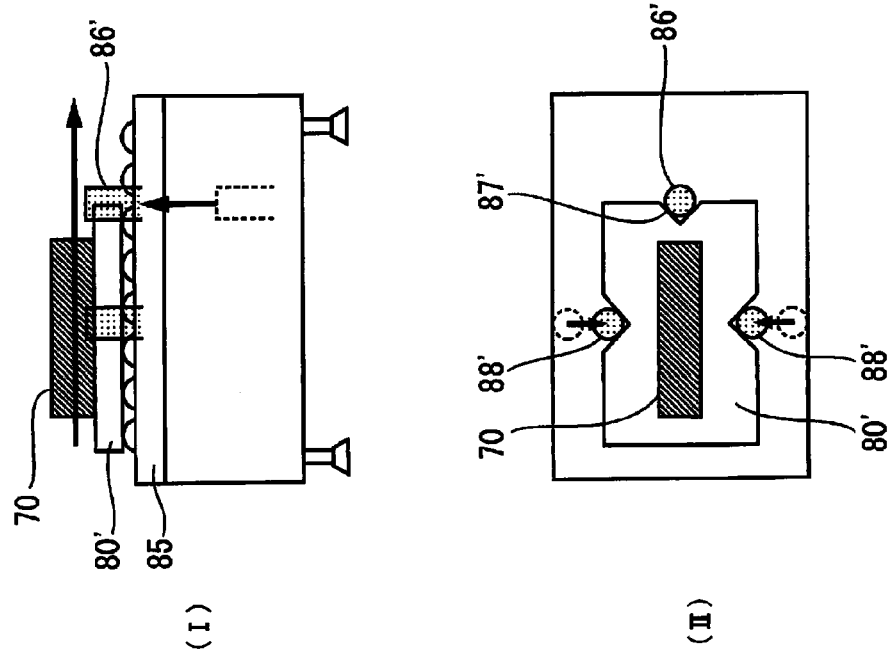
FIG. 34B is a descriptive view showing an example positioning structure of the assembly processing apparatus of the comparative mode, wherein (I) they are front descriptive views, and (II) they are planar descriptive views.

In relation to a technique of positioning an assembly pallet 80' with high accuracy on occasion of the assembly pallet 80' conveyed over the conveyance conveyor 85 being stopped for each process to undergo assembly operation, there are provided conceivable configurations. Namely, as shown in FIG. 34A, there is adopted a configuration including providing a side of the assembly pallet 80' in its conveyance direction with the stopper 86'; making a pair of positioning member 88' in the assembly pallet 80' along a direction crossing the conveyance direction of the assembly pallet 80'; and positioning and restraining the assembly pallet 80' in three directions. Alternatively, as shown in FIG. 34B, in addition to including the stopper 86', there is adopted another configuration in which the assembly pallet 80' stopped by the stopper 86' is elevated from the conveyance conveyor 85 by an elevation mechanism 89' and subsequently placed. However, these configurations raise a concern that the configuration of the mechanism will become complicate.

As mentioned above, according to assembly processing using the assembly pallet 80 of the exemplary embodiment, it is possible to accurately recognize layout information about the position and the attitude of the assembly pallet 80 without involvement of complication of the structure of the apparatus which would otherwise arise in the comparative example. Assembly processing of the present exemplary embodiment is preferable in that a position where the assembly component 100 is put into the receiving assembly component 70 on the assembly pallet 80 may accurately be determined by means of feeding back the layout information about the assembly pallet 80 to the robot 50.

Modification 6-1

FIG. 35A shows a principal block of a modification 6-1 of the assembly processing apparatus of the sixth exemplary embodiment.

In the drawing, the assembly processing apparatus is substantially analogous to its counterpart described in connection with the sixth exemplary embodiment in terms of a basic structure. However, the structure of a pattern marker 110 added to the assembly pallet 80 differs from the structure of the pattern marker 30 described in connection with the sixth exemplary embodiment. Elements similar to those described in connection with the elements described in connection with the sixth exemplary embodiment are assigned the similar reference numerals, and their detailed descriptions are omitted here.

In the exemplary embodiment, the pattern marker 110 is printed on a front surface of a card 120, as shown in FIG. 35A. The card 120 is fixed to the attachment indentation 83 made in a portion (e.g., a corner) of the top surface 82 of the assembly pallet 80.

The pattern marker 110 assumes a configuration, such as that show in FIG. 16A, including the unit pattern marks 111 that are to be provided at four corners of the front surface of the card 120 and that are made up of for instance, gradations 112, and type indication marks 116 to be provided along two sides of the front surface of the card 120. The pattern marker 110 also assumes a configuration, such as that shown in FIG. 16B, including the unit pattern marks 111 that are provided at the four corners of the front surface of the card 120 and that are made up of for instance, dot patterns 113, and the type indication marks 116 provided along the two sides of the front surface of the card 120.

Incidentally, a change may also be made, as required, to the method for fixing the pattern marker 110 and the layout of the pattern marker 110 in the same manner as shown in FIGS. 17 through 19.

Modification 6-2

Figure 36A:
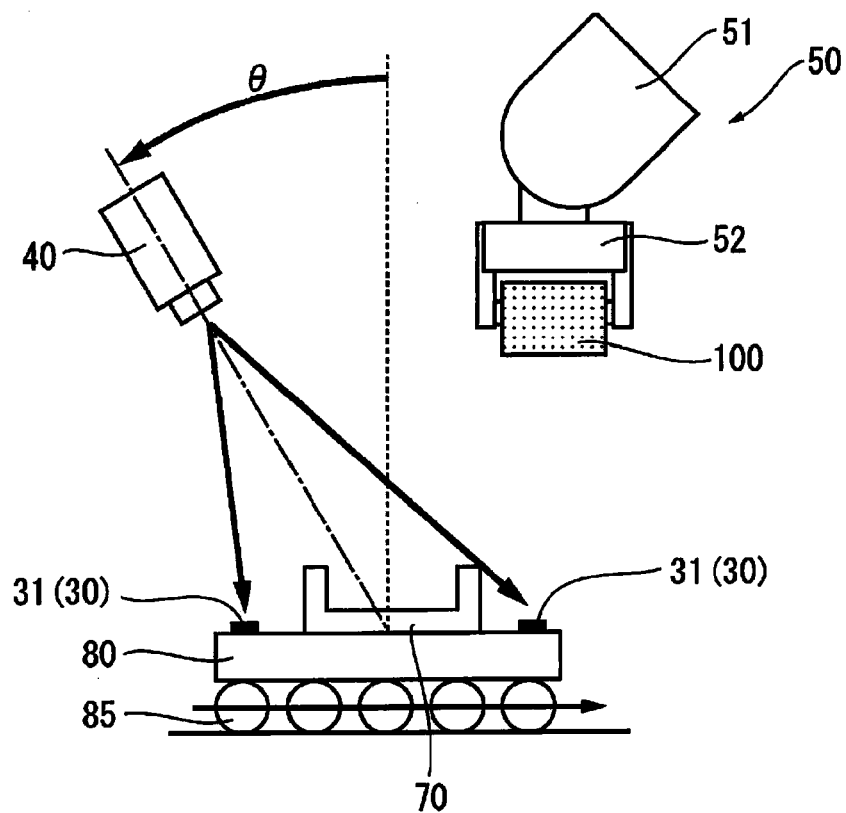
FIG. 36A is a descriptive view showing a modification of a camera supporting structure of the assembly processing apparatus of the sixth exemplary embodiment.
Figure 36B:
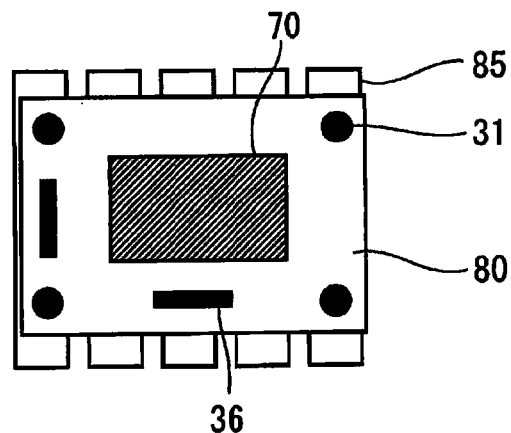
FIG. 36B is a planar descriptive view of the assembly pallet.

FIGS. 36A and 36B are descriptive views showing a principal block of Modification 6-2 that is the modification of the assembly processing apparatus of the sixth exemplary embodiment.

In Modification 6-2, there is no problem in making a design change, as required, like separating the camera 40 and the robot 50 apart from each other, fixedly setting the camera 40 at the non-face-up measurement position, measuring the pattern marker 30 on the assembly pallet 80 with high accuracy; or supporting the camera 40 by means of a movable support mechanism other than the robot 50.

Modification 6-3

Figure 37A:
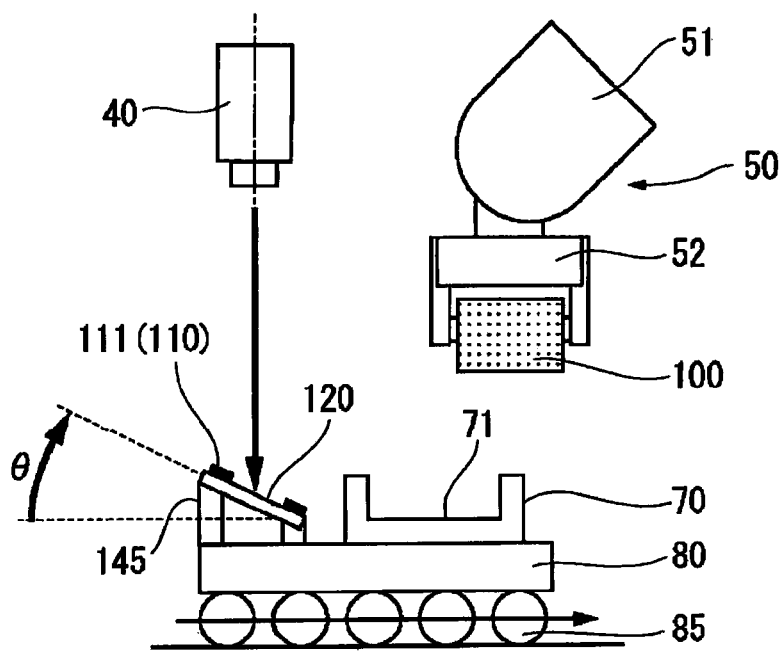
FIG. 37A is a descriptive view showing still another modification of the pattern marker of the assembly pallet provided in the assembly processing apparatus of the sixth exemplary embodiment.
Figure 37B:
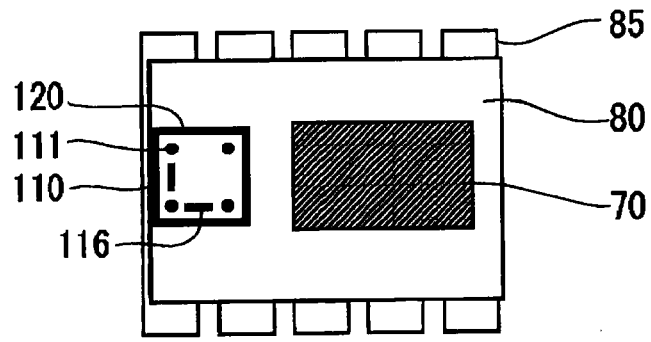
FIG. 37B is a planar descriptive view of the assembly pallet.

FIGS. 37A and 37B are descriptive views showing a principal block of Modification 6-3 that is a modification of the assembly processing apparatus of the sixth exemplary embodiment.

Modification 6-3 includes placing the card 120 having the pattern markers 110 provided at the respective corners of the top surface 82 of the assembly pallet 80 on an inclined support table 145 at an inclination angle θ with respect to the horizontal direction. In the meantime, the camera 40 is set on the top surface 82 of the assembly pallet 80 in such a way that the imaging plane of the camera 40 faces up to the top surface and that the imaging plane of the camera 40 does not face up directly to the surface of the pattern marker 110 on the card 120.

Even in the present modification, the imaging plane of the camera 40 is inclined at θ with respect to the surface of the pattern marker 110 of the assembly pallet 80, as in the sixth exemplary embodiment and Modifications 6-1 and 6-2.

Therefore, when the pattern marker 110 is measured at the non-face-up measurement position, a result of highly accurate measurement is acquired in relation to the layout information about the pattern marker 110.

Seventh Exemplary Embodiment

Figure 38:
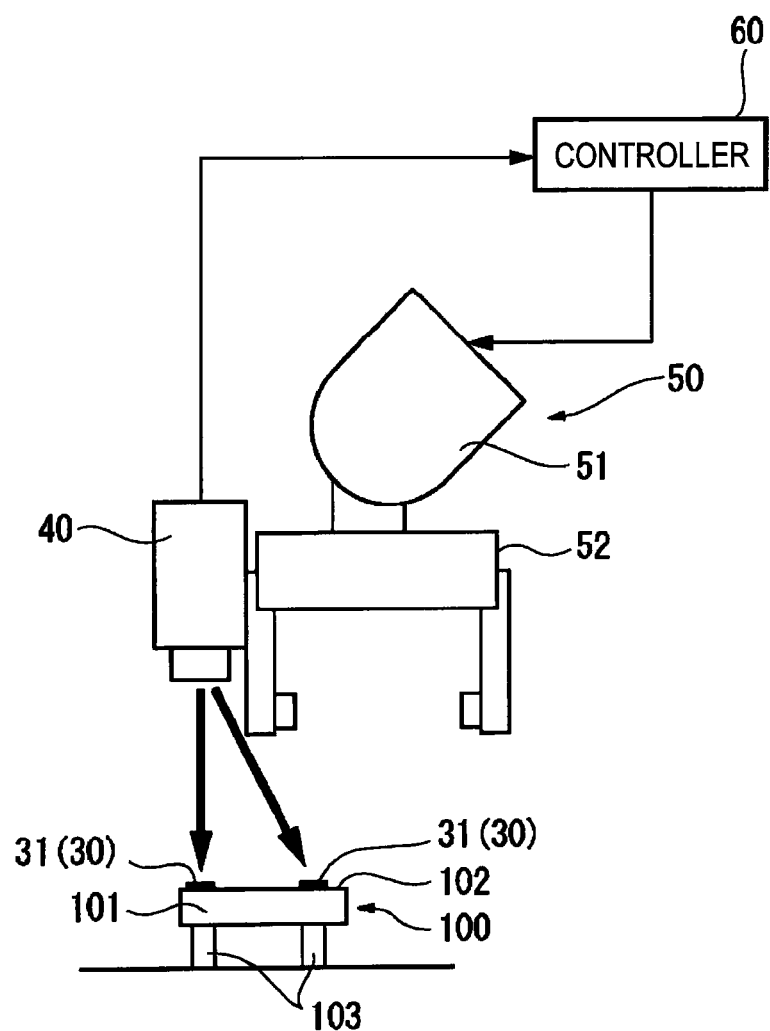
FIG. 38 is a descriptive view showing an overall structure of an assembly processing apparatus serving as an article processing apparatus of a seventh exemplary embodiment.

FIG. 38 is a descriptive view showing an overall structure of an assembly processing apparatus that serves as an article processing apparatus of a seventh exemplary embodiment.

<Overall Configuration of the Assembly Processing Apparatus>

In the drawing, the assembly processing apparatus automatically puts the assembly component 100 into an unillustrated receiving assembly component.

Figure 40:
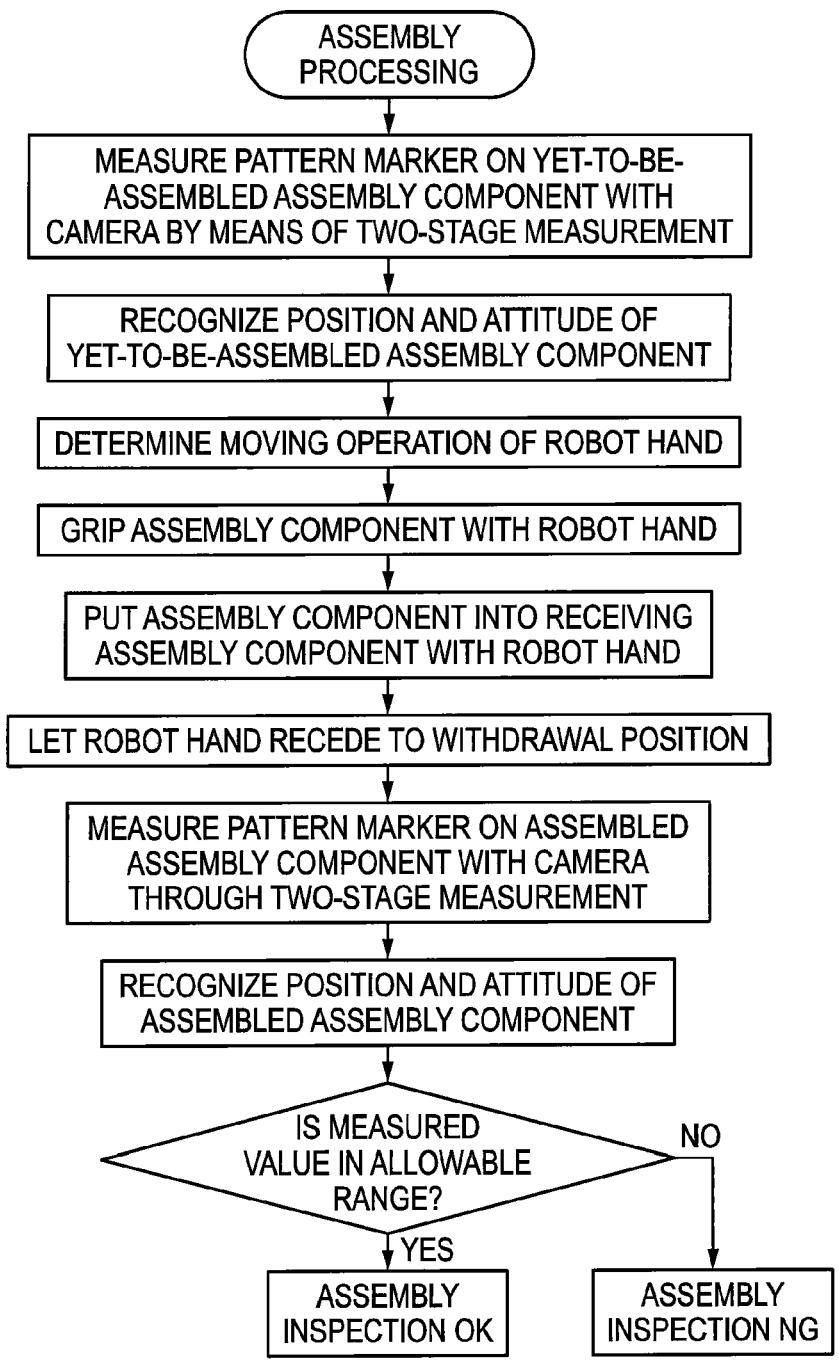
FIG. 40 is a flowchart showing an assembly processing process employed by the assembly processing apparatus of the seventh exemplary embodiment.

In the present exemplary embodiment, the assembly processing apparatus has the pattern marker 30 serving as a marker provided on the assembly component 100 used for recognizing layout information about a position and an attitude of the assembly component 100; the camera 40 that captures an image of the pattern marker 30 of the assembly component 100; the robot 50 serving as a support mechanism that grips the assembly component 100 and that puts the assembly component 100 into a receiving assembly component; and the controller 60 that controls imaging timing of the camera 40, receives an input of imaging information from the camera 40, and recognizes layout information about a position and an attitude of the assembly pallet 20, and controls motion of the robot 50 according to the thus-recognized layout information and along a flowchart shown in FIG. 40 to be described later.

In the exemplary embodiment, the robot 50 has the robot arm 51 that may be actuated by means of multiaxial joints. The robot hand 52 capable of performing gripping action is attached to an extremity of the robot arm 51. Processing operation to be performed by the robot hand 52 is instructed according to input locus information, such as a motion capture. A correction is made to the processing operation to be performed by the robot hand 52 according to the imaging information from the camera 40.

In the present exemplary embodiment, the camera 40 is fixed to a portion of the robot hand 52 and set at the predetermined measurement position by means of the robot hand 52.

Although the assembly component 100 is arbitrarily selected according to an application, a pair of positioning legs 103 are provided on a bottom of for instance, a component main body 101 assuming the shape of a substantial rectangular parallelepiped. The assembly component 100 is assembled while put into a positioning indentation 73 of the receiving assembly component 70 (see FIG. 41).

<Pattern Marker>

Figure 39A:
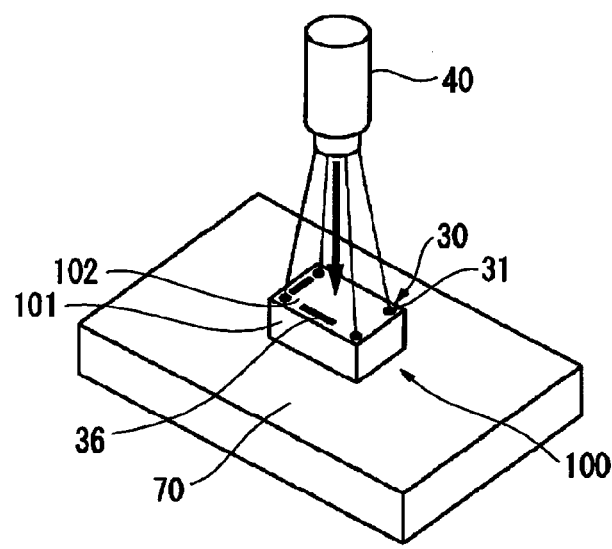
FIG. 39A is a descriptive view showing an example assembly component provided with a pattern marker used in the seventh exemplary embodiment.
Figure 39B:
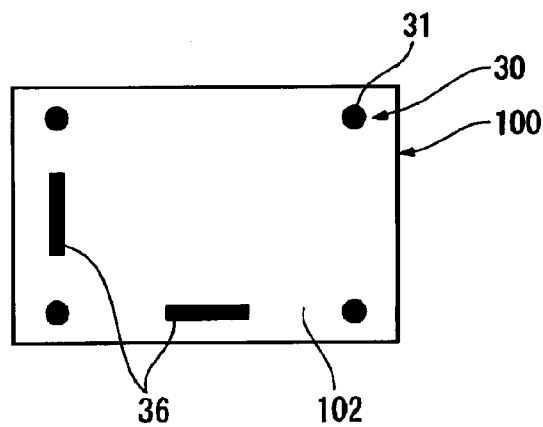
FIG. 39B is a descriptive view showing an overall structure of the pattern marker.

In the present exemplary embodiment, as shown in FIGS. 39A and 39B, a top surface 102 of the component main body 101 of the assembly component 100 is taken as a recognition reference plane. The pattern marker 30 has the unit pattern markers 31 provided at the four corners of the top surface 102 and the type indication marks 36 provided along two adjacent sides of the top surface 102 of the component main body 101. Reference numeral 70 in FIG. 39A designates a receiving assembly component.

Figure 39C:
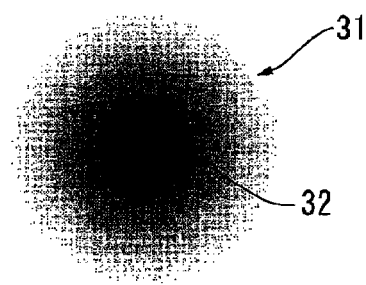
FIGS. 39C and 39D are descriptive views showing an example structure of a unit pattern marker.

As shown in; for example, FIGS. 39C and 4A, one typical configuration of the unit pattern mark 31 is illustrated as the gradation 32 having the density pattern Pc that exhibits the highest density at the center position C and that sequentially changes so as to become less dense with an increasing distance toward a periphery of the mark.

Figure 39D:
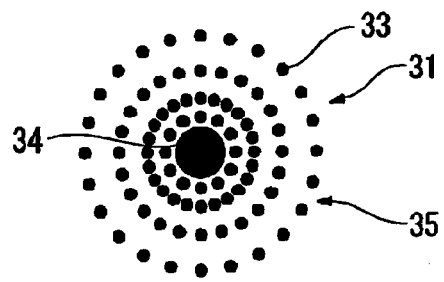

As shown in FIGS. 39D and 4A, another typical configuration of the unit pattern mark 31 is illustrated as a dot pattern that exhibits the most dense distribution of dots 33 at the center position C, thereby forming a high density region 34, and a distribution of the dots 33 which becomes gradually coarser toward a periphery of the dot pattern, thereby forming a low density region 35. In this case, the density distribution may be given to the unit pattern marker by means of changing a diameter size of the dot 33, spacing between the dots, and a layout position.

In particular, the dot pattern configuration is preferable, because the dot pattern is easily made by means of printing operation utilizing an inkjet imaging forming apparatus or an electrophotographic image forming apparatus.

Meanwhile, for instance, when the receiving assembly components 70 include a plurality of types (in terms of for instance, color types, sizes, and the like), the type indication marks act ID (identification) indications used for finding matching with receiving assembly components of a corresponding type. In the present exemplary embodiment, the type indication marks 36 are provided at two locations but may also be provided at one location. Alternatively, there arises no problem even when the type indication marks are placed at three locations or more in a split manner.

Example manufacture of the pattern marker 30 and the measurement method for the camera 40 are substantially the same as those described in connection with the first exemplary embodiment.

<Assembly Processing>

Assembly processing to be performed by the assembly processing apparatus of the present exemplary embodiment is now described.

—Processing for Assembling an Assembly Component—

First, the controller 60 performs processing pertaining to a flowchart shown in FIG. 40 and sends a control signal to the camera 40 and the robot 50.

In the drawing, the controller 60 first subjects the pattern marker 30 on a yet-to-be-assembled assembly component 100 by means of the camera 40 to two-stage measurement (measurement to be performed at the face-up measurement position and measurement to be performed at the non-face-up measurement position) (see a component recognition process shown in FIG. 41); and subsequently recognizes layout information about the position and the attitude of the yet-to-be-assembled assembly component 100.

Subsequently, the controller 60 determines moving motion of the robot hand 52; lets the robot hand 52 grip the assembly component 100 (see a component grip process shown in FIG. 41); and puts the assembly component 10 to the receiving assembly component 70 by means of the robot hand 52 (see a component assembly process shown in FIG. 41).

The controller 60 then determines that the robot hand 52 has finished processing for assembling the assembly component 100 and lets the robot hand 52 recede to the predetermined withdrawal position.

—Assembly Inspection of an Assembly Component—

The controller 60 subjects the pattern marker 30 on an assembled assembly component by means of the camera 40 to two-stage measurement (measurement to be performed at the face-up measurement position and measurement to be performed at the non-face-up measurement position), thereby recognizing layout information about the position and the attitude of the assembled assembly component 100 (see a component check process shown in FIG. 41).

It is then checked whether or not a measured value falls within a predetermined allowable range. When the measured value is in the allowable range, the assembled component is determined to be acceptable (OK) through assembly inspection. On the contrary, when the measured value exceeds the allowable range, the assembled component is determined to be defective (NG) through assembly inspection.

Figure 42B:
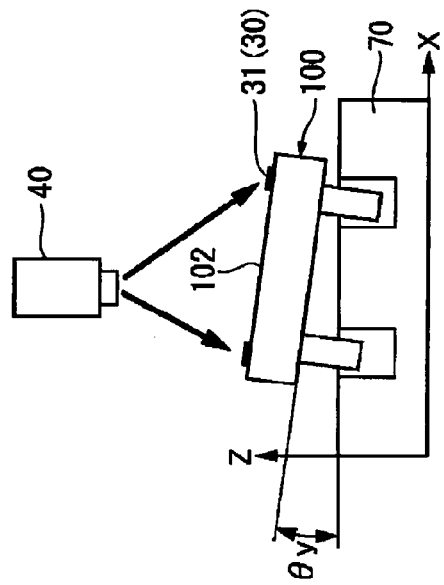
Figure 42D:
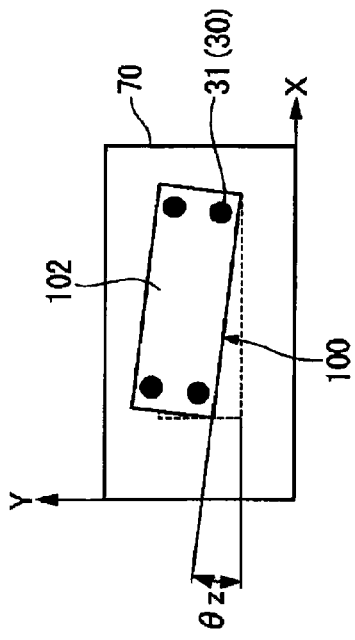
Figure 42A:
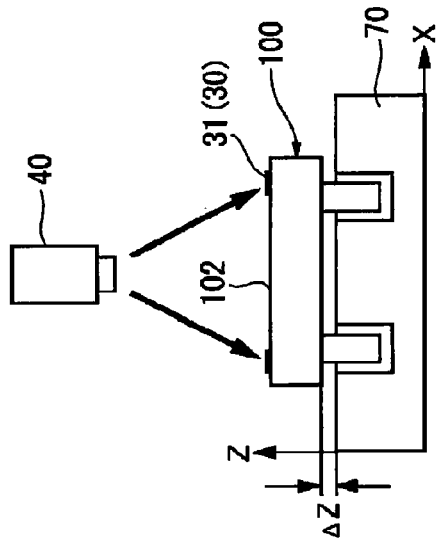

More specifically, as shown in FIG. 42A, the camera 40 acquires positional data pertaining to a Z-axis direction from the imaging information about each of the unit pattern marks 31 of the pattern marker 30, whereby a lift ($\Delta Z$) occurred in the Z-axis direction may be calculated.

As shown in FIG. 42B, the camera 40 acquires positional data pertaining to surroundings of a Y axis from the imaging information about each of the unit pattern marks 31 of the pattern marker 30, whereby an inclination ($\theta y$) of the pattern marker with reference to the Y axis.

Figure 42C:
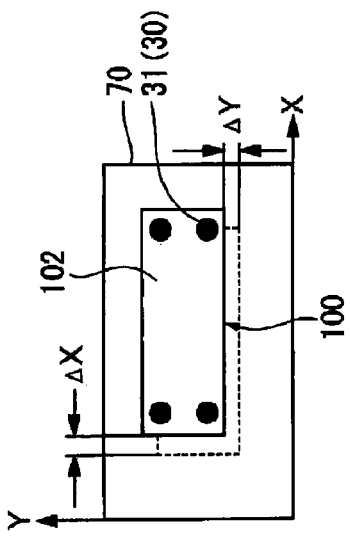

As shown in FIG. 42C, the camera 40 acquires positional data pertaining to the X-axis and Y-axis directions from the imaging information about each of the unit pattern marks 31 of the pattern marker 30, whereby positional displacements ($\Delta X, \Delta Y$) occurred in both the X-axis direction and the Y-axis direction may be calculated.

Further, as shown in FIG. 42D, the camera 40 acquires positional data pertaining to surroundings of a Z axis from the imaging information about each of the unit pattern marks 31 of the pattern marker 30, whereby a rotational displacement ($\theta z$) occurred with reference to the Z axis may be calculated.

<Assembly Inspection of an Assembly Component of a Comparative Mode>

Figure 43A:
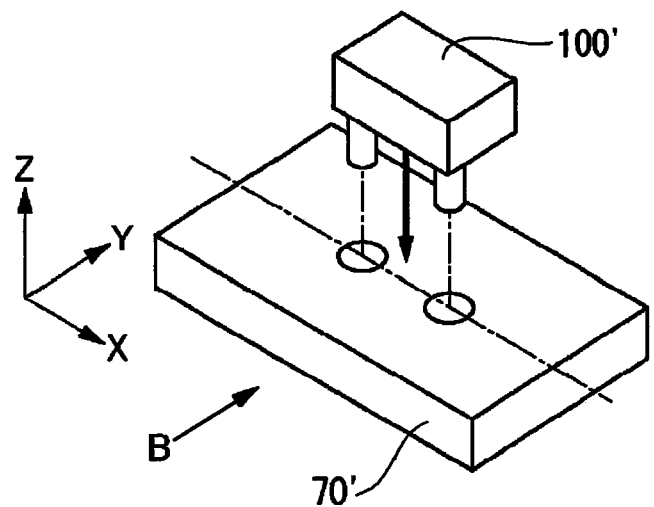
FIG. 43A is a descriptive view schematically showing an example assembly processing apparatus of a comparative mode.
Figure 43B:
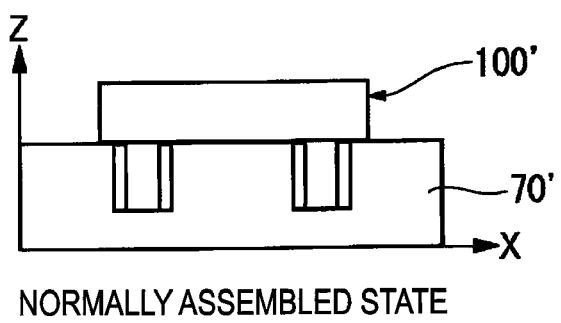
FIG. 43B is a descriptive view showing a normal assembly state yielded by the assembly processing apparatus.

FIG. 43A shows a comparative mode in which a pattern marker is not provided on an assembly component 100'. As shown in FIG. 43B, if the assembly component 100' is properly put into a receiving assembly component 70', the assembly component 100' will not be lifted in the Z-axis direction or inclined with reference to the Y axis.

However, as shown in FIG. 44A, if the assembly component 100' is not properly put into the receiving assembly component 70', a lift ($\Delta Z$) occurred in the Z-axis direction; for instance, may be calculated by acquiring positional data pertaining the Z-axis direction through use of a Z-axis displacement sensor 211 (e.g., a non-contact laser displacement sensor or a contact displacement sensor).

In addition, as shown in FIG. 44B, an inclination $\theta x$ occurred with reference to the X axis and an inclination $\theta y$ occurred with reference to the Y axis may be calculated from a difference between measured values output from two Z-axis displacement sensors 212 and 213 (non-contact laser displacement sensors or contact displacement sensors) separated apart from each other in both the X-axis direction and the Y-axis direction.

As shown in FIG. 44C, it is necessary to calculate a positional displacement ($\Delta X$) occurred with reference to the X axis and a positional displacement ($\Delta Y$) occurred with reference to the Y axis, by acquiring X-axis positional data and Y-axis positional data through use of an X-axis displacement sensor 214 and a Y-axis displacement sensor 215 (e.g., a non-contact laser displacement sensor or a contact displacement sensor).

Further, as shown in FIG. 44D, a rotational displacement $\theta z$ occurred with reference to the Z axis; for instance, may be calculated from a difference between measured values from Y-axis displacement sensors 216 and 217 (e.g., non-contact laser displacement sensors and contact displacement sensors) separated from each other in the X-axis direction.

As mentioned above, some of the sensors are capable of being shared in order to calculate the respective displacements. However, the large number of displacement sensors 211 to 217 are still required, which in turn raises a concern about complication of a facility structure.

Eighth Exemplary Embodiment

Figure 45:
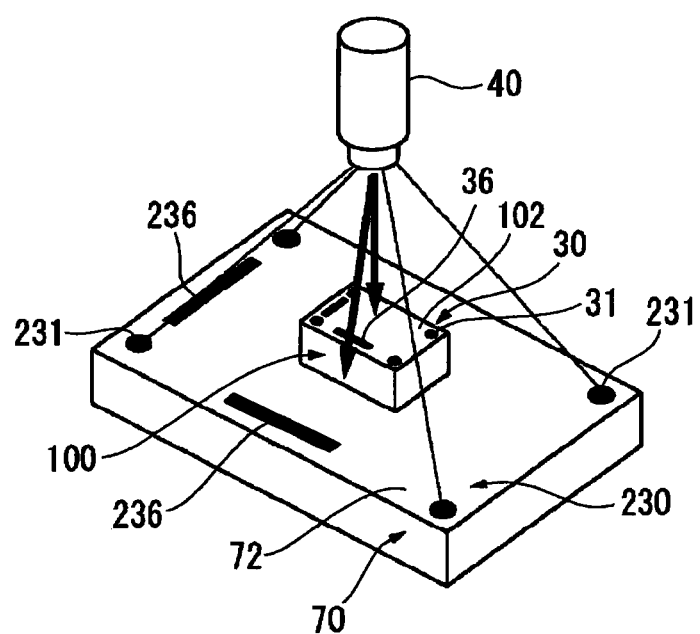
FIG. 45 is a descriptive view showing a principal block of the assembly processing apparatus serving as the article processing apparatus of an eighth exemplary embodiment.

FIG. 45 is a descriptive view showing a principal block of an assembly processing apparatus serving as an article processing apparatus of an eighth exemplary embodiment.

In the exemplary embodiment, the assembly processing apparatus is substantially analogous to its counterpart described in connection with the seventh exemplary embodiment in terms of a basic structure. However, unlike the seventh exemplary embodiment, a pattern marker 230 substantially analogous to the pattern marker 30 of the assembly component 100 is provided even on a top surface 72 of the receiving assembly component 70. In the present exemplary embodiment, the pattern marker 230 has unit pattern marks 231 provided at four corners of the top surface 72 and type indication marks 236 to be provided along two sides of the top surface 72.

In the present exemplary embodiment, the camera 40 captures an image of the pattern marker 30 of the assembly component 100, as well as capturing an image of the pattern marker 230 of the receiving assembly component 70. The controller 60 analogous to its counterpart described in connection with the seventh exemplary embodiment is to control the camera 40 and the robot 50 (see the sixth exemplary embodiment) along the flowchart shown in FIG. 46.

Operation of the assembly processing apparatus of the present exemplary embodiment is now described by reference to FIG. 46.

Figure 46:
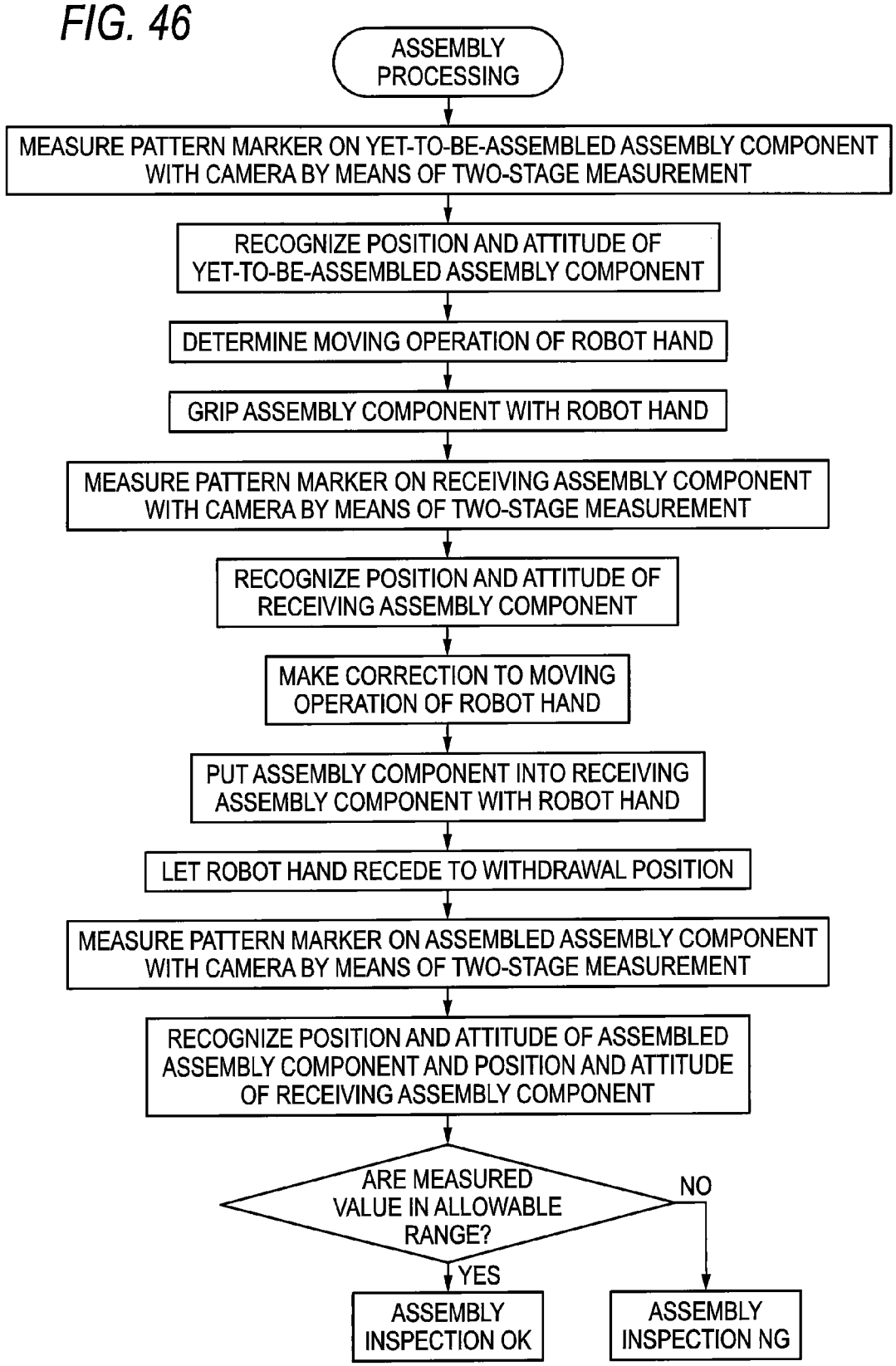
FIG. 46 is a flowchart showing an assembly processing process employed in the assembly processing apparatus of the eighth exemplary embodiment.

First, the controller 60 performs processing pertaining to the flowchart shown in FIG. 46 and transmits a control signal to the camera 40 and the robot 50.

In the drawing, the controller 60 subjects the pattern marker 30 of the yet-to-be-assembled assembly component 100 by means of the camera 40 to two-stage measurement (measurement to be performed at the face-up measurement position and measurement to be performed at the non-face-up measurement position) (see a component recognition process shown in FIG. 41); and subsequently recognizes layout information about the position and the attitude of the yet-to-be-assembled assembly component 100.

Subsequently, the controller 60 determines moving motion of the robot hand 52 and lets the robot hand 52 grip the assembly component 100 (see a component grip process shown in FIG. 47).

Figure 47:
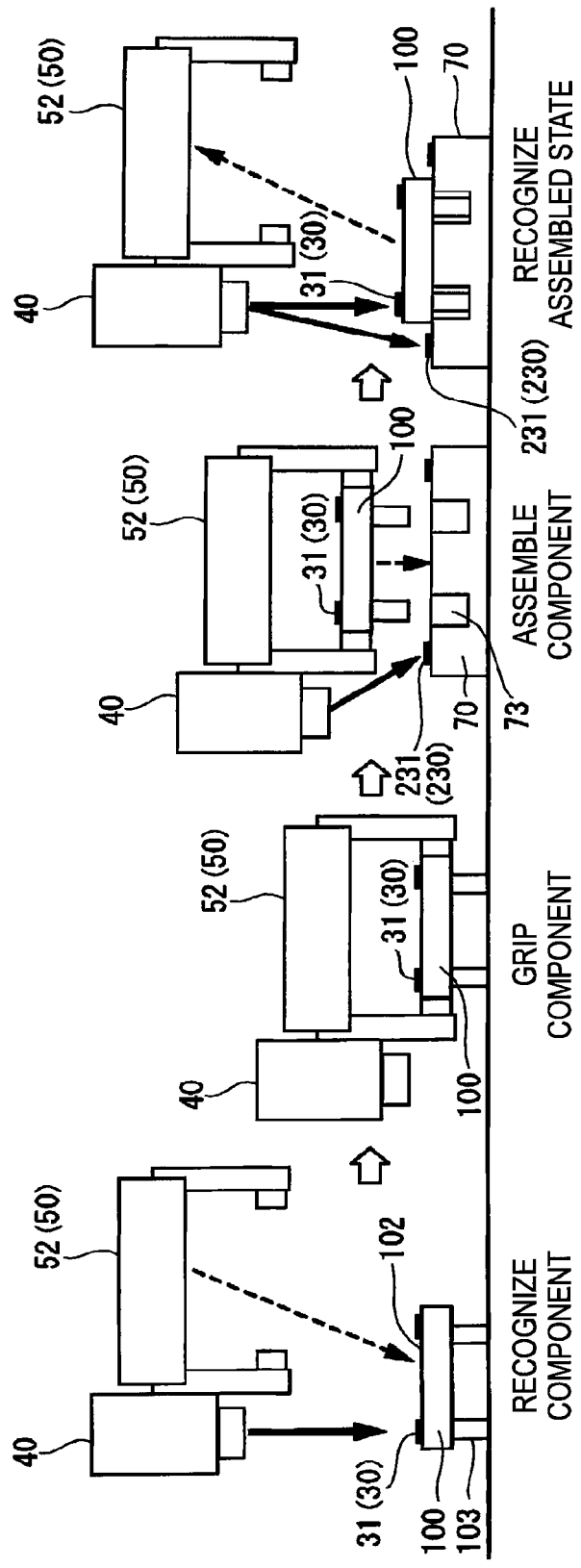
FIG. 47 is a descriptive view schematically showing the assembly processing process shown in FIG. 46.

The controller 60 then subjects the pattern marker 230 of the receiving assembly component 70 by means of the camera 40 to two-stage measurement, to thus recognize layout information about a position and an attitude of the receiving assembly component 70 and make a correction to the moving motion of the robot hand 52; and puts the assembly component 100 to the receiving assembly component 70 by means of the robot hand 52 (see a component assembly process shown in FIG. 47).

The controller 60 then determines that the robot hand 52 has finished processing for assembling the assembly component 100 and lets the robot hand 52 recede to the predetermined withdrawal position.

The controller 60 subsequently subjects the pattern marker 30 on an assembled assembly component 100 and the pattern marker 230 on the receiving assembly component 70 by means of the camera 40 to two-stage measurement, thereby recognizing layout information about the position and the attitude of the assembled assembly component 100 and layout information about the position and the attitude of the assembled assembly component 70 (see a component check process shown in FIG. 47).

It is then checked, from a relative positional relationship between the pattern markers, whether or not a measured value falls within a predetermined allowable range. When the measured value is in the allowable range, the assembled component is determined to be acceptable (OK) through assembly inspection. On the contrary, when the measured value exceeds the allowable range, the assembled component is determined to be defective (NG) through assembly inspection.

In particular, in the present exemplary embodiment, layout information even about the position and the attitude of the receiving assembly component 70 is also recognized. Therefore, a state of the assembly component 100 put into the receiving assembly component 70 is checked more accurately than in the case of the seventh exemplary embodiment because, in addition to accuracy of fitting of the assembly component 100 into the receiving assembly component 70 being maintained superior, the relative positional relationship between the assembly component 100 and the receiving assembly component 70 is also recognized in the assembly inspection processes subsequent to assembly.

In the present exemplary embodiment, the layout information even about the position and the attitude of the receiving assembly component 70 is also recognized in the assembly inspection process. However, the layout information even about the position and the attitude of the receiving assembly component 70 is recognized on occasion of the assembly component 100 being put into the receiving assembly component 70. Therefore, processing for recognizing the layout information about the receiving assembly component 70 may also be omitted from the assembly inspection process.

Ninth Exemplary Embodiment

Figure 48A:
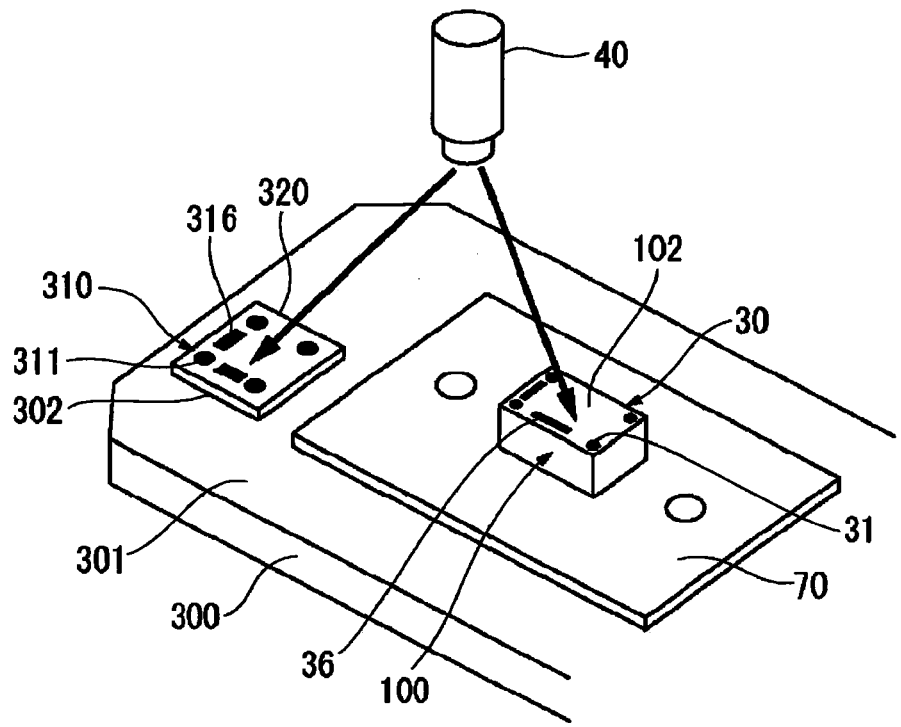
FIG. 48A is a descriptive view showing a principal block of an assembly processing apparatus serving as an article processing apparatus of a ninth exemplary embodiment.

FIG. 48A shows a principal block of an assembly processing apparatus serving as an article processing apparatus of a ninth exemplary embodiment.

In the drawing, the assembly processing apparatus is substantially analogous to its counterpart described in connection with the eighth exemplary embodiment in terms of a basic structure. However, unlike the eighth exemplary embodiment, the receiving assembly component 70 is positioned at a predetermined area on an assembly jig (equivalent to an assembly base), and a pattern marker 310 analogous to the pattern marker 230 is placed in a portion of the assembly jig 300.

In the exemplary embodiment, the pattern marker 310 is printed on a surface of a card 320. The card 320 is fixed to an attachment indentation 302 made in a portion of a top surface 301 of the assembly jig 310.

As shown in FIG. 48A, the pattern marker 310 includes configurations; for instance, a configuration including unit pattern marks 311 that are made up of gradations to be provided at respective four corners of the surface of the card 320 and type indication marks 316 to be provided along two sides of the surface of the card 320; and a configuration including the unit pattern marks 311 that are made up of for instance, dot patterns to be provided at the respective four corners of the surface of the card 320 and the type indication marks 316 to be provided along the two sides of the front surface of the card 320. It is allowed to select a method for fixing the pattern marker as required.

As mentioned above, in the present exemplary embodiment, the pattern marker 310 is provided on the assembly jig 300. Hence, it is possible to recognize layout information about a position and an attitude of the assembly jig 300 by means of measuring the pattern marker 310 on the assembly jig 300 with use of the camera 40 and recognize the layout information about the position and the attitude of the receiving assembly component 70 on the basis of the thus-recognized layout information. Therefore, on occasion of the assembly component 100 being put into the receiving assembly component 70, processing for putting the assembly component 100 into the receiving assembly component 70 is accurately carried out.

Further, the pattern marker 30 on the assembly component 100 and the pattern marker 310 on the assembly jig 300 are measured after the assembly component 100 has been put into the receiving assembly component 70 has been completed, whereby it is possible to recognize a relative positional relationship between the assembly component 100 and the receiving assembly component 70 according to the layout information about the position and the attitude of the assembly component 100 and the layout information about the position and the attitude of the assembly jig 300. Consequently, it is possible to check the state of the assembly component 100 put into the receiving assembly component 70.

Figure 48B:
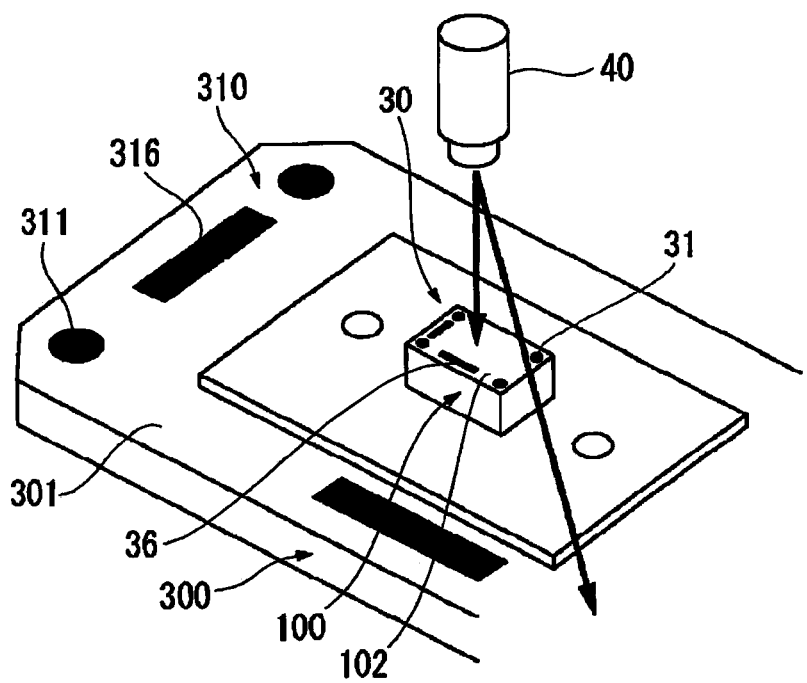
FIG. 48B is a descriptive view showing a principal block of a modification of the assembly processing apparatus of the ninth exemplary embodiment.

In the present exemplary embodiment, as shown in FIG. 48A, the pattern marker 310 is provided in an attachment indentation 302 placed at a portion of the top surface 301 of the assembly jig 300. However, the location where the pattern marker is to be placed is not limited to the attachment indentation. As a matter of course, as shown in FIG. 48B, the pattern marker 301 (including the unit pattern markers 311 and the type indication marks 316) may also be provided at four corners and two sides of the top surface 301 of the assembly jig 310.

Tenth Exemplary Embodiment

Figure 49A:
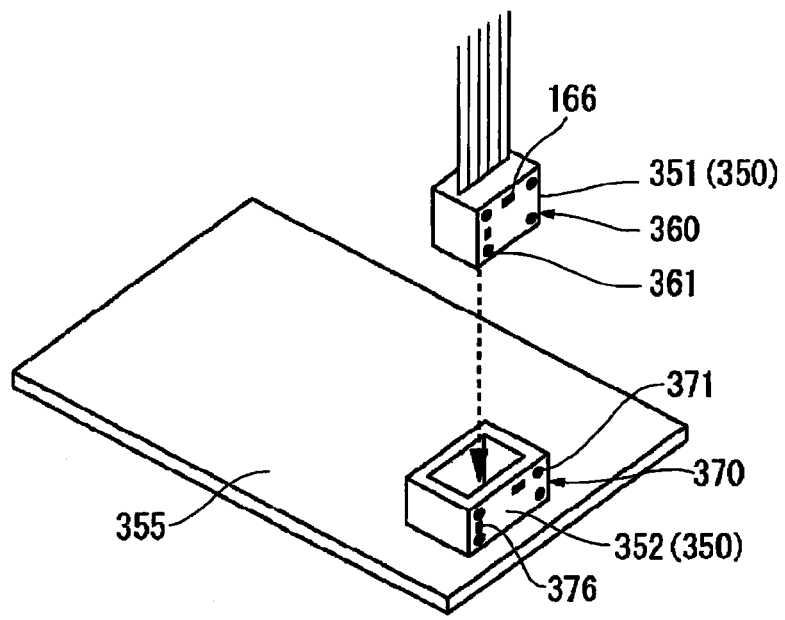
FIG. 49A is a descriptive view showing a yet-to-be-assembled connector device.
Figure 49B:
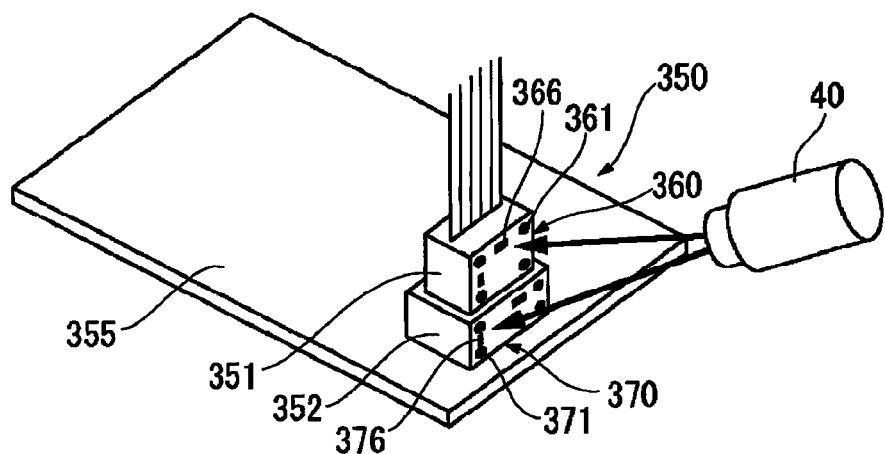
FIG. 49B is a descriptive view showing an assembled connector device.

FIGS. 49A and 49B show a principal block of an assembly inspection apparatus for inspecting a state of insertion of a connector device.

FIG. 49A is a descriptive view showing a state in which a male connector 351 and a female connector 352, which are elements of a connector device 350, are not yet coupled together by insertion. FIG. 49B is a descriptive view showing a state in which the male connector and the female connector are coupled together by insertion.

In the present exemplary embodiment, a pattern marker 360 is provided on one side surface of the male connector 351, and a pattern marker 370 is provided on one side surface of the female connector 352, wherein both side surfaces are on the same side. The pattern marker 360 has unit pattern marks 361 provided at four corners on the side surface and type indication marks 366 provided along two sides of the same side surface. Further, the pattern marker 370 has unit pattern marks 371 provided at four corners on the side surface and type indication marks 376 provided along two sides of the same side surface.

As shown in FIG. 49B, after the male connector 351 has been assembled into the female connector 352, the camera 40 subjects the pattern markers 360 and 370 to two-stage measurement (measurement to be performed at the face-up measurement position+measurement to be performed at the non-face-up measurement position) or highly accurate measurement to be performed at the non-face-up measurement position.

According to the measured imaging information, an unillustrated controller recognizes layout information about a position and an attitude of the pattern marker 360 on the male connector 351 and a position and an attitude of the pattern marker 370 on the female connector 352; and calculates a relative positional relationship between the connectors, thereby checking an assembled state of the connectors.

In the exemplary embodiment, the pattern marker 360 on the male connector 351 and the pattern marker 370 on the female connector 352 are provided with different type indication marks (IDs), whereby layout information about the male connector 351 and layout information about the female connector 352 may accurately be recognized In the exemplary embodiment, the male connector 351 is provided with the pattern marker 360, and the female connector 352 is provided with the pattern marker 370. In; for instance, a configuration in which the female connector 352 is provided at a predetermined area on the printed board 355, the pattern marker is provided on the printed board 355 in lieu of the female connector 352. A relative positional relationship between the male connector and the female connector may also be recognized by means of the pattern marker on the printed board and the pattern marker 360 of the male connector 351 that are inserted and put into the female connector 352.

EXAMPLE

Example 1

A relationship between a distance over which the camera is moved when the inclination of the camera is changed and a measurement error (i.e., a difference between the distance over which the camera is moved and a measured value) is examined by use of a collection processing apparatus serving as an article processing apparatus of the exemplary embodiment. A result shown in FIG. 50 is yielded.

Figure 50:
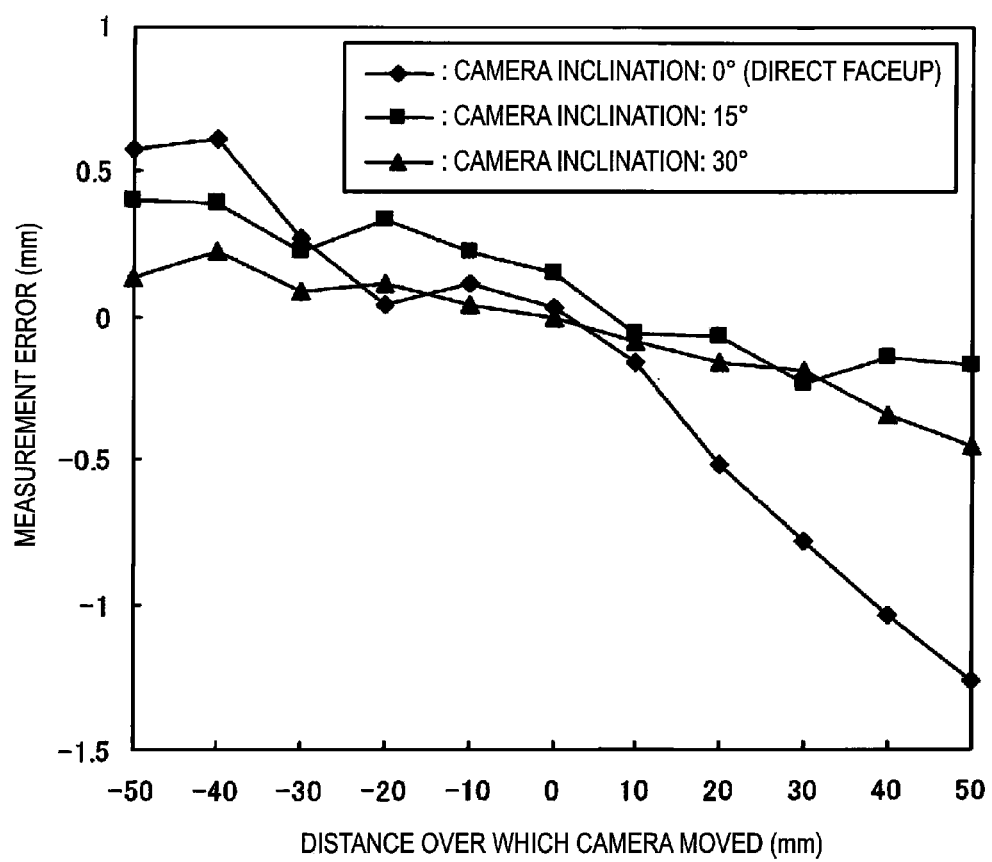
FIG. 50 is a descriptive view showing a relationship between a distance over which a camera moves and a measurement error that is achieved when a measurement position of the camera is changed, in connection with the article processing apparatus of Example 1.

In FIG. 50, the inclination of the camera assuming a value of 0° corresponds to a configuration (equivalent to the face-up measurement position) in which the imaging plane of the camera is parallel to a surface of a sorting tray on which the pattern marker is formed. The inclination of the camera assuming a value of 15° corresponds to a configuration (equivalent to the non-face-up measurement position with respect to the face-up measurement position) in which the imaging plane of the camera is inclined at an angle of 15° with reference to the pattern marker of the sorting tray. The inclination of the camera assuming a value of 30° corresponds to a configuration (equivalent to the non-face-up measurement position with respect to the face-up measurement position) in which the imaging plane of the camera is inclined at an angle of 30° with reference to the pattern marker of the sorting tray.

It is seen from the drawing that, during measurement performed at the face-up measurement position, the measurement error becomes larger with an increase in the distance over which the camera moves; and that, during measurement performed at the non-face-up measurement position, the measurement error is kept small despite an increase in the distance over which the camera moves.

The example shows the case where the camera inclined at 15° and 30° as examples for the non-face-up measurement position. The measurement error is examined in relation to an inclination of 45°. The measurement error is ascertained to be kept much smaller.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An article recognition apparatus comprising:
a marker having four or more unit pattern marks which are provided at a predetermined positional relationship on an article to be recognized and which are formed in such a way that a density pattern sequentially changes from a center position to a periphery of each of the four or more unit pattern marks;
an imaging tool that is disposed opposite the article to be recognized and that captures an image of the marker;
a supporting mechanism that physically supports the imaging tool so as to enable setting of the imaging tool at least at a non-face-up measurement position where an imaging plane of the imaging tool does not directly face up a surface of the marker provided on the article to be recognized and in a view field range of the imaging tool; and
a layout information recognition block that recognizes layout information about a position and an attitude of the article to be recognized by use of at least imaging information about the marker whose image has been captured by the imaging tool placed at the non-face-up measurement position,
wherein the supporting mechanism moves the imaging tool to a first measurement position at which the marker provided on the article to be recognized enters the view field range of the imaging tool and is measured such that an overhead view of the marker may be captured and to a second measurement position made up of the non-face-up measurement position at which the marker enters the view field range of the imaging tool and at which measurement is performed at a higher degree of accuracy than at the first measurement position.

2. The article recognition apparatus according to claim 1, wherein the marker corresponds to indicating a change in density pattern of the unit pattern marks in the form of dot images.

3. The article recognition apparatus according to claim 1, wherein the marker has four unit pattern marks placed on a same plane of the article to be recognized.

4. The article recognition apparatus according to claim 1, wherein the marker is provided on a card removably attached to the article to be recognized.

5. The article recognition apparatus according to claim 1, wherein the marker has four or more unit pattern marks and type indication marks used for recognizing type information other than the layout information about the position and the attitude of the article to be recognized.

6. The article recognition apparatus according to claim 1, wherein the supporting mechanism has the first measurement position made up of a face-up measurement position where the imaging plane of the imaging tool directly faces up the surface of the marker provided on the article to be recognized in the view field range of the imaging tool.

7. The article recognition apparatus according to claim 1, wherein the layout information recognition block calculates the layout information about the position and the attitude of the marker on the article to be recognized from the imaging information acquired at the first measurement position by means of the imaging tool, determines from a calculation result the second measurement position to which the supporting mechanism moves the imaging tool, and recognizes the layout information about the position and the attitude of the marker on the basis of the imaging information acquired by the imaging tool at the second measurement position.

8. An article processing apparatus comprising:
an article recognition apparatus according to claim 1;
a control block that generates a control signal from the layout information about the position and the attitude of the article to be recognized by the article recognition apparatus and that controls processing operation for an article to be processed identical with the article to be recognized or an article to be recognized placed at a predetermined positional relationship with respect to the article to be recognized; and
a processing mechanism that subjects the article to be processed to processing operation according to the control signal generated by the control block.

9. The article processing apparatus according to claim 8, wherein the processing mechanism doubles as the supporting mechanism of the imaging tool.

* * * * *